(12) United States Patent
Masubuchi et al.

(10) Patent No.: US 10,288,000 B2
(45) Date of Patent: May 14, 2019

(54) CONTROL SYSTEM FOR AN INTERNAL COMBUSTION ENGINE

(71) Applicant: Toyota Jidosha Kabushiki Kaisha, Toyota-shi Aichi-ken (JP)

(72) Inventors: Masahiko Masubuchi, Mishima (JP); Takayoshi Tanaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 162 days.

(21) Appl. No.: 15/127,627

(22) PCT Filed: Mar. 18, 2015

(86) PCT No.: PCT/JP2015/001514
§ 371 (c)(1),
(2) Date: Sep. 20, 2016

(87) PCT Pub. No.: WO2015/151434
PCT Pub. Date: Oct. 8, 2015

(65) Prior Publication Data
US 2017/0175656 A1    Jun. 22, 2017

(30) Foreign Application Priority Data
Mar. 31, 2014    (JP) .................................. 2014-072498

(51) Int. Cl.
*F02D 41/02*    (2006.01)
*F01N 3/08*    (2006.01)
(Continued)

(52) U.S. Cl.
CPC ....... *F02D 41/0275* (2013.01); *F01N 3/0864* (2013.01); *F01N 3/0885* (2013.01);
(Continued)

(58) Field of Classification Search
CPC .. F02D 41/0275; F02D 41/0087; F02D 41/26; F02D 41/3005; F02D 41/0055;
(Continued)

(56) References Cited

U.S. PATENT DOCUMENTS 6,012,282 A * 1/2000 Kato ................... B01D 53/9495
123/688
7,892,508 B2 * 2/2011 Katoh ................... F01N 3/0814
422/105
(Continued)

FOREIGN PATENT DOCUMENTS

DE         10202935 A1 *  8/2003    ........... F02D 41/025
JP      2007-046494 A     2/2007
(Continued)

*Primary Examiner* — Laert Dounis
*Assistant Examiner* — Kelsey L Stanek
(74) *Attorney, Agent, or Firm* — Dinsmore & Shohl LLP

(57) ABSTRACT

In a control system for an internal combustion engine in which an exhaust gas purification catalyst having a lower catalyst layer and an upper catalyst layer disposed at the upper side of the lower catalyst layer is arranged in an exhaust passage of the internal combustion engine, when an operation at a rich air fuel ratio is switched to an operation at a target lean air fuel ratio, switching is made through a first operation in which the air fuel ratio of exhaust gas is temporarily made into a lean air fuel ratio, and a second operation which is carried out after the first operation and in which the air fuel ratio of the exhaust gas is made to change alternately between the rich air fuel ratio and the lean air fuel ratio a plurality of times, whereby the HC poisoning of the catalyst can be recovered at an early stage.

11 Claims, 22 Drawing Sheets

(51) Int. Cl.
*F01N 3/20* (2006.01)
*F02D 41/14* (2006.01)
*F02D 41/00* (2006.01)
*F02D 41/26* (2006.01)
*F02D 41/30* (2006.01)
*F01N 3/10* (2006.01)
*F01N 13/00* (2010.01)

(52) U.S. Cl.
CPC ....... *F01N 3/2066* (2013.01); *F02D 41/0055* (2013.01); *F02D 41/0087* (2013.01); *F02D 41/027* (2013.01); *F02D 41/1475* (2013.01); *F02D 41/26* (2013.01); *F02D 41/3005* (2013.01); *F01N 3/0842* (2013.01); *F01N 3/101* (2013.01); *F01N 13/009* (2014.06); *F01N 2510/0684* (2013.01); *F01N 2570/14* (2013.01); *Y02T 10/22* (2013.01); *Y02T 10/24* (2013.01); *Y02T 10/47* (2013.01)

(58) Field of Classification Search
CPC .. F02D 41/027; F02D 41/1475; F01N 3/0864; F01N 3/0885; F01N 3/2066; F01N 2570/14; F01N 3/0842; F01N 3/101; F01N 2510/0684; F01N 13/009; Y02T 10/22; Y02T 10/24; Y02T 10/47
USPC .......................................................... 60/285
See application file for complete search history.

(56) References Cited

U.S. PATENT DOCUMENTS

2008/0219906 A1\* 9/2008 Chen ..................... B01D 53/945
423/213.5
2014/0039781 A1\* 2/2014 Theis ..................... F01N 13/011
701/112

FOREIGN PATENT DOCUMENTS

JP 2009-024521 A 2/2009
JP 2009-103017 A 5/2009

\* cited by examiner

[Fig. 1]
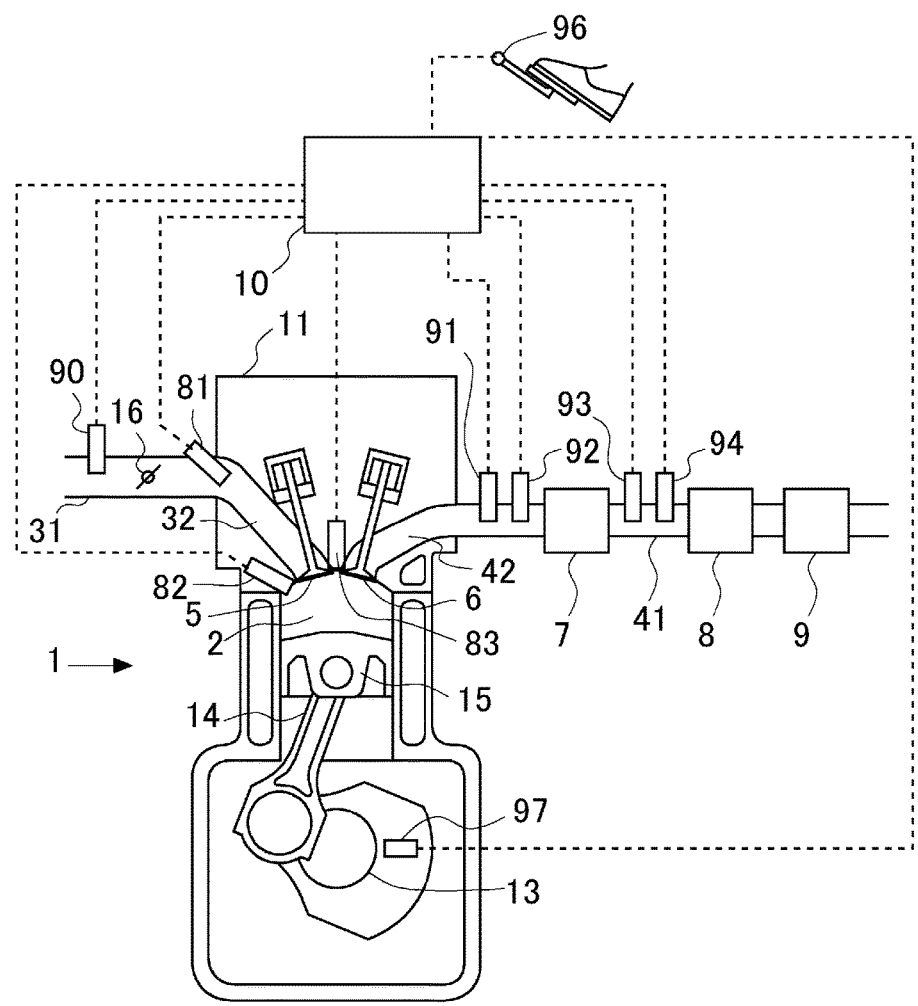

[Fig. 2]
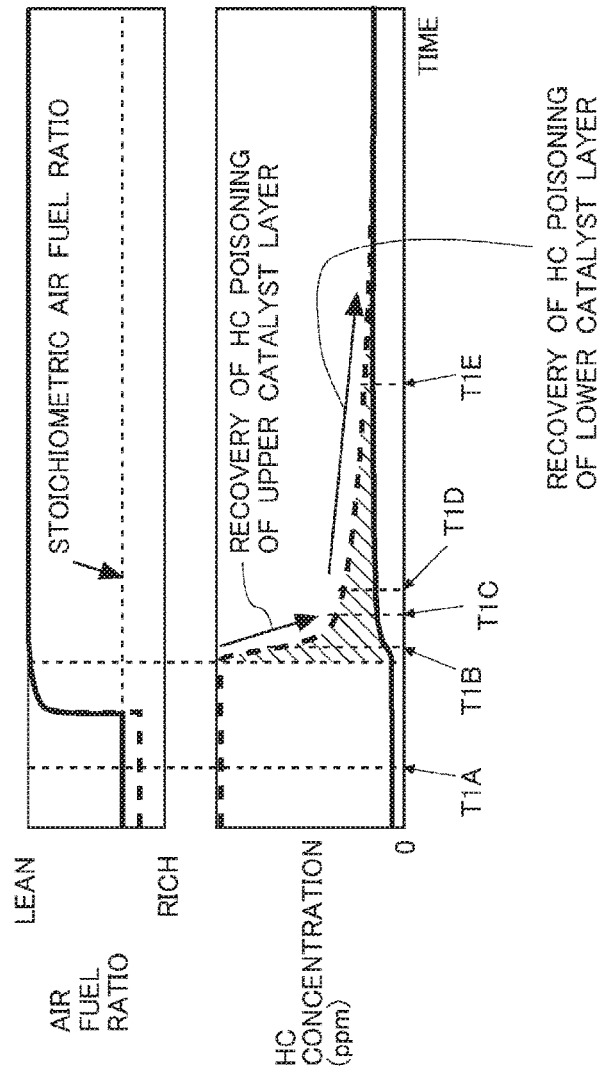
[Fig. 3A]
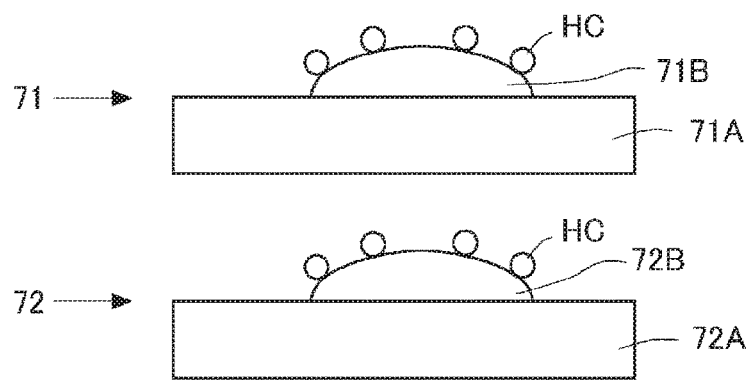

[Fig. 3B]
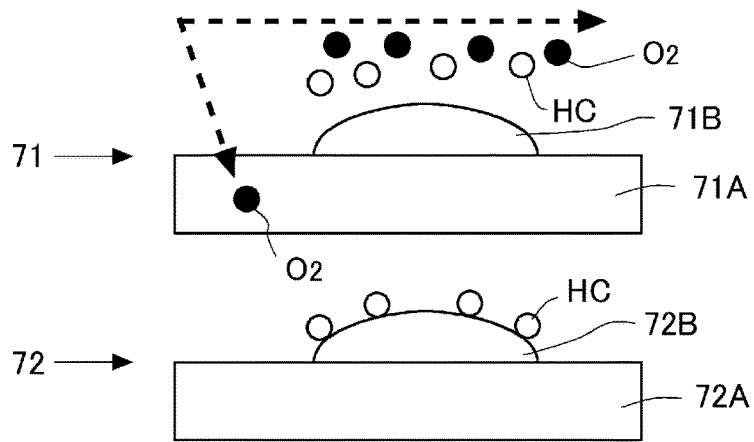
[Fig. 3C]
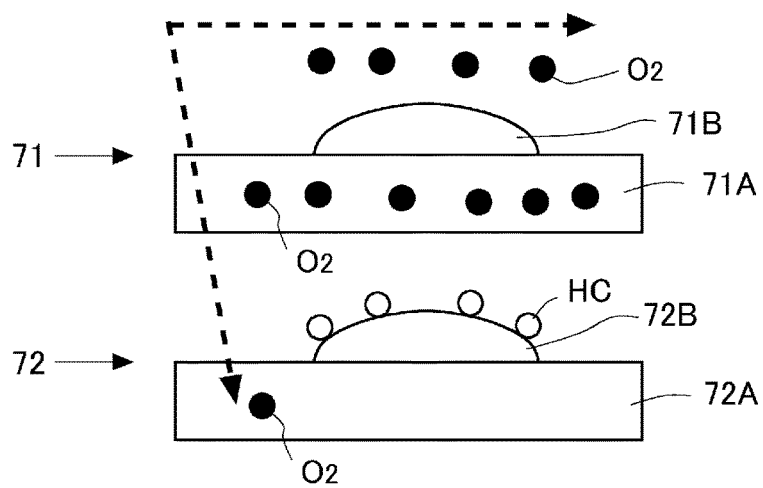
[Fig. 3D]
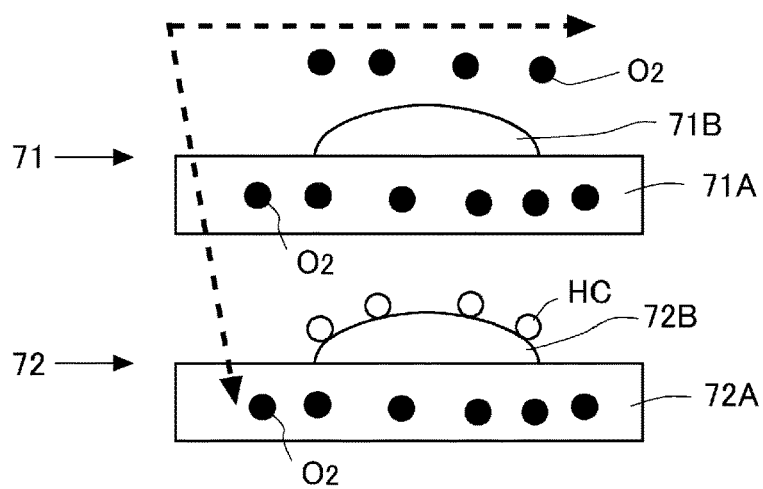

[Fig. 3E]
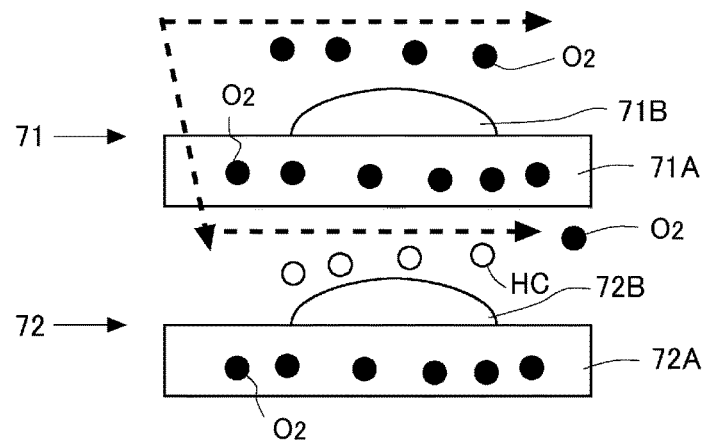
[Fig. 4]
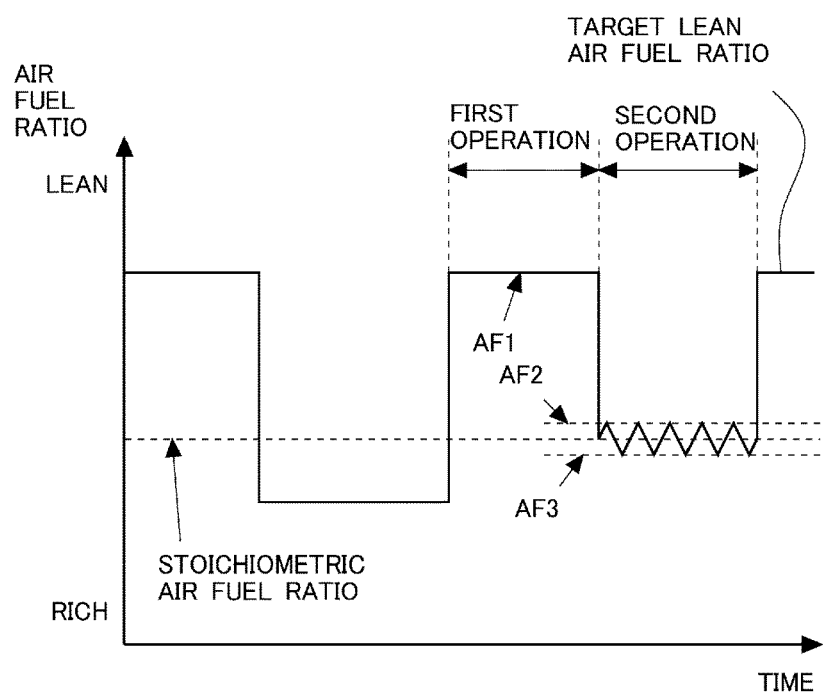
[Fig. 5A]
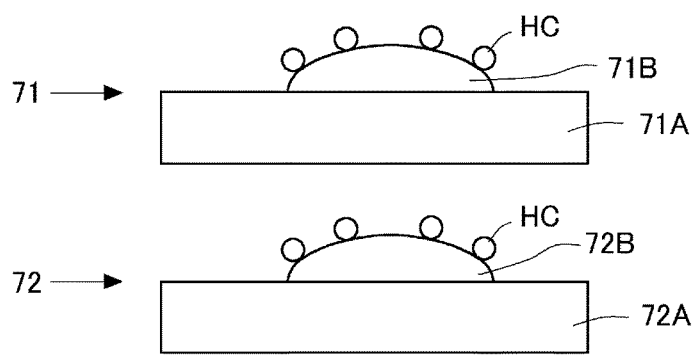

[Fig. 5B]
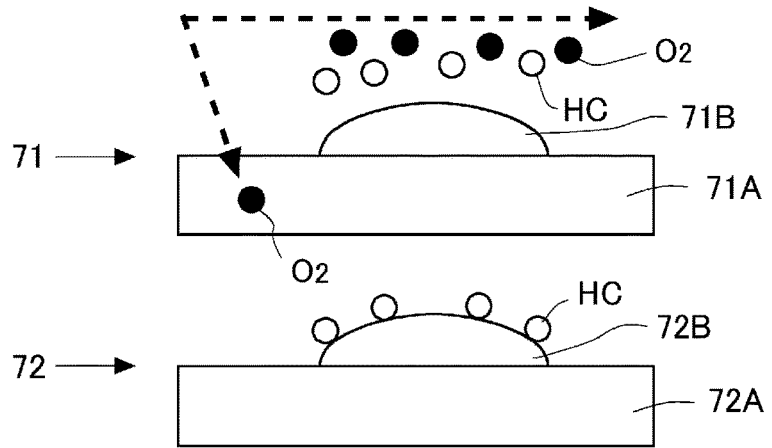
[Fig. 5C]
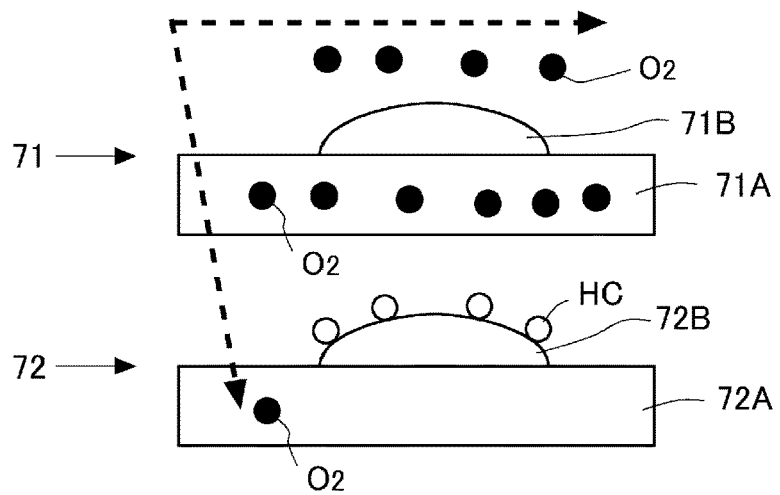
[Fig. 5D]
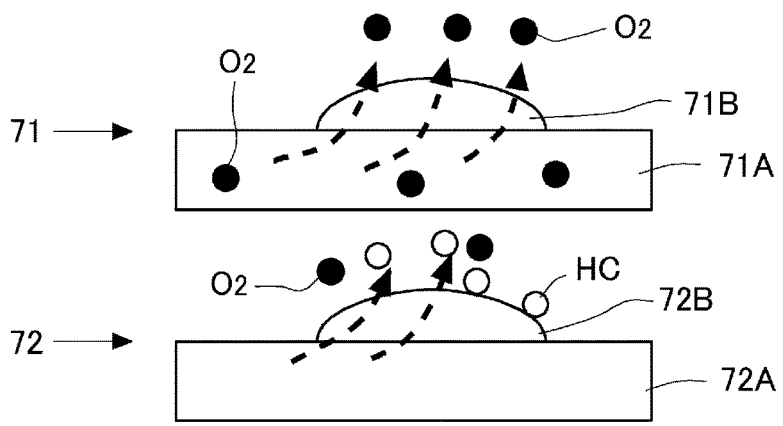

[Fig. 5E]
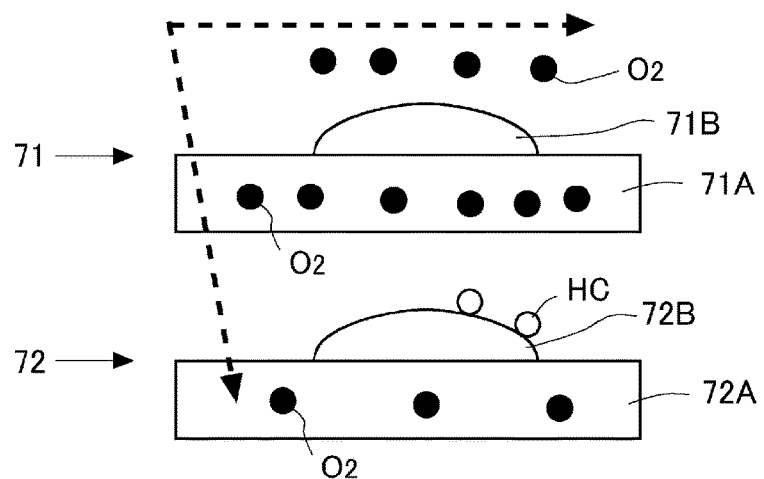
[Fig. 5F]
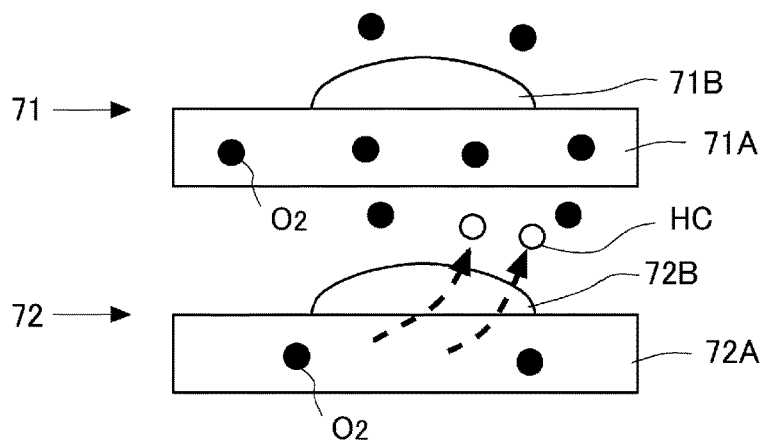

[Fig. 6]
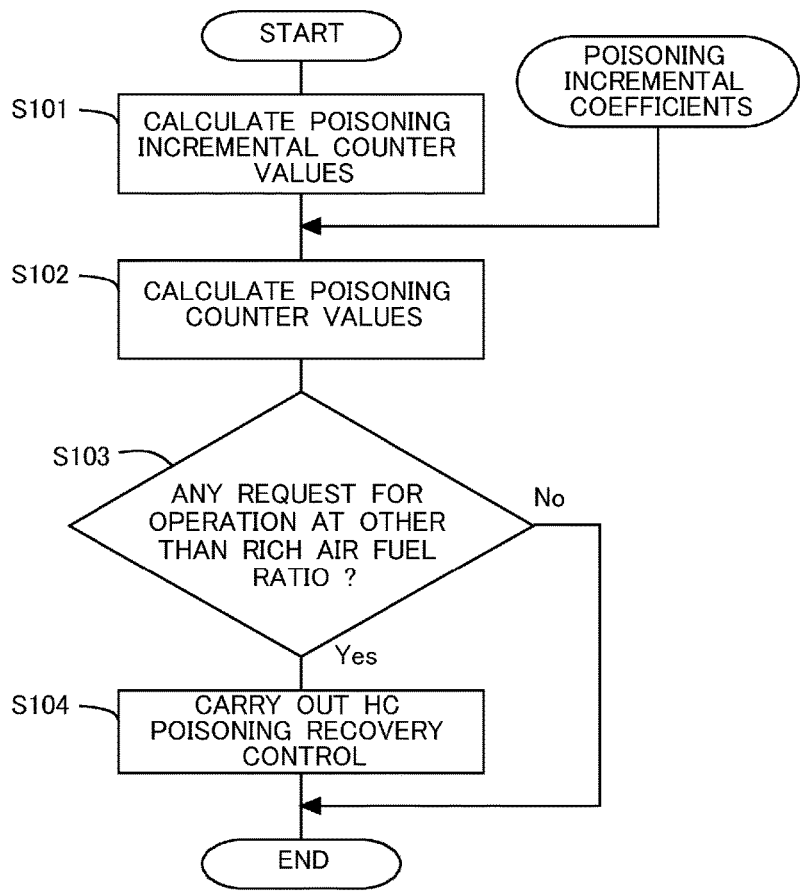
[Fig. 7]
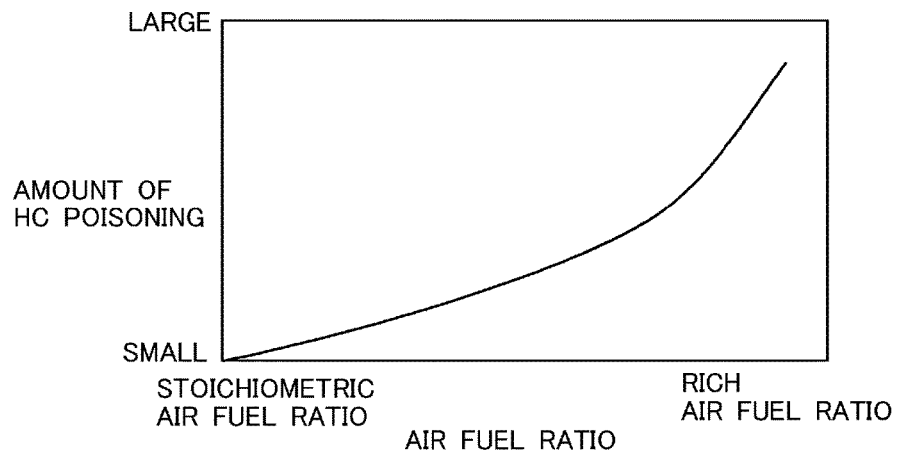

[Fig. 8]
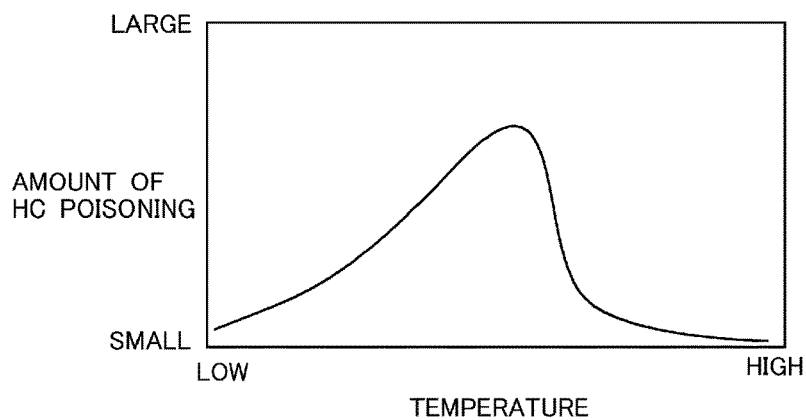
[Fig. 9]
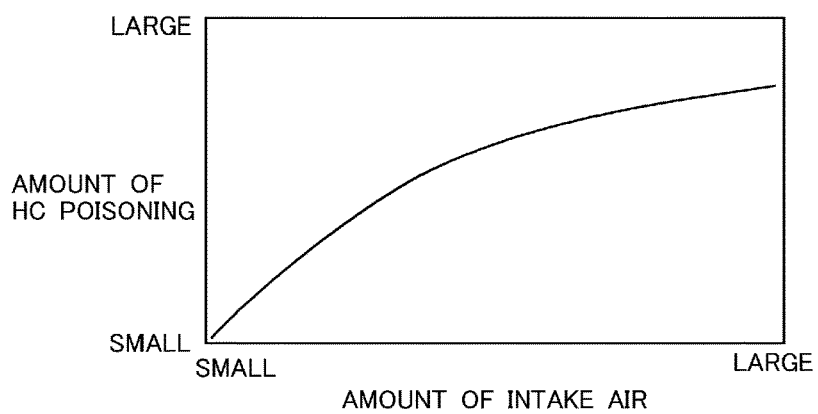
[Fig. 10]
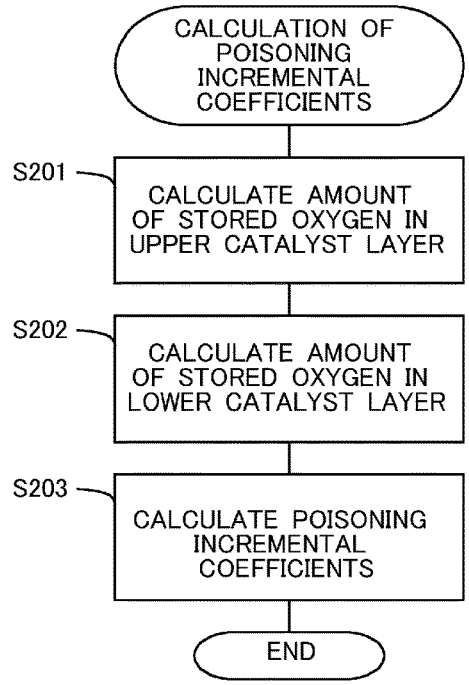

[Fig. 11]
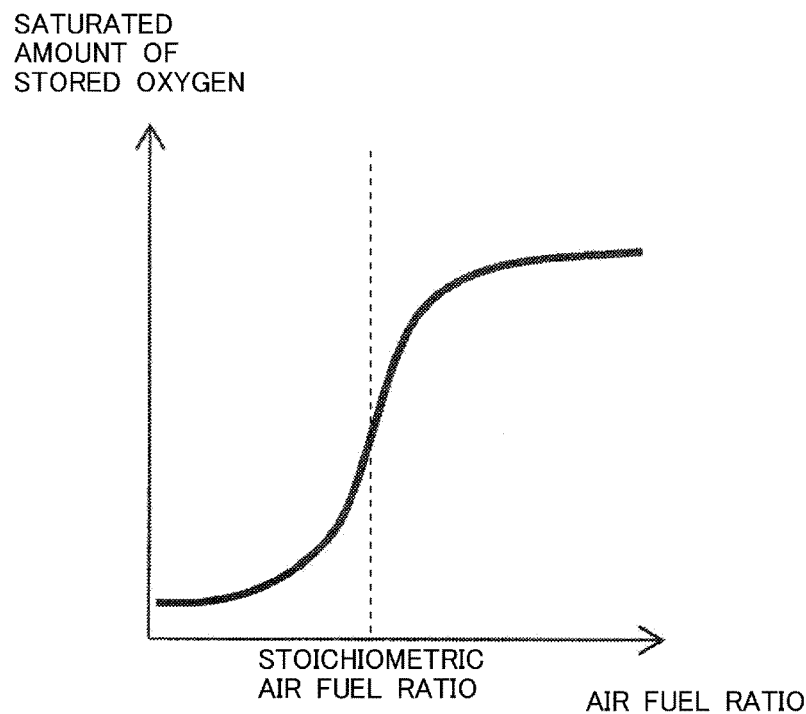
[Fig. 12]
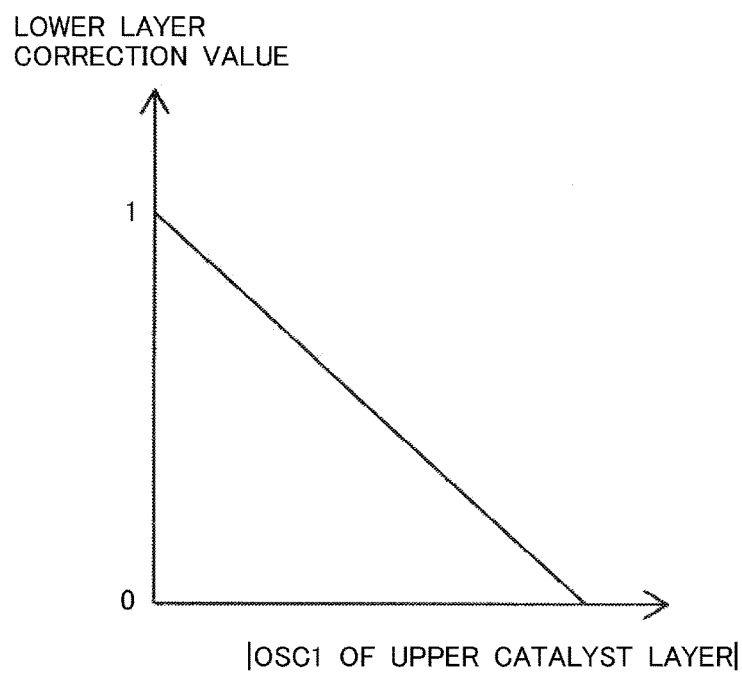

[Fig. 13]
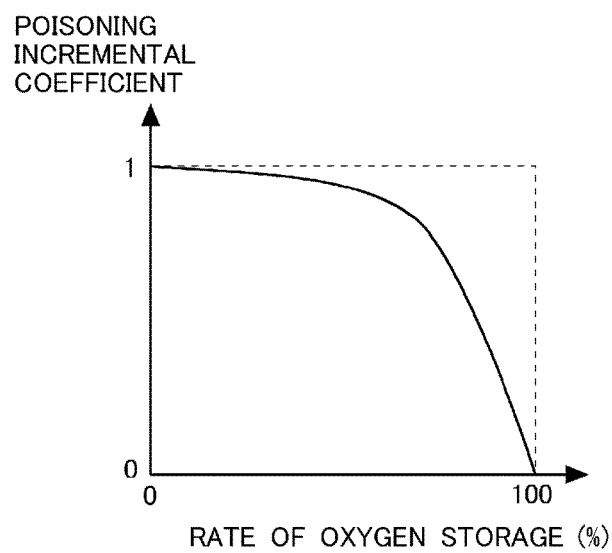

[Fig. 14]
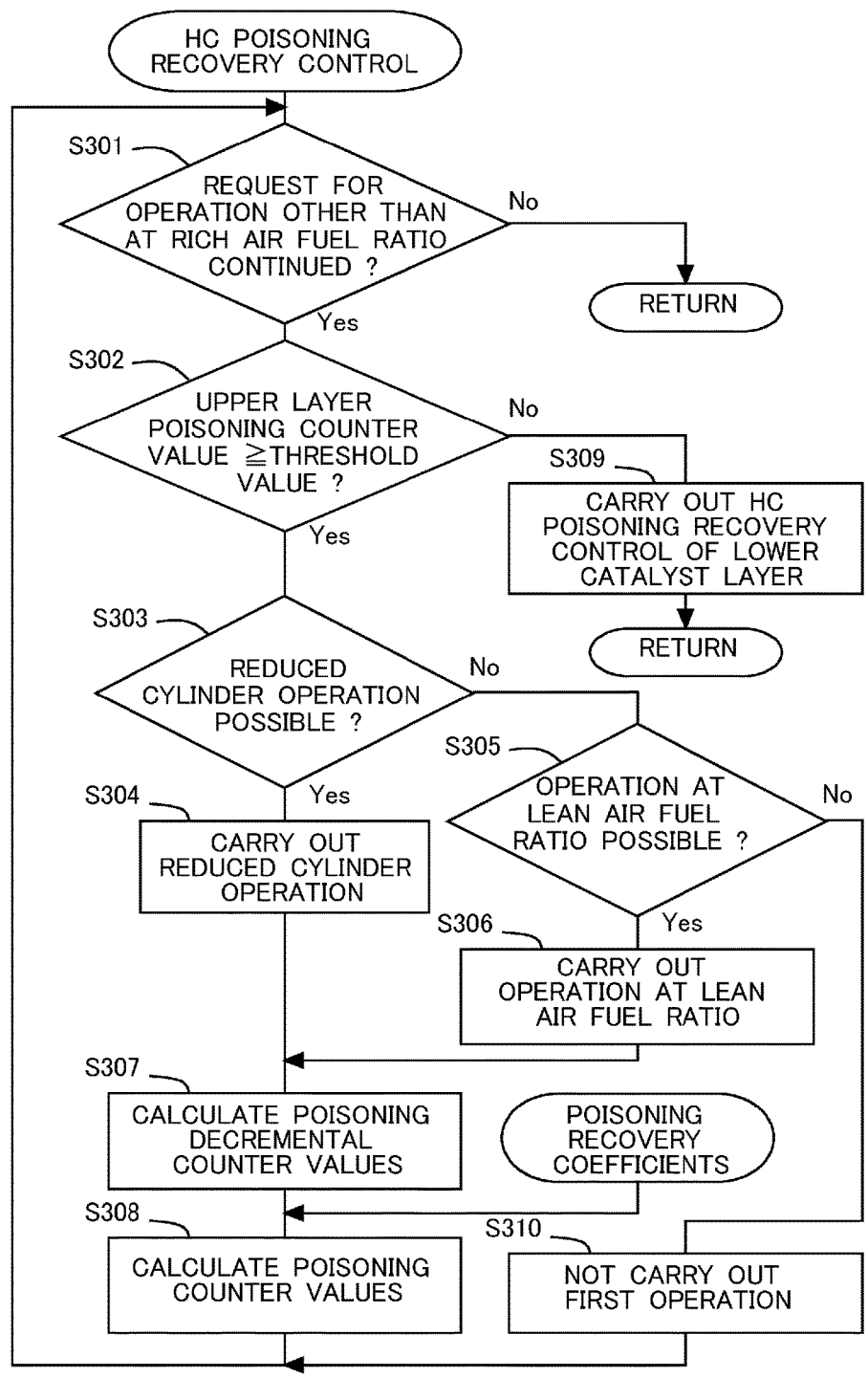

[Fig. 15]
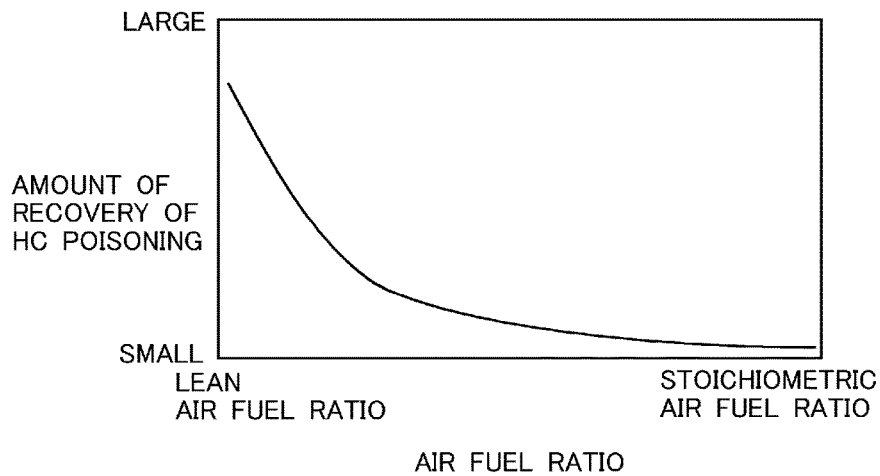
[Fig. 16]
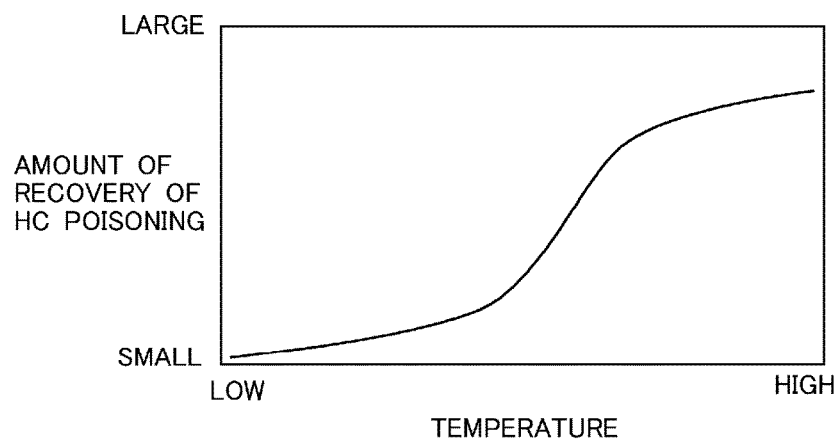
[Fig. 17]
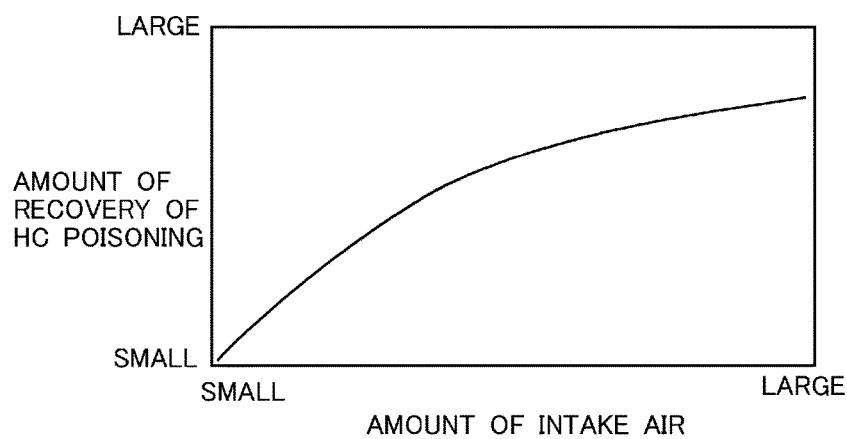

[Fig. 18]
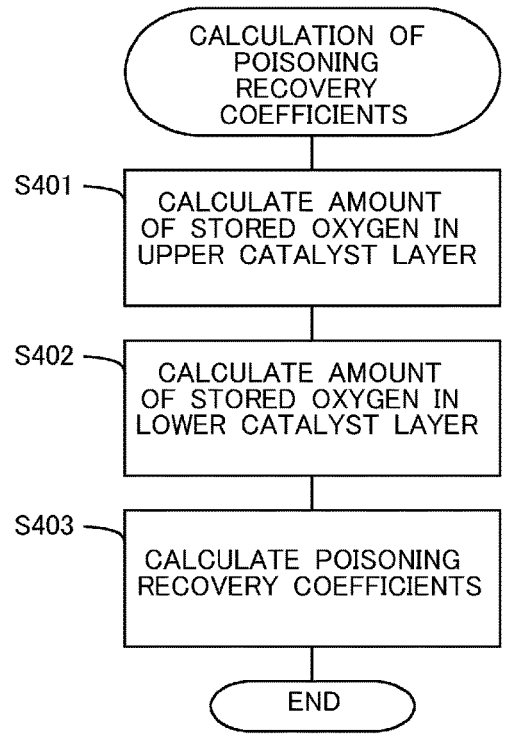
[Fig. 19]
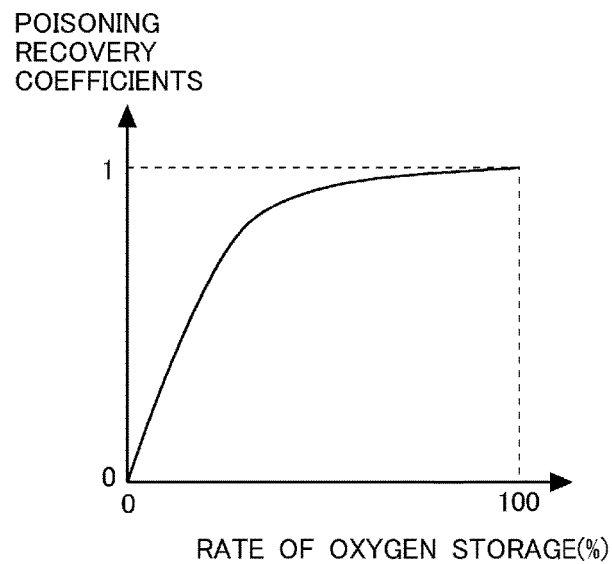

[Fig. 20]
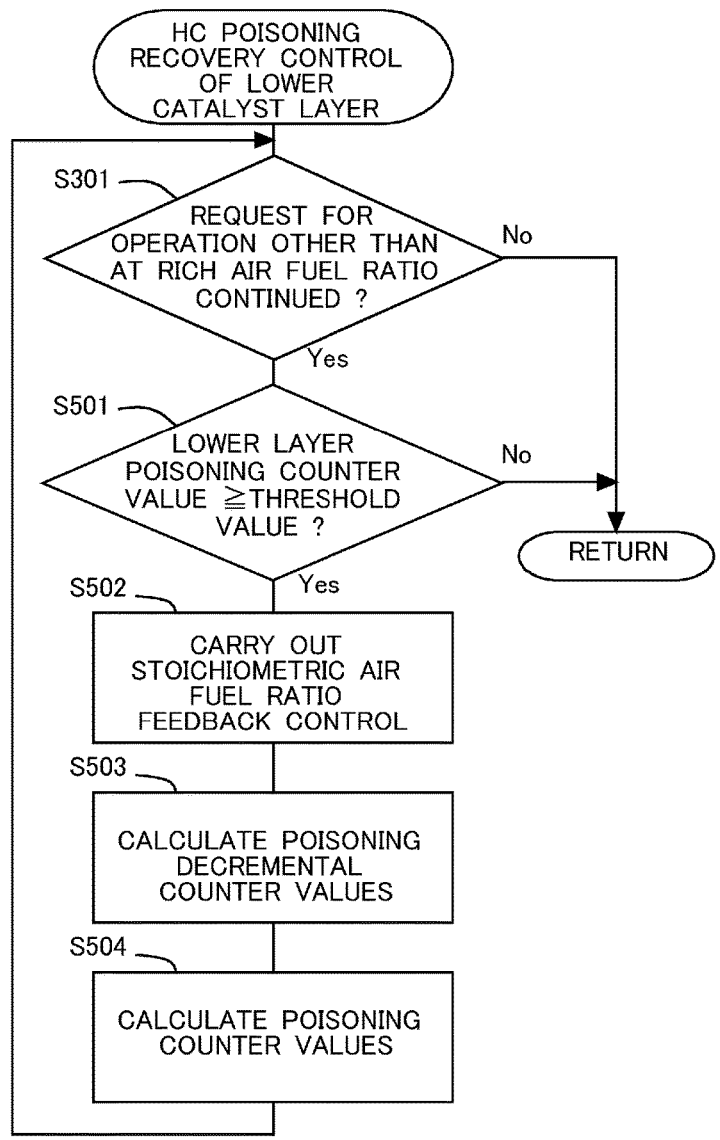

[Fig. 21]
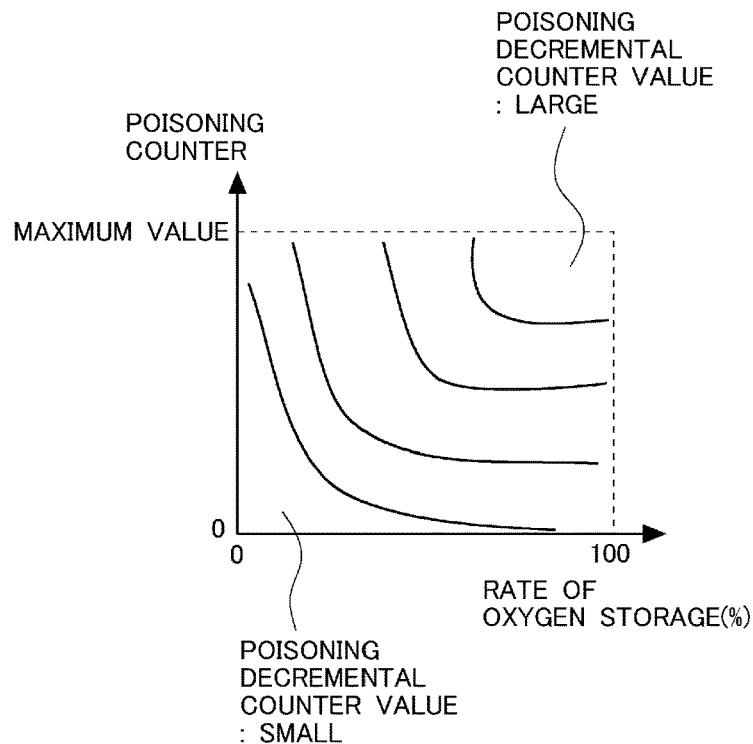
[Fig. 22]
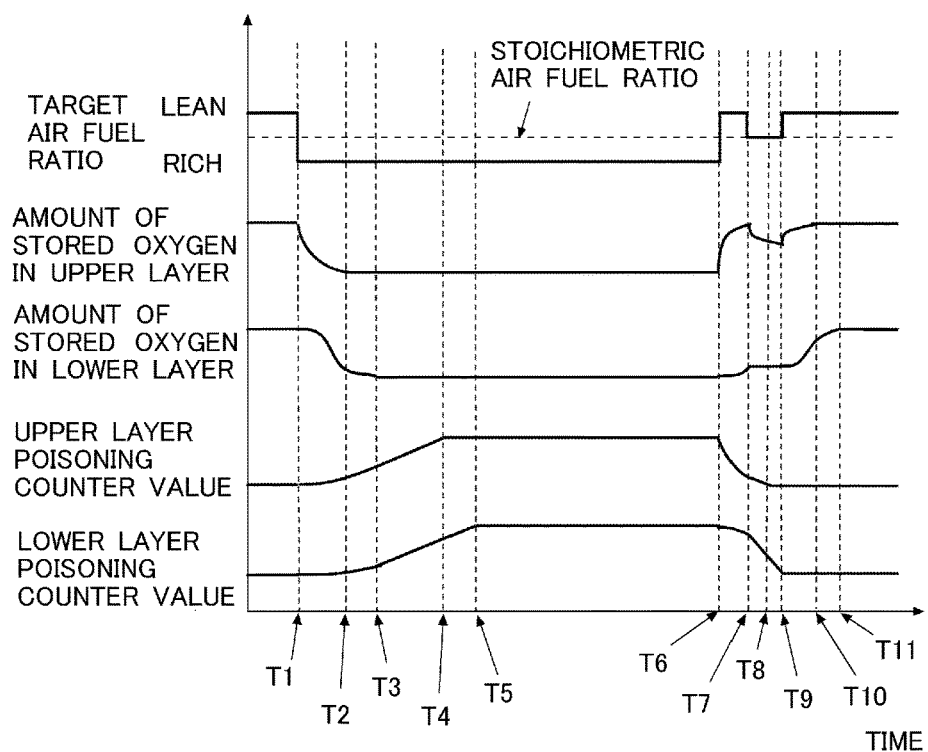

[Fig. 23]
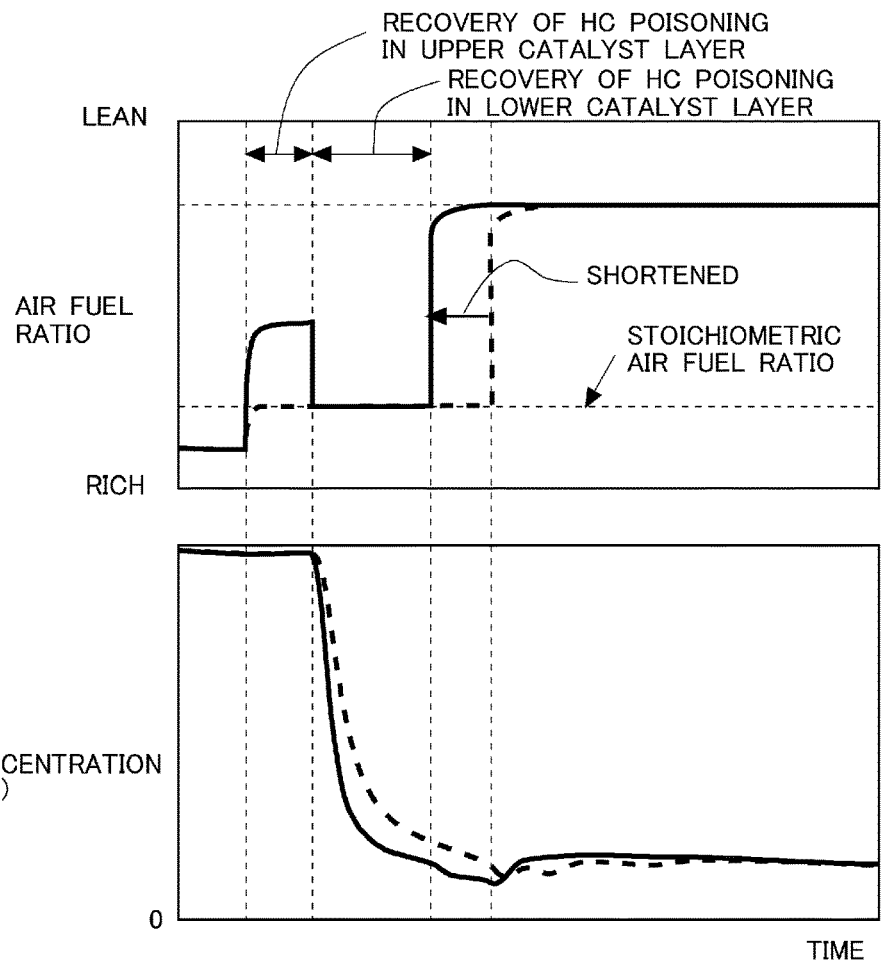
[Fig. 24]
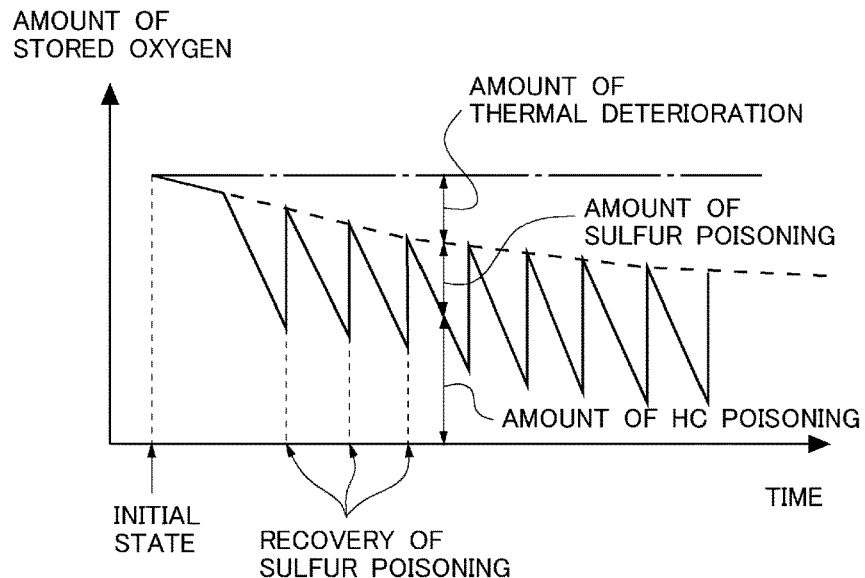

[Fig. 25]
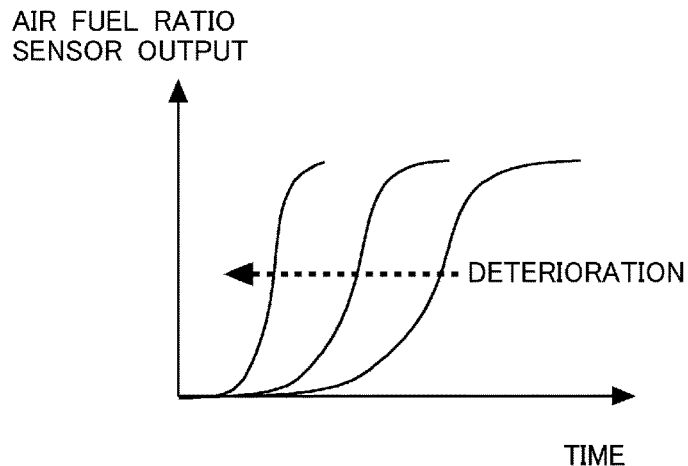
[Fig. 26]
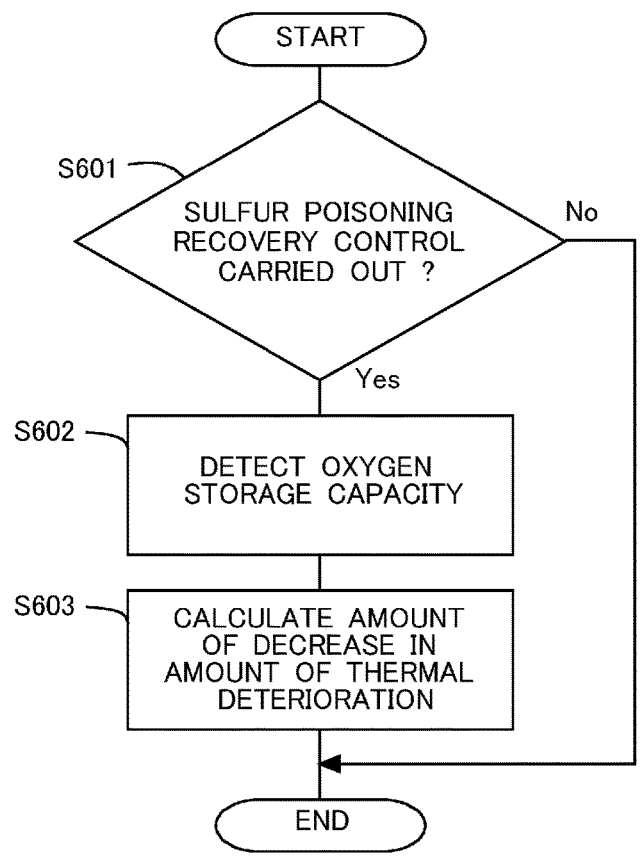

[Fig. 27]
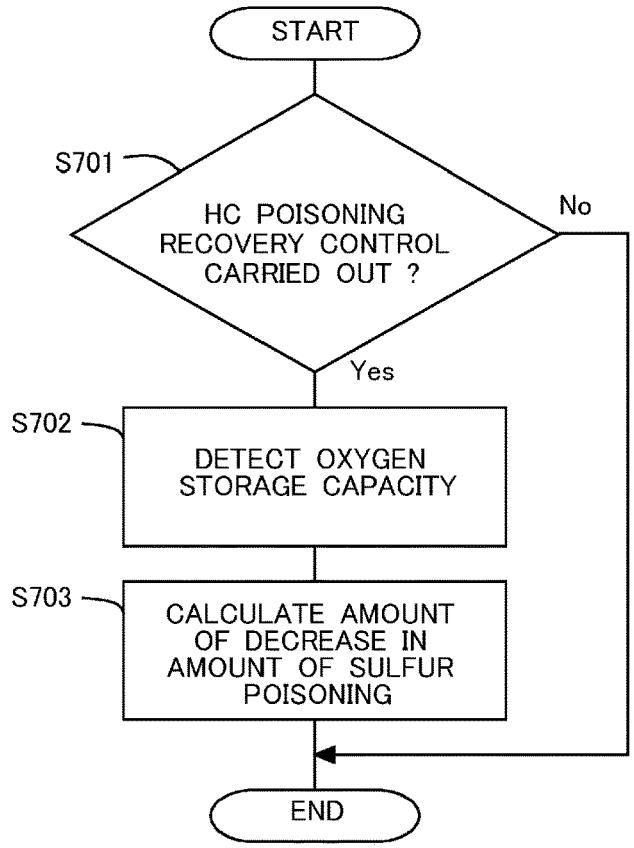
[Fig. 28]
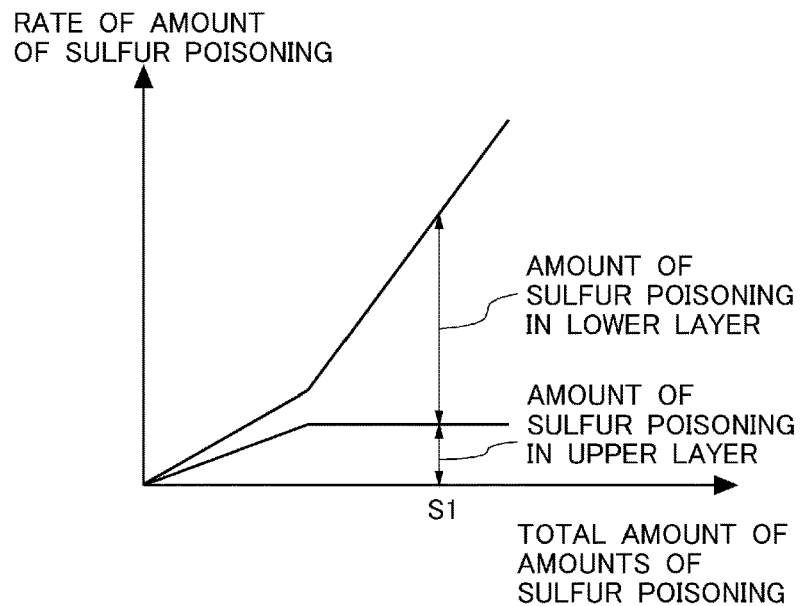

[Fig. 29]
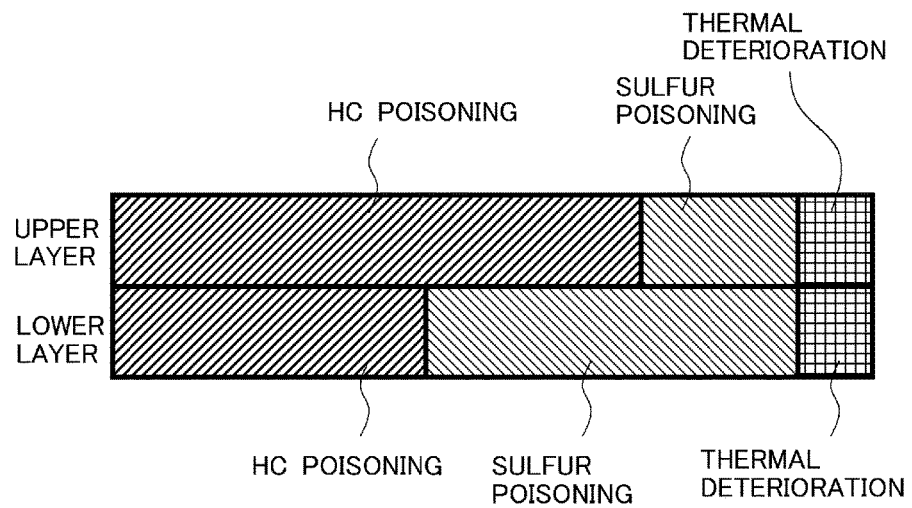
[Fig. 30]
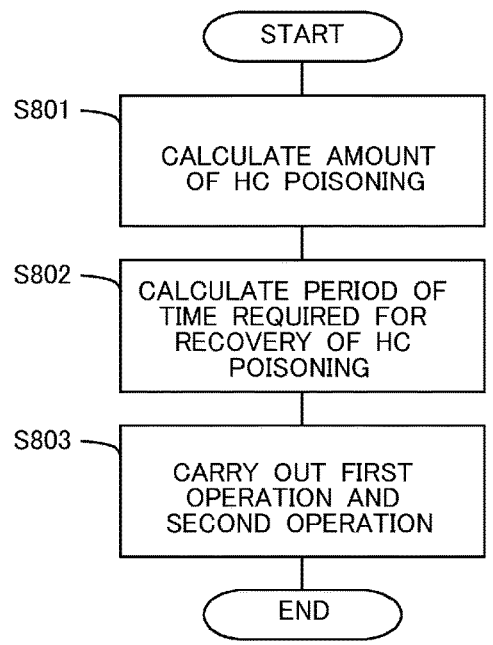

[Fig. 31]
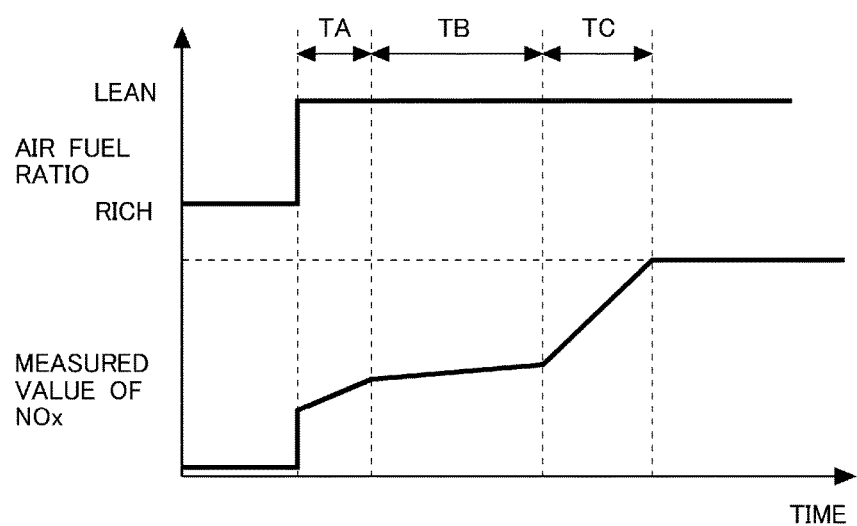

[Fig. 32]
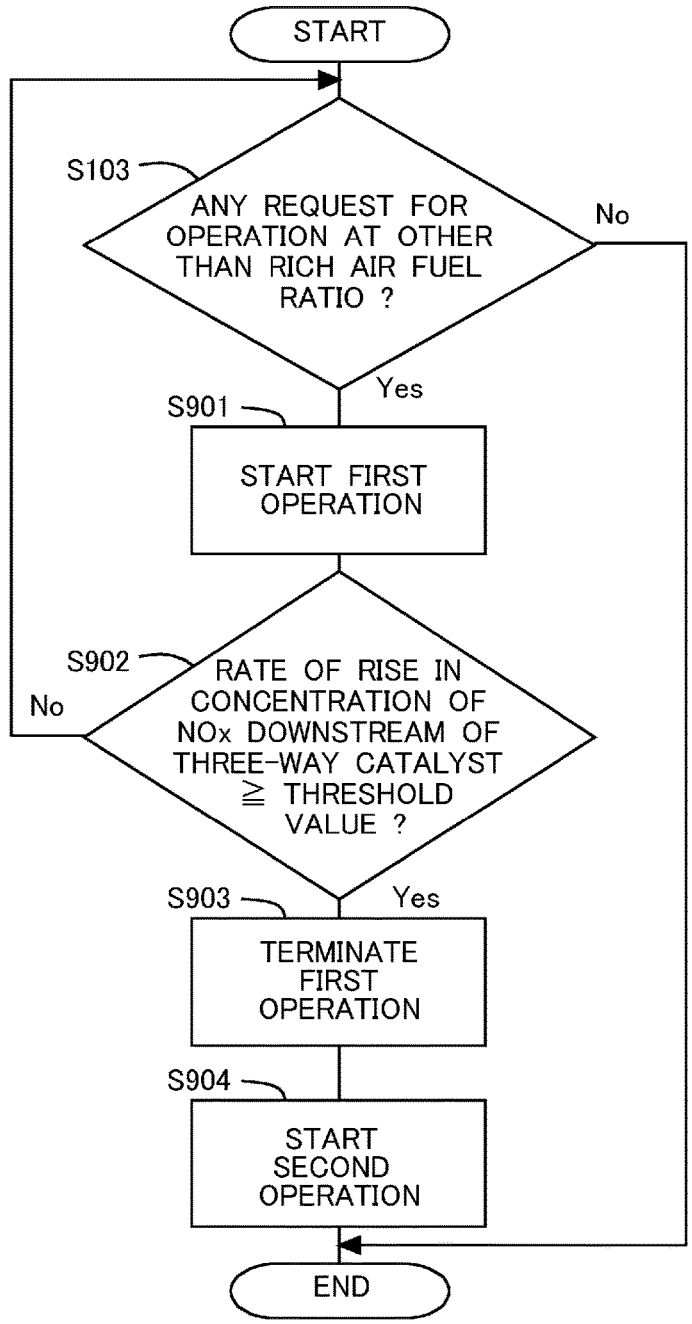

[Fig. 33]
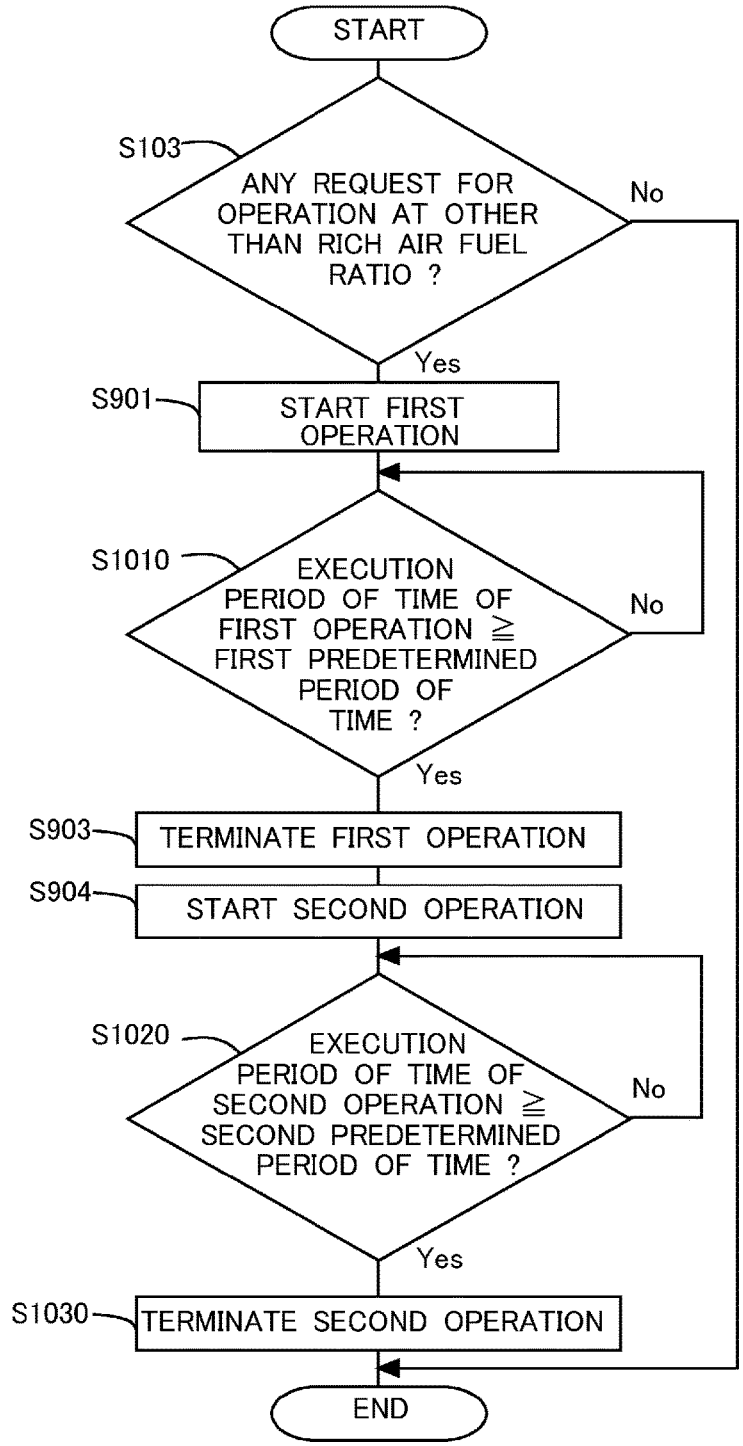

CONTROL SYSTEM FOR AN INTERNAL COMBUSTION ENGINE

CROSS-REFERENCE TO RELATED APPLICATIONS

This application is a National Stage of International Application PCT/JP2015/001514 filed on Mar. 18, 2015, which claims priority to Japanese Patent Application No. 2014-072498, filed Mar. 31, 2014, the entire contents of which are hereby incorporated by reference.

TECHNICAL FIELD

The present disclosure relates to a control system for an internal combustion engine.

BACKGROUND ART

Harmful substances contained in the exhaust gas of an internal combustion engine can be purified or removed by means of a catalyst. It is known that when a large amount of HC flows into this catalyst, HC poisoning will occur. The purification or removal performance of the catalyst is decreased due to this HC poisoning. On the other hand, it is also known that in cases where HC poisoning has occurred, oxygen is supplied to the catalyst thereby to recover the HC poisoning, by making the air fuel ratio of a mixture higher than a stoichiometric air fuel ratio (for example, refer to a first patent literature).

Here, in a lean burn internal combustion engine having a three-way catalyst which is operated at an air fuel ratio higher than the stoichiometric air fuel ratio (hereinafter, also referred to as a lean air fuel ratio), it may be operated at an air fuel ratio lower than the stoichiometric air fuel ratio (hereinafter, also referred to as a rich air fuel ratio). In such an internal combustion engine, HC poisoning may occur in the three-way catalyst during the operation thereof at a rich air fuel ratio. This HC poisoning is recovered when the internal combustion engine is thereafter operated at a lean air fuel ratio. However, the exhaust gas purifying ability of the three-way catalyst is low until the HC poisoning is recovered, so that a part of hydrocarbon (HC) flowing into the three-way catalyst during that period (HC poisoning) may pass through the three-way catalyst without being oxidized therein. Accordingly, in the case where the HC poisoning of the three-way catalyst has occurred, it is desirable to recover the three-way catalyst from the HC poisoning at an early stage.

Note that in the three-way catalyst, on a lower catalyst layer including an oxygen occlusion or storage agent and a precious metal, there may further be disposed an upper catalyst layer including an oxygen storage agent and a precious metal. That is, the catalyst layers are stacked or laminated one over the other. Here, when the internal combustion engine is operated at a lean air fuel ratio in the case where HC poisoning has occurred in the upper catalyst layer and the lower catalyst layer, first of all, the HC poisoning of the upper catalyst layer will mainly be recovered, and thereafter, the HC poisoning of the lower catalyst layer will be recovered. However, it is considered that in the lower catalyst layer, even if the internal combustion engine is operated at a lean air fuel ratio after HC poisoning has occurred, oxygen is first occluded or stored by the oxygen storage agent which has a high reactivity with oxygen, and thereafter, the reaction of HC attached to the precious metal and oxygen occurs. For this reason, in order to recover the HC poisoning of the lower catalyst layer by operating the internal combustion engine at a lean air fuel ratio, it is necessary to wait until oxygen is stored in the oxygen storage agent of the lower catalyst layer, and hence, a certain period of time is required by the time the HC poisoning of the lower catalyst layer is recovered.

CITATION LIST

Patent Literature

[PTL 1] Japanese patent laid-open publication No. 2007-046494
[PTL 2] Japanese patent laid-open publication No. 2009-024521

SUMMARY

The present disclosure has been made in view of the problems as mentioned above, and the object of the disclosure is to recover HC poisoning of a catalyst at an early stage.

In order to achieve the above-mentioned object, the present disclosure resides in a control system for an internal combustion engine which comprises:

an exhaust gas purification catalyst that is arranged in an exhaust passage of the internal combustion engine, and has a lower catalyst layer including an oxygen storage agent and a precious metal, and an upper catalyst layer disposed at the upper side of said lower catalyst layer and including an oxygen storage agent and a precious metal; and a control device that switches the internal combustion engine from one operation in which an air fuel ratio of the exhaust gas flowing into said exhaust gas purification catalyst is lower than a stoichiometric air fuel ratio, to another operation in which the air fuel ratio becomes a target lean air fuel ratio which is higher than the stoichiometric air fuel ratio, said control device switching the internal combustion engine to the operation at said target lean air fuel ratio, through a first operation in which the air fuel ratio of the exhaust gas flowing into said exhaust gas purification catalyst is temporarily made higher than the stoichiometric air fuel ratio, and a second operation which is carried out after said first operation and in which the air fuel ratio of the exhaust gas flowing into said exhaust gas purification catalyst is made to alternately change a plurality of times between a state where it is lower than the stoichiometric air fuel ratio and a state where it is higher than the stoichiometric air fuel ratio.

The target lean air fuel ratio is a final target air fuel ratio of the internal combustion engine at the time of switching over from a rich air fuel ratio to a lean air fuel ratio. The control device carries out the first operation and the second operation, before the operation of the internal combustion engine is carried out at the target lean air fuel ratio. When the air fuel ratio of the exhaust gas is switched over from the rich air fuel ratio into the target lean air fuel ratio, HC poisoning may have occurred in the exhaust gas purification catalyst. Here, by carrying out the first operation by the time the air fuel ratio finally arrives at the target lean air fuel ratio from the rich air fuel ratio, a large amount of oxygen can be supplied to the exhaust gas purification catalyst. At this time, it is considered that the HC poisoning of the upper catalyst layer is recovered first of all. In the upper catalyst layer, there exists a sufficient amount of oxygen, so oxygen can be supplied to the oxygen storage agent and the precious metal at the same time. However, during the time oxygen is being stored in the oxygen storage agent in the upper catalyst layer or oxygen is being used for the oxidation of HC, it is difficult for oxygen to reach the lower catalyst layer. That is, it is considered that oxygen arrives at the lower catalyst layer, after the HC poisoning of the upper catalyst layer has been recovered. For this reason, by the time oxygen arrives at the lower catalyst layer, while passing through the upper catalyst layer, a certain period of time will be required. In addition, even if oxygen arrives at the lower catalyst layer, the amount of the oxygen is small, so it is considered that the oxygen is first occluded or stored in the oxygen storage agent which is highly reactive with the oxygen. In cases where the first operation is continued, after a large amount of oxygen is stored in the oxygen storage agent of the lower catalyst layer, the HC attached or adhered to the precious metal of the lower catalyst layer then reacts with oxygen. In that case, if the lean air fuel ratio by the first operation is maintained, the HC poisoning of the lower catalyst layer will be recovered, after a large amount of oxygen has been stored in the oxygen storage agent of the lower catalyst layer, and hence, a certain period of time is required by the time the HC poisoning of the lower catalyst layer is recovered.

Accordingly, when the second operation is carried out after the internal combustion engine is operated temporarily at a lean air fuel ratio in the first operation, oxygen will be stored in the oxygen storage agent of the lower catalyst layer when the air fuel ratio of the exhaust gas is a lean air fuel ratio in the second operation, but when the air fuel ratio is a rich air fuel ratio in the second operation, oxygen will be released from the oxygen storage agent of the lower catalyst layer. This oxygen released from the oxygen storage agent of the lower catalyst layer easily reacts with the HC attached to the precious metal of the lower catalyst layer. As a consequence, by changing the air fuel ratio between a lean air fuel ratio and a rich air fuel ratio in an alternate manner, it is possible to remove the HC attached to the precious metal of the lower catalyst layer is in an efficient manner. In this case, it is not necessary to wait for a large amount of oxygen to be stored in the oxygen storage agent of the lower catalyst layer.

That is, by carrying out the first operation, the HC poisoning of the upper catalyst layer can mainly be quickly recovered. Thereafter, by carrying out the second operation, the HC poisoning of the lower catalyst layer can mainly be quickly recovered.

Here, note that a period of time in which the first operation is carried out is made longer as compared with a period of time in which the air fuel ratio becomes a lean air fuel ratio per one time during the second operation. In the first operation, the air fuel ratio of the exhaust gas may also be made to be a lean air fuel ratio, by performing combustion at a lean air fuel ratio in the internal combustion engine, but instead of this, in the internal combustion engine, combustion may be carried out at a rich air fuel ratio or at the stoichiometric air fuel ratio, and air may be introduced into the exhaust gas. That is, the air fuel ratio of the exhaust gas need only become a lean air fuel ratio, by the time the exhaust gas flows into the exhaust gas purification catalyst.

When the air fuel ratio of the exhaust gas is made to be a rich air fuel ratio in the second operation, there will be a fear that if the air fuel ratio is too low, or if the period of time in which the air fuel ratio is made to be the rich air fuel ratio is too long, new HC poisoning may occur. On the other hand, when the air fuel ratio of the exhaust gas is made to be a lean air fuel ratio in the second operation, if the air fuel ratio, being higher than the stoichiometric air fuel ratio, is too low, or if the period of time in which the air fuel ratio is made to be a lean air fuel ratio is too short, the amount of oxygen stored in the oxygen storage agent in the lower catalyst layer becomes smaller, thus making it difficult to recover the HC poisoning by means of the oxygen to be released subsequently when the air fuel ratio is made to be a rich air fuel ratio. Accordingly, the air fuel ratio and the time of duration of the rich air fuel ratio in the second operation at the time when the air fuel ratio is made to be the rich air fuel ratio may also be set as an air fuel ratio and a time of duration, respectfully, at and in which new HC poisoning does not occur. In addition, the air fuel ratio and the duration of the rich air fuel ratio in the second operation at the time when the air fuel ratio is made to be the rich air fuel ratio may also be set as an air fuel ratio and a period of time, respectfully, at and in which oxygen can be occluded or stored in the oxygen storage agent of the lower catalyst layer. In order to make it possible to recover the HC poisoning by means of the oxygen to be released from the oxygen storage agent of the lower catalyst layer subsequently when the air fuel ratio is made to be a rich air fuel ratio, the air fuel ratio and the time of duration may be set in such a manner that the oxygen can be stored into the oxygen storage catalyst of the lower catalyst layer.

Thus, in cases where the air fuel ratio is simply switched to the target lean air fuel ratio at the time of switching the air fuel ratio from the rich air fuel ratio to the target lean air fuel ratio, it is difficult to recover the HC poisoning in the lower catalyst layer until the time oxygen is stored in the oxygen storage agent of the lower catalyst layer to a sufficient extent, but by changing the air fuel ratio of the exhaust gas over between a rich air fuel ratio and a lean air fuel ratio after the air fuel ratio is temporarily made to be a lean air fuel ratio, it is possible to recover the HC poisoning in the lower catalyst layer, even before a large amount of oxygen is stored in the oxygen storage agent of the lower catalyst layer. As a result of this, the period of time required to recover the HC poisoning can be shortened.

Here, note that by means of the first operation, the HC poisoning of the lower catalyst layer can also be partially recovered, and by means of the second operation, the HC poisoning of the upper catalyst layer can also be partially recovered, and hence, the timing of changing from the first operation to the second operation is not limited to the point in time at which the recovery of the HC poisoning of the upper catalyst layer has been completed, but may shift somewhat before and after that time point. The first operation and the second operation need only be carried out sequentially at the time when the air fuel ratio of the exhaust gas is switched over from a rich air fuel ratio to the target lean air fuel ratio.

Said control device can alternately change a plurality of times the air fuel ratio of the exhaust gas flowing into said exhaust gas purification catalyst between a state where it is lower than the stoichiometric air fuel ratio and a state where it is higher than the stoichiometric air fuel ratio, by making low the air fuel ratio of the exhaust gas in the case where the air fuel ratio of the exhaust gas flowing into said exhaust gas purification catalyst is higher than the stoichiometric air fuel ratio, and by making high the air fuel ratio of the exhaust gas in the case where the air fuel ratio of the exhaust gas flowing into said exhaust gas purification catalyst is lower than the stoichiometric air fuel ratio, in said second operation.

By changing the air fuel ratio of the exhaust gas in a lower direction in the case where the air fuel ratio of the exhaust gas flowing into said exhaust gas purification catalyst is a lean air fuel ratio, and by changing the air fuel ratio of the exhaust gas in a higher direction in the case where the air fuel ratio of the exhaust gas flowing into said exhaust gas purification catalyst is a rich air fuel ratio, the air fuel ratio of the exhaust gas flowing into said exhaust gas purification catalyst changes between the state where it is lower than the stoichiometric air fuel ratio and the state where it is higher than the stoichiometric air fuel ratio, in an alternate manner. At this time, the air fuel ratio of the exhaust gas, though having become the lean air fuel ratio or the rich air fuel ratio, is close to the stoichiometric air fuel ratio. In addition, because the air fuel ratio switches in a relatively short period, the oxygen stored in the oxygen storage agent can be made to release therefrom in the short period. As a result of this, it is possible to promote the recovery of the HC poisoning. In order to change the air fuel ratio of the exhaust gas, the amount of fuel to be supplied to the internal combustion engine or the amount of intake air in the internal combustion engine, for example, may be made to change. The rich air fuel ratio in the second operation may also be an air fuel ratio higher than the rich air fuel ratio which is before the first operation is carried out, and the lean air fuel ratio in the second operation may also be an air fuel ratio lower than the lean air fuel ratio in the first operation or the target lean air fuel ratio. However, the rich air fuel ratio in the second operation may also be the same as the rich air fuel ratio before the first operation is carried out, and the lean air fuel ratio in the second operation may also be the same as the lean air fuel ratio in the first operation or the target lean air fuel ratio.

Said control device can carry out said first operation until the HC poisoning of said upper catalyst layer is recovered, and can carry out said second operation until the HC poisoning of said lower catalyst layer is recovered.

By carrying out the first operation, oxygen can be supplied to the exhaust gas purification catalyst, but it takes a relatively long time to recover the HC poisoning of the lower catalyst layer. Accordingly, the first operation is carried out until the HC poisoning of the upper catalyst layer is recovered. By carrying out the first operation, the HC poisoning of the upper catalyst layer can be recovered quickly. On the other hand, by recovering the HC poisoning of the lower catalyst layer by carrying out the second operation, it is possible to recover the HC poisoning of the lower catalyst layer, even without waiting for a large amount of oxygen to be stored in the oxygen storage agent of the lower catalyst layer. As a result of this, the period of time required to recover the HC poisoning can be shortened to a further extent.

Provision can further be made for a determination unit that determines whether HC poisoning has occurred in each of said upper catalyst layer and said lower catalyst layer, wherein said control device can carry out said first operation in cases where said determination unit makes a determination that HC poisoning has occurred in said upper catalyst layer, and also can carry out said second operation in cases where said determination unit makes a determination that HC poisoning has occurred in said lower catalyst layer.

The first operation is suitable for recovering the HC poisoning of the upper catalyst layer, whereas the second operation is suitable for recovering the HC poisoning of the lower catalyst layer. Accordingly, when the HC poisoning of the upper catalyst layer is made to recover, the first operation should only be carried out, whereas when the HC poisoning of the lower catalyst layer is made to recover, the second operation should only be carried out. In addition, depending on the operating state of the internal combustion engine or the stage of progress of the recovery of HC poisoning, HC poisoning may have occurred in either one of the upper catalyst layer and the lower catalyst layer. In this case, simplification of the control may be attained by carrying out either one of the first operation and the second operation.

Provision may further be made for an NOx storage reduction catalyst and an NOx selective catalytic reduction catalyst that are arranged sequentially in the direction of flow of the exhaust gas, at the downstream side of said exhaust gas purification catalyst.

Here, the NOx storage reduction catalyst (hereinafter, also referred to as an NSR catalyst) can store NOx when the air fuel ratio of the exhaust gas is a lean air fuel ratio. Note that the word "storage" is used as a term which includes temporary adsorption of NOx as well. The NOx stored in the NSR catalyst is released from the NSR catalyst when the air fuel ratio is the stoichiometric air fuel ratio or a rich air fuel ratio, and at this time, the NOx is reduced when a reducing agent (e.g., HC) exists. Here, when the first operation is carried out, the reduction of NOx is difficult in the exhaust gas purification catalyst in which HC poisoning has occurred. On the other hand, with the provision of the NSR catalyst at the downstream side of the exhaust gas purification catalyst, NOx can be stored therein during the first operation.

However, when the second operation is carried out after that time, the air fuel ratio of the exhaust gas can become the stoichiometric air fuel ratio or a rich air fuel ratio, so that NOx can be released from the NSR catalyst. When the air fuel ratio of the exhaust gas is the vicinity of the stoichiometric air fuel ratio, the amount of HC, etc., which acts as a reducing agent, is small, so the reduction of NOx in the NSR catalyst can become difficult. Accordingly, there is a fear that NOx may flow out of the NSR catalyst during the second operation. However, the NOx flowing out of the NSR catalyst can be reduced by means of the NOx selective catalytic reduction catalyst (hereinafter, also referred to as an SCR catalyst) which is arranged at the further downstream side of the NSR catalyst.

Here, the SCR catalyst adsorbs ammonia as the reducing agent, for example, and reduces NOx with the ammonia. This ammonia can be generated in the NSR catalyst. Accordingly, if ammonia has been made to adsorb to the SCR catalyst in advance, the NOx flowing out of the NSR catalyst in the second operation can be reduced in the SCR catalyst.

Said control device can temporarily make the air fuel ratio of the exhaust gas flowing into said exhaust gas purification catalyst higher than the stoichiometric air fuel ratio, by carrying out stratified charge combustion in said internal combustion engine in said first operation.

Here, the air fuel ratio of the exhaust gas can be made to be a lean air fuel ratio by means of homogeneous charge combustion, but in the homogeneous charge combustion, there is a fear that when the air fuel ratio is made too high, the combustion state may deteriorate, thereby increasing the amount of discharge of HC from the internal combustion engine. On the other hand, the stratified charge combustion can make the air fuel ratio higher, while suppressing the discharge of HC. For this reason, the HC poisoning of the upper catalyst layer can be recovered quickly. Here, note that when the stratified charge combustion is carried out, the amount of discharge of NOx may increase. In this case, with the provision of the NSR catalyst and the SCR catalyst which are arranged at the downstream side of the exhaust gas purification catalyst, it is possible to reduce the NOx.

Said internal combustion engine is provided with a plurality of cylinders, and said control device can temporarily make the air fuel ratio of the exhaust gas flowing into said exhaust gas purification catalyst higher than the stoichiometric air fuel ratio, by carrying out a reduced cylinder operation to stop the supply of fuel in a part of the cylinders of said internal combustion engine in said first operation.

By carrying out the reduced cylinder operation, air can be made to discharge from the part of the cylinders. Accordingly, even if combustion at the stoichiometric air fuel ratio is carried out in the other cylinders, the air fuel ratio of the exhaust gas flowing into the exhaust gas purification catalyst becomes a lean air fuel ratio. In addition, in those cylinders in which combustion is carried out, the amount of discharge of NOx or HC can be decreased. Here, note that in those cylinders in which combustion is carried out, combustion may be performed at a lean air fuel ratio. In cases where combustion is performed at a lean air fuel ratio, stratified charge combustion or homogeneous charge combustion may be carried out.

Provision can further be made for an NOx sensor that detects the concentration of NOx in exhaust gas at the downstream side of said exhaust gas purification catalyst and at the upstream side of said NOx storage reduction catalyst, wherein when carrying out said first operation, said control device can switch the operation of said internal combustion engine from said first operation to said second operation, in cases where the rate of rise in the concentration of NOx detected by said NOx sensor becomes equal to or more than a threshold value.

Alternatively, provision can further be made for an NOx sensor that detects the concentration of NOx in exhaust gas at the downstream side of said exhaust gas purification catalyst, wherein when carrying out said first operation, said control device can switch the operation of said internal combustion engine from said first operation to said second operation, in cases where the rate of rise in the concentration of NOx detected by said NOx sensor becomes equal to or more than a threshold value.

Here, the HC attached or adhered to the upper catalyst layer or the lower catalyst layer is oxidized not only by oxygen, but also by NOx. When the first operation is carried out, the oxidation of the HC attached to the precious metal and the occlusion or storage of oxygen by the oxygen storage agent will occur in the upper catalyst layer. At this time, oxygen is consumed in the upper catalyst layer, so the amount of oxygen, which will arrive at the lower catalyst layer, is small. In addition, in the upper catalyst layer, a part of the HC is oxidized by NOx. Although oxygen does not substantially arrive at the lower catalyst layer at this time, NOx may arrive there. That is, unlike oxygen, NOx is not stored in the upper catalyst layer, so a large amount of NOx arrives at the lower catalyst layer. With this NOx, the HC in the lower catalyst layer is oxidized. In this manner, the NOx in the exhaust gas recovers the HC poisoning of the upper catalyst layer and the lower catalyst layer. At this time, the NOx is consumed for the oxidation of HC in the upper catalyst layer and the lower catalyst layer, so that the concentration of NOx in the exhaust gas at the downstream side of the exhaust gas purification catalyst is decreased by the amount of NOx thus consumed. Then, the NOx to be consumed for the oxidation of HC is decreasing in accordance with the decreasing amount of the HC in the upper catalyst layer and the lower catalyst layer, so that the concentration of NOx in the exhaust gas at the downstream side of the exhaust gas purification catalyst is rising.

When the first operation is further continued, the HC poisoning of the upper catalyst layer will be recovered. In addition, oxygen is being stored in the oxygen storage agent of the upper catalyst layer. In such a case, because HC does not exist in the upper catalyst layer, NOx does not react in the upper catalyst layer. NOx is not consumed in the upper catalyst layer, so the concentration of NOx in the exhaust gas at the downstream side of the exhaust gas purification catalyst becomes high. On the other hand, HC and NOx in the lower catalyst layer react with each other until a sufficient amount of oxygen is supplied to the lower catalyst layer. When HC and NOx are reacting with each other in the lower catalyst layer, the concentration of NOx in the exhaust gas at the downstream side of the exhaust gas purification catalyst is decreased by the amount of NOx thus reacted or consumed. Then, the NOx to be consumed for the oxidation of HC is decreasing in accordance with the decreasing amount of the HC in the lower catalyst layer, so that the concentration of NOx in the exhaust gas at the downstream side of the exhaust gas purification catalyst is rising.

When the first operation is further continued, oxygen is stored in the lower catalyst layer and at the same time, a part of the oxygen may react with the HC which has been attached to the lower catalyst layer. When the HC and the oxygen begin to react with each other in the lower catalyst layer, the amount of NOx to react with the HC decreases, so that the concentration of NOx in the exhaust gas flowing out of the exhaust gas purification catalyst goes up. In such a case, because oxygen is stored in the oxygen storage agent of the lower catalyst layer, the efficiency to recover the HC poisoning is higher when the first operation is switched to the second operation, than when the first operation is carried out continuously. Accordingly, at this time, it is desirable to carry out the second operation.

In this manner, the concentration of NOx in the exhaust gas at the downstream side of the exhaust gas purification catalyst changes depending on the state of the HC poisoning of the lower catalyst layer. In cases where HC and oxygen begin to react with each other in the lower catalyst layer, it is considered that the oxygen is stored in the oxygen storage agent of the lower catalyst layer, so it is better to switch to the second operation. Accordingly, in cases where the rate of rise in the concentration of NOx at the downstream side of the exhaust gas purification catalyst becomes equal to or more than a threshold value, the HC poisoning can be quickly recovered by switching from the first operation to the second operation. Here, note that the threshold value can be set as the rate of rise in the concentration of NOx at the time when the reaction of HC and oxygen begins in the lower catalyst layer. The rate of rise in the concentration of NOx may also be an amount of rise in the concentration of NOx per unit time, or may also be an amount of rise in the concentration of NOx in a predetermined period of time.

In each of said upper catalyst layer and said lower catalyst layer, said control device can calculate an amount of decrease in the amount of oxygen stored in said exhaust gas purification catalyst due to thermal deterioration, based on an amount of oxygen stored in said exhaust gas purification catalyst obtained in a state where the HC poisoning and sulfur poisoning of said exhaust gas purification catalyst do not exist, calculate an amount of decrease in the amount of oxygen stored in said exhaust gas purification catalyst due to the sulfur poisoning, based on said amount of decrease in the amount of oxygen stored in said exhaust gas purification catalyst due to thermal deterioration, and an amount of oxygen stored in said exhaust gas purification catalyst obtained in a state where the HC poisoning of said exhaust gas purification catalyst does not exist, calculate an amount of decrease in the amount of oxygen stored in said exhaust gas purification catalyst due to the HC poisoning, based on a value which is obtained by subtracting said amount of decrease due to thermal deterioration and said amount of decrease due to the sulfur poisoning from an amount of oxygen stored in said exhaust gas purification catalyst in its initial state, decide a period of time in which said first operation is carried out, based on an amount of decrease in the amount of oxygen stored in said exhaust gas purification catalyst in said upper catalyst layer due to the HC poisoning, and decide a period of time in which said second operation is carried out, based on an amount of decrease in the amount of oxygen stored in said exhaust gas purification catalyst in said lower catalyst layer due to the HC poisoning.

Here, in the exhaust gas purification catalyst, there may occur deterioration by heat, deterioration by sulfur poisoning, and deterioration by HC poisoning. The deterioration by heat (thermal deterioration) is such that the exhaust gas purification catalyst is deteriorated by heat, and can not be recovered at all. The deterioration by sulfur poisoning is a deterioration which occurs when sulfur components in the exhaust gas are occluded or stored in the exhaust gas purification catalyst, and can be recovered by carrying out sulfur poisoning recovery control. The deterioration by HC poisoning can be recovered by carrying out the first operation and the second operation. The thermal deterioration, the deterioration by sulfur poisoning, and the deterioration by HC poisoning individually decrease the amount of oxygen stored in the exhaust gas purification catalyst.

Here, in a state where the deterioration by sulfur poisoning and the deterioration by HC poisoning do not exist, a maximum amount of oxygen, which can be occluded or stored in the exhaust gas purification catalyst as much as possible, is decreased by an amount of thermal deterioration from that in an initial state. Accordingly, an amount of decrease in the amount of oxygen stored in the exhaust gas purification catalyst due to the thermal deterioration can be obtained by obtaining a maximum value of the amount of oxygen stored in the exhaust gas purification catalyst, and subtracting this maximum value from the amount of oxygen stored therein in the initial state. In addition, in a state where there is no deterioration by HC poisoning, the maximum amount of oxygen to be stored in the exhaust gas purification catalyst is decreased by an amount of thermal deterioration and an amount of sulfur poisoning from that in the initial state. An amount of decrease by thermal deterioration can be obtained as described above. Accordingly, a remaining amount, i.e., the maximum amount minus the amount of thermal deterioration, becomes an amount of deterioration by sulfur poisoning in the amount of oxygen stored in the exhaust gas purification catalyst (hereinafter, also referred to as the amount of stored oxygen). Here, note that the decrease in the amount of stored oxygen by thermal deterioration is slow as compared with the deterioration by sulfur poisoning, and hence, for example, an amount of decrease in the amount of stored oxygen by thermal deterioration obtained the last time can be used as it is.

Then, the amount of decrease in the amount of stored oxygen by HC poisoning can be obtained by subtracting the amount of thermal deterioration and the amount of sulfur poisoning from the amount of stored oxygen in the initial state. Thus, by deciding a period of time in which the first operation or the second operation is carried out according to this amount of decrease in the amount of stored oxygen by HC poisoning, it is possible to suppress the first operation and the second operation from being carried out more than necessary.

Here, it is considered that thermal deterioration progresses similarly in the upper catalyst layer and the lower catalyst layer, so a total amount of thermal deterioration need only be equally divided into two. In addition, the amount of sulfur poisoning can be divided into two between the upper catalyst layer and the lower catalyst layer, at a ratio which is obtained in advance according to the kinds of the precious metals, for example.

According to the present disclosure, the HC poisoning of a catalyst can be recovered at an early stage.

BRIEF DESCRIPTION OF DRAWINGS

FIG. 1 is a view showing the schematic construction of an internal combustion engine according to an embodiment of the present disclosure;

FIG. 2 is a time chart showing the changes over time of an air fuel ratio in a cylinder and a concentration of HC in the exhaust gas flowing out of a three-way catalyst;

FIG. 3A is a view showing the states of an upper catalyst layer and a lower catalyst layer when the air fuel ratio is a rich air fuel ratio;

FIG. 3B is a view showing the states of the upper catalyst layer and the lower catalyst layer immediately after the air fuel ratio has been switched from the rich air fuel ratio into a lean air fuel ratio;

FIG. 3C is a view showing the states of the upper catalyst layer and the lower catalyst layer after a certain amount of oxygen has been occluded or stored into an oxygen storage agent of the upper catalyst layer at the time of the lean air fuel ratio;

FIG. 3D is a view showing the states of the upper catalyst layer and the lower catalyst layer after a certain amount of oxygen has been occluded or stored into an oxygen storage agent of the lower catalyst layer at the time of the lean air fuel ratio;

FIG. 3E is a view showing the states of the upper catalyst layer and the lower catalyst layer at the time when oxygen has been supplied to a precious metal of the lower catalyst layer at the time of the lean air fuel ratio;

FIG. 4 is a view showing the change over time of the air fuel ratio at the time when a first operation and a second operation according to an embodiment of the present disclosure are carried out;

FIG. 5A is a view showing the states of the upper catalyst layer and the lower catalyst layer when the air fuel ratio is a rich air fuel ratio;

FIG. 5B is a view showing the states of the upper catalyst layer and the lower catalyst layer immediately after the air fuel ratio has been switched from the rich air fuel ratio into a lean air fuel ratio in the first operation;

FIG. 5C is a view showing the states of the upper catalyst layer and the lower catalyst layer after a certain amount of oxygen has been occluded or stored into the oxygen storage agent of the upper catalyst layer at the time of the lean air fuel ratio in the first operation;

FIG. 5D is a view showing the states of the upper catalyst layer and the lower catalyst layer immediately after switching from the first operation to the second operation;

FIG. 5E is a view showing the states of the upper catalyst layer and the lower catalyst layer immediately after switching from a rich air fuel ratio operation to a lean air fuel ratio operation in the second operation;

FIG. 5F is a view showing the states of the upper catalyst layer and the lower catalyst layer immediately after switching from the lean air fuel ratio operation to the rich air fuel ratio operation in the second operation;

FIG. 6 is a flow chart showing a flow for determining whether HC poisoning recovery control according to an embodiment is carried out;

FIG. 7 is a view showing the relation between the air fuel ratio and the amount of HC poisoning;

FIG. 8 is a view showing the relation between the temperature of the three-way catalyst and the amount of HC poisoning;

FIG. 9 is a view showing the relation between the amount of intake air in the internal combustion engine and the amount of HC poisoning;

FIG. 10 is a flow chart showing a flow for calculating poisoning incremental coefficients for correcting poisoning incremental counters;

FIG. 11 is a view showing the relation between an air fuel ratio and a saturated amount of stored oxygen;

FIG. 12 is a view for obtaining a lower layer correction value from OSC of the upper catalyst layer;

FIG. 13 is a view showing the relation between a rate of oxygen storage and a poisoning incremental coefficient;

FIG. 14 is a flow chart of HC poisoning recovery control, particularly showing the HC poisoning recovery control in the upper catalyst layer;

FIG. 15 is a view showing the relation between the air fuel ratio and the amount of recovery of HC poisoning;

FIG. 16 is a view showing the relation between the temperature of the three-way catalyst and the amount of recovery of HC poisoning;

FIG. 17 is a view showing the relation between the amount of intake air in the internal combustion engine and the amount of recovery of HC poisoning;

FIG. 18 is a flow chart showing a flow for calculating poisoning recovery coefficients for correcting poisoning decremental counters;

FIG. 19 is a view showing the relation between a rate of oxygen storage and a poisoning recovery coefficient;

FIG. 20 is a flow chart for HC poisoning recovery control in the lower catalyst layer;

FIG. 21 is a view showing the relation between the rate of oxygen storage in the upper catalyst layer or the lower catalyst layer, a poisoning counter, and the poisoning decremental counter;

FIG. 22 is a time chart showing the changes over time of a variety of kinds of values at the time of the HC poisoning recovery control;

FIG. 23 is a time chart showing the changes over time of the air fuel ratio and the concentration of HC in the exhaust gas flowing out of the three-way catalyst, at the time when the air fuel ratio in a cylinder of the internal combustion engine is changed from a rich air fuel ratio to a lean air fuel ratio;

FIG. 24 is a view showing the change over time of the amount of oxygen stored in the three-way catalyst;

FIG. 25 is a time chart showing the changes over time of the air fuel ratio of exhaust gas at the downstream side of the three-way catalyst, at the time when the air fuel ratio of exhaust gas at the upstream side of the three-way catalyst has been changed from a rich air fuel ratio to a lean air fuel ratio;

FIG. 26 is a flow chart for obtaining the amount of decrease in the amount of oxygen stored in the three-way catalyst due to the amount of thermal deterioration;

FIG. 27 is a flow chart for obtaining the amount of decrease in the amount of stored oxygen in the three-way catalyst due to the amount of sulfur poisoning;

FIG. 28 is a view showing the relation between the rates of the amount of sulfur poisoning in the upper catalyst layer and the amount of sulfur poisoning in the lower catalyst layer (sulfur poisoning rates) with respect to the total amount of sulfur poisoning;

FIG. 29 is a view showing the rates of the amounts of decrease in the amounts of stored oxygen due to the individual amounts of poisoning in the upper catalyst layer and the lower catalyst layer, respectively, when the total amount of sulfur poisoning is a value represented by S1 in FIG. 28;

FIG. 30 is a flow chart showing a flow for HC poisoning recovery control according to a second embodiment of the present disclosure;

FIG. 31 is a time chart showing the changes over time of the air fuel ratio, and the concentration of NOx measured by a second NOx sensor (NOx measured value);

FIG. 32 is a flow chart for HC poisoning recovery control according to a third embodiment of the present disclosure; and FIG. 33 is a flow chart for HC poisoning recovery control according to a fourth embodiment of the present disclosure.

DETAILED DESCRIPTION

Hereinafter, modes for carrying out the present disclosure will be exemplarily described in detail based on embodiments with reference to the attached drawings. However, the dimensions, materials, shapes, relative arrangements and so on of component parts described in embodiments are not intended to limit the scope of the present disclosure to these alone in particular as long as there are no specific statements.

First Embodiment

FIG. 1 is a view showing the schematic construction of an internal combustion engine 1 according to a first embodiment of the present disclosure. Here, note that in this embodiment, in order to illustrate the internal combustion engine 1 in a simple and concise manner, a part of components thereof is omitted. The internal combustion engine 1 is a gasoline engine having four cylinders 2.

An intake pipe 31 and an exhaust pipe 41 are connected to a cylinder head 11 of the internal combustion engine 1. An intake port 32, which leads to a cylinder 2 from the intake pipe 31, and an exhaust port 42, which leads to the cylinder 2 from the exhaust pipe 41, are formed in the cylinder head 11. The intake port 32 is provided at its one end near the cylinder 2 with an intake valve 5. In addition, the exhaust port 42 is provided at its one end near the cylinder 2 with an exhaust valve 6. Here, note that in this embodiment, the exhaust pipe 41 corresponds to an exhaust passage in the present disclosure.

Then, a piston 15 connected to a crankshaft 13 of the internal combustion engine 1 through a connecting rod 14 reciprocates within the cylinder 2.

In addition, a throttle valve 16 for adjusting the amount (flow rate) of intake air flowing through the intake pipe 31 is arranged in the intake pipe 31. On the intake pipe 31 at a location upstream of this throttle valve 16, there is mounted an air flow meter 90 that outputs a signal corresponding to the amount (flow rate) of air flowing in the intake pipe 31. The amount of intake air sucked into the internal combustion engine 1 is detected or metered by means of this air flow meter 90.

In the middle of the exhaust pipe 41, a three-way catalyst 7, an NSR catalyst 8 and an SCR (selective catalytic reduction) catalyst 9 are sequentially provided in this order from an upstream side.

The three-way catalyst 7 serves to purify or remove NOx, HC and CO with a maximum efficiency at the time when the catalytic atmosphere thereof is at a stoichiometric air fuel ratio. In addition, the three-way catalyst 7 has oxygen occlusion or storage ability. That is, when the air fuel ratio of an incoming exhaust gas is a lean air fuel ratio, the three-way catalyst 7 occludes or stores an excess of oxygen, whereas when the air fuel ratio of the incoming exhaust gas is a rich air fuel ratio, the three-way catalyst 7 releases or supplies a shortage of oxygen, thereby purifying the exhaust gas. By the action of such an oxygen storage ability, the three-way catalyst 7 can remove or reduce HC, CO and NOx, even if the air fuel ratio of the exhaust gas flowing into the three-way catalyst 7 is other than the stoichiometric air fuel ratio.

A lower catalyst layer 72 is formed on the three-way catalyst 7 at a substrate side thereof, and an upper catalyst layer 71 is formed on the lower catalyst layer 72 (refer to FIG. 3A). That is, the lower catalyst layer 72 is arranged at the substrate side of the three-way catalyst 7, and the upper catalyst layer 71 is arranged at the side of the three-way catalyst 7 at which the exhaust gas flows. The upper catalyst layer 71 may be directly exposed to the exhaust gas. The upper catalyst layer 71 and the lower catalyst layer 72 each include a precious metal (Pd, Rh, etc.) and an oxygen storage agent (ceria etc.). Here, note that the three-way catalyst 7 according to this embodiment has two catalyst layers including the upper catalyst layer 71 and the lower catalyst layer 72, but may have three or more catalyst layers. Here, in this embodiment, the three-way catalyst 7 corresponds to an exhaust gas purification catalyst in the present disclosure.

Moreover, the NSR catalyst 8 serves to occlude or store the NOx contained in the incoming exhaust gas when the concentration of oxygen in the incoming exhaust gas is high, and to reduce the occluded or stored NOx when the oxygen concentration of the incoming exhaust gas becomes low and when a reducing agent exists. For the reducing agent to be supplied to the NSR catalyst 8, there can be used HC or CO which is the unburnt fuel to be discharged from the internal combustion engine 1.

The SCR catalyst 9 has adsorbed or stored the reducing agent, and carries out selective reduction of NOx by means of the reducing agent thus adsorbed or stored at the time when NOx passes through the SCR catalyst 9. For the reducing agent to be supplied to the SCR catalyst 9, there can be used ammonia ($NH_3$) generated in the NSR catalyst 8. Here, note that when the exhaust gas passes through the NSR catalyst 8, the NOx in the exhaust gas may react with HC or $H_2$ to generate ammonia.

Further, a first air fuel ratio sensor 91 for detecting the air fuel ratio of the exhaust gas and a first NOx sensor 92 for detecting the NOx in the exhaust gas are mounted on the exhaust pipe 41 at locations upstream of the three-way catalyst 7. In addition, a second air fuel ratio sensor 93 for detecting the air fuel ratio of the exhaust gas and a second NOx sensor 94 for detecting the NOx in the exhaust gas are mounted on the exhaust pipe 41 at locations downstream of the three-way catalyst 7 and upstream of the NSR catalyst 8. Here, note that in this embodiment, the second NOx sensor 94 corresponds to an NOx sensor in the present disclosure.

The air fuel ratio of the exhaust gas from the internal combustion engine 1 or the air fuel ratio of the exhaust gas flowing into the three-way catalyst 7 can be detected by the first air fuel ratio sensor 91. Here, note that the air fuel ratio of the exhaust gas from the internal combustion engine 1 or the air fuel ratio of the exhaust gas flowing into the three-way catalyst 7 can also be estimated based on the amount of intake air in the internal combustion engine 1 and the amount of fuel to be supplied. Also, the concentration of NOx in the exhaust gas from the internal combustion engine 1 or the concentration of NOx in the exhaust gas flowing into the three-way catalyst 7 can be detected by the first NOx sensor 92.

In addition, the air fuel ratio of the exhaust gas flowing out of the three-way catalyst 7 or the air fuel ratio of the exhaust gas flowing into the NSR catalyst 8 can be detected by the second air fuel ratio sensor 93. Further, the concentration of NOx in the exhaust gas flowing out of the three-way catalyst 7 or the concentration of NOx in the exhaust gas flowing into the NSR catalyst 8 can be detected by the second NOx sensor 94.

Here, note that the first air fuel ratio sensor 91 or the second air fuel ratio sensor 93 may also be an oxygen concentration sensor.

Moreover, on the intake pipe 31 at a location downstream of the throttle valve 16, there is mounted an in-passage fuel injection valve 81 for injecting fuel in a direction toward the intake pipe 31 or the intake port 32. In addition, on the internal combustion engine 1, there is mounted an in-cylinder fuel injection valve 82 for injecting fuel into the cylinder 2. Further, on the internal combustion engine 1, there is mounted a spark plug 83 for generating an electric spark in the cylinder 2.

Then, in the internal combustion engine 1, there is arranged in combination therewith an ECU 10 which is an electronic control unit for controlling the internal combustion engine 1. This ECU 10 is provided with a CPU and other elements such as a ROM, a RAM and so on, for storing a variety of kinds of programs and maps, and controls the internal combustion engine 1 in accordance with the operating conditions of the internal combustion engine 1 and/or driver's requirements.

Here, an accelerator opening sensor 96 and a crank position sensor 97 in addition to the above-mentioned various kinds of sensors are electrically connected to the ECU 10. The ECU 10 receives a signal corresponding to an accelerator opening from the accelerator opening sensor 96, and calculates an engine load, etc., to be required by the internal combustion engine 1 according to this signal. Also, the ECU 10 receives a signal corresponding to the rotation angle of the crankshaft 13 of the internal combustion engine 1 from the crank position sensor 97, and calculates the rotation speed of the internal combustion engine 1.

On the other hand, the in-passage fuel injection valve 81, the in-cylinder fuel injection valve 82, and the spark plug 83 are connected to the ECU 10 through electrical wiring, so that these parts or elements are controlled by the ECU 10.

For example, the ECU 10 controls the in-passage fuel injection valve 81 and the in-cylinder fuel injection valve 82 in such a manner that fuel can be supplied from these fuel injection valves 81, 82 in accordance with the amount of intake air detected by the air flow meter 90. A target air fuel ratio set at this time is an air fuel ratio which is set according to the operating state of the internal combustion engine 1. Here, note that in the internal combustion engine 1 according to this embodiment, a lean burn operation is carried out in which the air fuel ratio of an air fuel mixture is set to an air fuel ratio higher than the stoichiometric air fuel ratio (hereinafter, referred to as a lean air fuel ratio). At the time of the lean burn operation, the air fuel ratio of the mixture in each cylinder 2 is adjusted so that it becomes a target lean air fuel ratio set according to the operating state of the internal combustion engine 1. However, at the time of high load operation, etc., the internal combustion engine 1 may be operated at an air fuel ratio in the vicinity of or lower than the stoichiometric air fuel ratio (hereinafter, referred to as a rich air fuel ratio). In addition, in order to generate $NH_3$, or in order to reduce NOx, the internal combustion engine 1 may be operated at a rich air fuel ratio. The ECU 10 adjusts the air fuel ratio by adjusting the amount of intake air or the amount of fuel supply. The amount of intake air can be adjusted by changing the degree of opening of the throttle valve 16, for example. Moreover, the amount of intake air can also be adjusted by changing the opening and closing timing of the intake valve 5 or the exhaust valve 6.

Here, when the internal combustion engine 1 is operated at a rich air fuel ratio, oxygen is released from the three-way catalyst 7. During the time oxygen is released from the three-way catalyst 7, HC is reduced in the three-way catalyst 7. However, when the period of time in which the internal combustion engine 1 is operated at a rich air fuel ratio becomes long so that all the oxygen stored in the three-way catalyst 7 has been consumed, it will become difficult to oxidize unburnt fuel (HC, CO, etc.) in the three-way catalyst 7. For this reason, HC is accumulated in the three-way catalyst 7, so that HC poisoning occurs therein. For example, a reducing agent can be supplied to the NSR catalyst 8 by adjusting the air fuel ratio of the exhaust gas flowing into the NSR catalyst 8 to a rich air fuel ratio. At this time the exhaust gas of the rich air fuel ratio also flows through the three-way catalyst 7 which is arranged at the upstream side of the NSR catalyst 8, so that HC poisoning may occur in the three-way catalyst 7. When HC poisoning occurs in the three-way catalyst 7, the exhaust gas purification performance in the three-way catalyst 7 will become low, and so, it is desirable to recover the HC poisoning at an early stage.

The HC poisoning is a state in which HC, an unburnt substance, covers the surface of the precious metal, so that the activity of the catalyst becomes low. Here, it can be considered that in order to remove this HC having covered the surface of the precious metal, oxygen is supplied to the catalyst so as to react with the HC, whereby the HC is removed from the surface of the precious metal. As a method of supplying oxygen to the three-way catalyst 7, it can be considered that the internal combustion engine 1 is operated at a lean air fuel ratio. Here, note that oxygen can also be supplied to the three-way catalyst 7, by carrying out a fuel cut-off operation in which the supply of fuel to the internal combustion engine 1 is stopped, or by supplying secondary air at a location upstream of the three-way catalyst 7.

However, it is considered that in the three-way catalyst 7 provided with the upper catalyst layer 71 and the lower catalyst layer 72, HC and oxygen actively react with each other in the lower catalyst layer 72, after the recovery of HC poisoning and the occlusion or storage of oxygen in the upper catalyst layer 71 have been carried out, and after oxygen is stored in the lower catalyst layer 72. For this reason, a certain period of time is taken by the time the HC poisoning of the lower catalyst layer 72 is recovered. Then, the purification or reduction rate of the three-way catalyst 7 as a whole becomes low until the HC poisoning of the lower catalyst layer 72 is recovered.

Here, FIG. 2 is a time chart showing the changes over time of the air fuel ratio of an air fuel mixture in a cylinder 2 and the concentration of HC in the exhaust gas flowing out of the three-way catalyst 7. In FIG. 2, a solid line shows a case where the internal combustion engine 1 is operated at a lean air fuel ratio after having been operated at the stoichiometric air fuel ratio, and a broken line shows a case where the internal combustion engine 1 is operated at the lean air fuel ratio after having been operated at a rich air fuel ratio. In both of the cases, the target air fuel ratio at the time of the internal combustion engine 1 being operated at the lean air fuel ratio is the same.

In cases where the internal combustion engine 1 is operated at the stoichiometric air fuel ratio, the amount of HC discharged from the internal combustion engine 1 is small during the operation at the stoichiometric air fuel ratio. That is, during the time the internal combustion engine 1 is operated at the stoichiometric air fuel ratio, the amount of HC flowing into the three-way catalyst 7 is small. Moreover, during the time the internal combustion engine 1 is operated at the stoichiometric air fuel ratio, the HC reducing ability of the three-way catalyst 7 is also high, so that the amount of HC flowing out of the three-way catalyst 7 is relatively small. For this reason, even if the internal combustion engine 1 is operated at a lean air fuel ratio after that, HC in the exhaust gas can be reduced immediately, and hence, the amount of HC flowing out of the three-way catalyst 7 is relatively small.

On the other hand, in cases where the internal combustion engine 1 is operated at a rich air fuel ratio, the amount of HC discharged from the internal combustion engine 1 is large, so that HC poisoning occurs in the three-way catalyst 7. Moreover, in this case, because HC poisoning has occurred in the three-way catalyst 7, the HC reducing ability of the three-way catalyst 7 is also low. For this reason, the amount of HC flowing out of the three-way catalyst 7 becomes relatively large. Even if the internal combustion engine 1 is operated at a lean air fuel ratio after that, a certain amount of time will be required, by the time the HC poisoning is recovered. Then, the HC purification or reduction rate becomes low until the HC poisoning is recovered. For this reason, even after the internal combustion engine 1 has shifted to an operation at a lean air fuel ratio, a certain amount of HC will flow out of the three-way catalyst 7.

Here, it is considered that in cases where the air fuel ratio of the exhaust gas from the internal combustion engine 1 changes from a rich air fuel ratio to a lean air fuel ratio, first of all, the HC poisoning of the upper catalyst layer 71 will mainly be recovered, and thereafter, the HC poisoning of the lower catalyst layer 72 will mainly be recovered. Then, the time required for the recovery of the lower catalyst layer 72 is longer with respect to the time required for the recovery of the HC poisoning of the upper catalyst layer 71.

Here, FIG. 3A through FIG. 3E are views in which the states of the upper catalyst layer 71 and the lower catalyst layer 72 at the time when the air fuel ratio of the exhaust gas flowing into the three-way catalyst 7 changes from a rich air fuel ratio to a lean air fuel ratio are estimated every predetermined period of time. FIG. 3A through FIG. 3E show the changes over time of the states of the upper catalyst layer 71 and the lower catalyst layer 72 when the air fuel ratio changes, as shown by the broken line in FIG. 2. Here, note that although it is not necessarily clear how oxygen is occluded or stored in and released from the three-way catalyst 7 and in addition how the HC poisoning thereof is recovered, they can be considered as follows.

FIG. 3A is a view showing the states of the upper catalyst layer 71 and the lower catalyst layer 72 when the air fuel ratio is a rich air fuel ratio (i.e., at a point in time T1A in FIG. 2). When the air fuel ratio becomes a rich air fuel ratio, the oxygen in the oxygen storage agent 71A of the upper catalyst layer 71 and the oxygen stored in the oxygen storage agent 72A of the lower catalyst layer 72 react with HC. For this reason, when the period of time in which the internal combustion engine 1 is operated at a rich air fuel ratio becomes long, it will be in a state where oxygen is not stored in the oxygen storage agent 71A of the upper catalyst layer 71, and in the oxygen storage agent 72A of the lower catalyst layer 72. When the operation at the rich air fuel ratio is further continued, HC will attach or adhere to the precious metal 71B of the upper catalyst layer 71, and the precious metal 72B of the lower catalyst layer 72. In such a state, the purification (or reduction) ability of the three-way catalyst 7 becomes low.

FIG. 3B is a view showing the states of the upper catalyst layer 71 and the lower catalyst layer 72 immediately after the air fuel ratio has been switched from a rich air fuel ratio into a lean air fuel ratio (i.e., at a point in time T1B in FIG. 2). Broken line arrows in FIGS. 3B through 3E indicate the flows of oxygen. When the air fuel ratio is switched from a rich air fuel ratio to a lean air fuel ratio, the concentration of oxygen in the upper catalyst layer 71 becomes high, so that the oxygen reacts with the HC attached or adhered to the precious metal 71B of the upper catalyst layer 71, thereby removing the HC. In addition, oxygen is being stored in the oxygen storage agent 71A of the upper catalyst layer 71. Thus, in the upper catalyst layer 71, a sufficient amount of oxygen exists, so the occlusion or storage of oxygen to the oxygen storage agent 71A of the upper catalyst layer 71 and the reaction of oxygen with the HC attached or adhered to the precious metal 71B of the upper catalyst layer 71 may occur at the same time. On the other hand, oxygen is consumed in the upper catalyst layer 71, so the amount of oxygen to be supplied to the lower catalyst layer 72 is small, immediately after the air fuel ratio is switched to the lean air fuel ratio.

FIG. 3C is a view showing the states of the upper catalyst layer 71 and the lower catalyst layer 72 after a certain amount of oxygen has been occluded or stored into the oxygen storage agent 71A of the upper catalyst layer 71 at the time of the lean air fuel ratio (at a point in time T1C in FIG. 2). When a certain amount of oxygen is stored in the oxygen storage agent 71A of the upper catalyst layer 71, oxygen will arrive at the lower catalyst layer 72. The oxygen having arrived at the lower catalyst layer 72 is first occluded or stored into the highly reactive oxygen storage agent 72A thereof. At this time, the HC attached or adhered to the precious metal 72B of the lower catalyst layer 72 is not substantially oxidized.

FIG. 3D is a view showing the states of the upper catalyst layer 71 and the lower catalyst layer 72 after a certain amount of oxygen has been occluded or stored into the oxygen storage agent 72A of the lower catalyst layer 72 at the time of the lean air fuel ratio (at a point in time T1D in FIG. 2). FIG. 3E is a view showing the states of the upper catalyst layer 71 and the lower catalyst layer 72 when oxygen has been supplied to the precious metal 72B of the lower catalyst layer 72 at the time of the lean air fuel ratio (at a point in time T1E in FIG. 2). After a certain amount of oxygen has been stored in the oxygen storage agent 72A of the lower catalyst layer 72, the HC attached or adhered to the precious metal 72B of the lower catalyst layer 72 then reacts with oxygen. In this manner, even if the air fuel ratio has been simply switched from the rich air fuel ratio to the lean air fuel ratio, some time will be required by the time the HC attached or adhered to the precious metal 72B of the lower catalyst layer 72 reacts with oxygen, so that a certain amount of time is required by the time the HC poisoning of the lower catalyst layer 72 is recovered.

Accordingly, in this embodiment, at the time of shifting from an operation at the rich air fuel ratio to an operation at a lean air fuel ratio which becomes a final target (a target lean air fuel ratio), the internal combustion engine 1 shifts from the operation at the rich air fuel ratio to the operation at the target lean air fuel ratio through the first operation and the second operation. FIG. 4 is a view showing the change over time of the air fuel ratio at the time when the first operation and the second operation according to an embodiment of the present disclosure are carried out. Here, in the first operation, the air fuel ratio of the exhaust gas flowing into the three-way catalyst 7 is temporarily adjusted to a lean air fuel ratio. In this first operation, the internal combustion engine 1 is operated, for example, with the air fuel ratio in a cylinder 2 of the internal combustion engine 1 being adjusted to the lean air fuel ratio (AF1 in FIG. 4). Here, note that the lean air fuel ratio in the first operation may be the same air fuel ratio as the target lean air fuel ratio, but may be a different air fuel ratio. In the first operation, the HC poisoning of the upper catalyst layer 71 is mainly recovered.

In the second operation, the air fuel ratio of the exhaust gas flowing into the three-way catalyst 7 is made to change alternately between the rich air fuel ratio (AF3 in FIG. 4) and the lean air fuel ratio (AF2 in FIG. 4) a plurality of times. The rich air fuel ratio in the second operation is set to be an air fuel ratio higher than the rich air fuel ratio which is before the first operation is carried out, and the lean air fuel ratio in the second operation is also set to be an air fuel ratio lower than the lean air fuel ratio in the first operation and the target lean air fuel ratio. However, the rich air fuel ratio in the second operation may also be the same as the rich air fuel ratio before the first operation is carried out, and the lean air fuel ratio in the second operation may also be the same as the lean air fuel ratio in the first operation or the target lean air fuel ratio. In the second operation, the HC poisoning of the lower catalyst layer 72 is mainly recovered. Here, in the second operation, by carrying out feedback control of the amount of fuel injection or the amount of intake air so as to adjust the air fuel ratio to be the stoichiometric air fuel ratio, the air fuel ratio of the exhaust gas flowing into the three-way catalyst 7 is made to change alternately between the rich air fuel ratio and the lean air fuel ratio a plurality of times. In this feedback control, in the case of the rich air fuel ratio, the amount of fuel injection is caused to decrease or the amount of intake air is caused to increase so as to make the air fuel ratio close to the stoichiometric air fuel ratio, whereas in the case of the lean air fuel ratio, the amount of fuel injection is caused to increase or the amount of intake air is caused to decrease so as to make the air fuel ratio close to the stoichiometric air fuel ratio. As a result of carrying out such feedback control, the air fuel ratio of the exhaust gas flowing into the three-way catalyst 7 alternately changes between the rich air fuel ratio and the lean air fuel ratio across the boundary of the stoichiometric air fuel ratio. Here, note that in place of the above-mentioned feedback control, the air fuel ratio may be caused to change alternately between a predetermined rich air fuel ratio and a predetermined lean air fuel ratio which are set as targets, respectively. In addition, by setting the lowest air fuel ratio during carrying out the second operation as 14.2, it is possible to generate ammonia in the NSR catalyst 8, while suppressing the discharge or emission of HC.

Here, FIG. 5A through FIG. 5F are views in which the states of the upper catalyst layer 71 and the lower catalyst layer 72 at the time when the air fuel ratio of the exhaust gas flowing into the three-way catalyst 7 changes from a rich air fuel ratio to a lean air fuel ratio through the first operation and the second operation are estimated every predetermined period of time. Here, note that although it is not necessarily clear how oxygen is occluded or stored in and released from the three-way catalyst 7 and in addition how the HC poisoning thereof is recovered, they can be considered as follows. In addition, even if the HC poisoning is recovered by a phenomenon different from what is explained in the subject application, as long as the HC poisoning is recovered by the configuration of the present disclosure of the subject application, it belongs to the scope of the legal rights or claims of the subject application.

FIG. 5A is a view showing the states of the upper catalyst layer 71 and the lower catalyst layer 72 when the air fuel ratio is a rich air fuel ratio. The states at this time are the same as those which are shown in FIG. 3A.

FIG. 5B is a view showing the states of the upper catalyst layer 71 and the lower catalyst layer 72 immediately after the air fuel ratio has been switched from the rich air fuel ratio into a lean air fuel ratio in the first operation (AF1 in FIG. 4). Broken line arrows in FIG. 5B through 5F indicate the flows of oxygen. When the air fuel ratio is switched from a rich air fuel ratio to a lean air fuel ratio, the concentration of oxygen in the upper catalyst layer 71 becomes high, so that the oxygen reacts with the HC attached or adhered to the precious metal 71B of the upper catalyst layer 71, thereby removing the HC. In addition, oxygen is being stored in the oxygen storage agent 71A of the upper catalyst layer 71. Thus, in the upper catalyst layer 71, a sufficient amount of oxygen exists, so the occlusion or storage of oxygen to the oxygen storage agent 71A of the upper catalyst layer 71 and the reaction of oxygen with the HC attached or adhered to the precious metal 71B of the upper catalyst layer 71 may occur at the same time. On the other hand, oxygen is consumed in the upper catalyst layer 71, so the amount of oxygen to be supplied to the lower catalyst layer 72 is small, immediately after the air fuel ratio is switched to the lean air fuel ratio.

FIG. 5C is a view showing the states of the upper catalyst layer 71 and the lower catalyst layer 72 after a certain amount of oxygen has been occluded or stored into the oxygen storage agent 71A of the upper catalyst layer 71 at the time of the lean air fuel ratio in the first operation (AF1 in FIG. 4). When a certain amount of oxygen is stored in the oxygen storage agent 71A of the upper catalyst layer 71, oxygen will arrive at the lower catalyst layer 72. The oxygen having arrived at the lower catalyst layer 72 is first occluded or stored into the highly reactive oxygen storage agent 72A thereof. At this time, the HC attached or adhered to the precious metal 72B of the lower catalyst layer 72 is not substantially oxidized.

In this manner, when the first operation is carried out, the concentration of oxygen in the exhaust gas becomes high, so the HC attached or adhered to the precious metal 71B of the upper catalyst layer 71 then reacts with oxygen. In addition, oxygen is being stored in the oxygen storage agent 71A of the upper catalyst layer 71, too (FIG. 5C). For this reason, by carrying out the first operation, it becomes easy for oxygen to arrive at the lower catalyst layer 72. Moreover, oxygen is being stored in the oxygen storage agent 72A of the lower catalyst layer 72, too.

FIG. 5D is a view showing the states of the upper catalyst layer 71 and the lower catalyst layer 72 when the air fuel ratio is the rich air fuel ratio (AF3 in FIG. 4) immediately after the internal combustion engine 1 has been switched from the first operation to the second operation. In the second operation, the air fuel ratio is switched between AF2 and AF3, as shown in FIG. 4, in a plurality of times. When the internal combustion engine 1 shifts to the second operation and the air fuel ratio becomes the rich air fuel ratio (AF3 of FIG. 4), the oxygen having stored in the oxygen storage agent 72A of the lower catalyst layer 72 at the time of the lean air fuel ratio (AF1 or AF2 in FIG. 4) will be released through the precious metal 72B. This oxygen reacts with the HC attached or adhered to the precious metal 72B of the lower catalyst layer 72, thereby removing the HC.

In this manner, even before the oxygen storage agent 72A of the lower catalyst layer 72 is filled with oxygen, it is possible to remove the HC attached to the precious metal 72B of the lower catalyst layer 72 by means of the oxygen released from the oxygen storage agent 72A of the lower catalyst layer 72 when the air fuel ratio is the rich air fuel ratio. In cases where the operation at the lean air fuel ratio is continued, i.e., in cases where the air fuel ratio changes, as shown in the broken line in FIG. 2, the reactivity of the oxygen storage agent 72A of the lower catalyst layer 72 is high, and hence, it is difficult for the HC attached or adhered to the precious metal 72B of the lower catalyst layer 72 and oxygen to react with each other, until after a sufficient amount of oxygen has been stored in the oxygen storage agent 72A of the lower catalyst layer 72.

In addition, when the operation at the rich air fuel ratio is further continued even after the release of oxygen from the oxygen storage agent 72A of the lower catalyst layer 72 has ended, HC will attach or adhere to the precious metal 71B of the upper catalyst layer 71, and the precious metal 72B of the lower catalyst layer 72. On the other hand, by repeating the operation at the rich air fuel ratio and the operation at the lean air fuel ratio in an alternate manner, as in the second operation of the present disclosure, it is possible to carry out the release of oxygen from the oxygen storage agent 72A of the lower catalyst layer 72 and the occlusion or storage of oxygen into the oxygen storage agent 72A of the lower catalyst layer 72 in a repeated manner. As a result, the HC poisoning of the lower catalyst layer 72 can be recovered, as shown in FIG. 5E and FIG. 5F, which will be described later.

FIG. 5E is a view showing the states of the upper catalyst layer 71 and the lower catalyst layer 72 immediately after the internal combustion engine 1 has been switched from one operation at the rich air fuel ratio (AF3 in FIG. 4) to another operation at the lean air fuel ratio (AF2 in FIG. 4) in the second operation. With the internal combustion engine 1 being operated at the lean air fuel ratio, oxygen is occluded or stored into the oxygen storage agent 71A of the upper catalyst layer 71 and the oxygen storage agent 72A of the lower catalyst layer 72. That is, even if oxygen is released from the oxygen storage agent 72A of the lower catalyst layer 72 at the time of the rich air fuel ratio for the recovery of the HC poisoning of the lower catalyst layer 72, as shown in FIG. 5D, oxygen can be supplied to the oxygen storage agent 72A of the lower catalyst layer 72 at the time of the lean air fuel ratio.

FIG. 5F is a view showing the states of the upper catalyst layer 71 and the lower catalyst layer 72 immediately after the operation of the internal combustion engine 1 has been switched from the operation at the lean air fuel ratio (AF2 in FIG. 4) to another operation at the rich air fuel ratio (AF3 in FIG. 4) in the second operation. The states at this time are the same as those which are shown in FIG. 5D. Thus, at the time of carrying out the second operation, HC can be removed from the precious metal 72B of the lower catalyst layer 72, while suppressing HC from newly attaching or adhering to the three-way catalyst 7.

Accordingly, even before a sufficient amount of oxygen is occluded or stored into the oxygen storage agent 72A of the lower catalyst layer 72, it is possible to remove the HC attached to the precious metal 72B of the lower catalyst layer 72, by causing some amount of oxygen stored in the oxygen storage agent 72A of the lower catalyst layer 72 to be released therefrom, in a repeated manner. With this, the HC poisoning of the three-way catalyst 7 can be recovered at an early stage.

Here, note that the first operation may be carried out until a certain amount of oxygen is stored in the oxygen storage agent 72A of the lower catalyst layer 72, or may be carried out until oxygen arrives at the lower catalyst layer 72. An optimum value of this period of time may be obtained in advance through experiments, simulations, or the like.

FIG. 6 is a flow chart showing a flow or routine for determining whether HC poisoning recovery control according to this embodiment is carried out. This flow or routine is carried out by means of the ECU 10 at each predetermined period of time, when the air fuel ratio of the exhaust gas is a rich air fuel ratio. This rich air fuel ratio is an air fuel ratio at the time of rich spike control, for example, which is carried out in order to supply the reducing agent to the SCR catalyst 9. More specifically, this rich air fuel ratio is an air fuel ratio which is suitable for the generation of ammonia in the NSR catalyst 8, and which is lower than the rich air fuel ratio in the second operation.

In step S101, the individual poisoning incremental counter values of the upper catalyst layer 71 and the lower catalyst layer 72 are calculated, respectively. The poisoning incremental counters are to calculate the amount of HC newly attached or adhered to the three-way catalyst 7. The poisoning incremental counter values are each calculated based on the air fuel ratio, the temperature of the three-way catalyst 7, and the amount of intake air in the internal combustion engine 1. The poisoning incremental counter values are each obtained as a maximum value of the amount of HC poisoning (the amount of adhesion of HC) which may increase in a period of time from the time of the last execution of step S101 (the execution of the last step S101), until the time of the current execution of step S101 (the execution of the current step S101).

Here, FIG. 7 is a view showing the relation between the air fuel ratio and the amount of HC poisoning. This amount of HC poisoning is an amount of HC poisoning in the three-way catalyst 7 which increases per unit time (i.e., an amount of HC which increases per unit time). The air fuel ratio is an air fuel ratio of the exhaust gas flowing into the three-way catalyst 7 or an air fuel ratio in a cylinder 2 of the internal combustion engine 1. The lower (i.e., the richer) the air fuel ratio, the larger the HC contained in the exhaust gas becomes, and hence, the larger the amount of HC poisoning becomes.

In addition, FIG. 8 is a view showing the relation between the temperature of the three-way catalyst 7 and the amount of HC poisoning. This amount of HC poisoning is an amount of HC poisoning in the three-way catalyst 7 which increases per unit time. Up to a predetermined temperature, the higher the temperature of the three-way catalyst 7, the more the amount of HC poisoning thereof increases, but at temperatures equal to or higher than the predetermined temperature, the higher the temperature of the three-way catalyst 7, the more the amount of HC poisoning thereof decreases. That is, there exist a temperature at which the amount of HC poisoning becomes a maximum, wherein the lower the temperature of the three-way catalyst 7 becomes than this predetermined temperature, the smaller the amount of HC poisoning thereof becomes, and the higher the temperature of the three-way catalyst 7 becomes than this predetermined temperature, the smaller the amount of HC poisoning thereof becomes.

FIG. 9 is a view showing the relation between the amount of intake air in the internal combustion engine 1 and the amount of HC poisoning. This amount of HC poisoning is an amount of HC poisoning in the three-way catalyst 7 which increases per unit time. The larger the amount of intake air, the larger becomes the amount of the exhaust gas passing through the three-way catalyst 7, and hence, the larger becomes the amount of HC flowing into the three-way catalyst 7. For this reason, the larger the amount of intake air, the larger the amount of HC poisoning of the three-way catalyst 7 becomes.

In this manner, the amount of HC poisoning changes according to the air fuel ratio, the temperature of the three-way catalyst 7, and the amount of intake air in the internal combustion engine 1, and hence, the poisoning incremental counter values are obtained based on these values. If a map for obtaining the poisoning incremental counter values from the air fuel ratio, the temperature of the three-way catalyst 7, and the amount of intake air in the internal combustion engine 1 has been created in advance by carrying out experiments, simulations, or the like, the poisoning incremental counter values can be obtained based on the air fuel ratio, the temperature of the three-way catalyst 7, and the amount of intake air in the internal combustion engine 1.

In step S102, the individual poisoning counter values of the upper catalyst layer 71 and the lower catalyst layer 72 are calculated, respectively. These poisoning counter values indicate the amounts of HC poisoning of the upper catalyst layer 71 and the lower catalyst layer 72 at the current point in time, respectively. Here, note that the poisoning counter values may also be values which are in correlation with the amounts of HC poisoning of the upper catalyst layer 71 and the lower catalyst layer 72, respectively. The current poisoning counter values are each obtained by adding an amount of increase of the amount of HC poisoning to the last poisoning counter value calculated in the last step S102. A maximum value of this amount of increase of the amount of HC poisoning is the value of the poisoning incremental counter calculated in step S101.

Here, the amount of HC poisoning is affected by the influence of the amount of oxygen stored in the three-way catalyst 7 (hereinafter, simply referred to as the amount of stored oxygen). For example, the larger the amount of stored oxygen, the easier it becomes for HC to be oxidized, and hence, the more difficult it becomes to increase the amount of HC poisoning. However, the poisoning incremental counter values calculated in step S101 do not take into consideration the influence of the amount of stored oxygen. For this reason, the ECU 10 calculates the amounts of oxygen stored in the upper catalyst layer 71 and the lower catalyst layer 72, respectively, and corrects the poisoning incremental counter values calculated in step S101 based on these values.

FIG. 10 is a flow chart showing a flow or routine for calculating poisoning incremental coefficients for correcting the poisoning incremental counters. This flow or routine is carried out by means of the ECU 10 at each predetermined time interval. The poisoning incremental coefficients calculated according to this flow or routine are used in step S102 in FIG. 6.

In step S201, the amount of oxygen stored in the upper catalyst layer 71 is calculated. The amount of oxygen stored in the upper catalyst layer 71 changes according to a difference (hereinafter, also referred to as "OSC1") between an amount of stored oxygen at the time when oxygen is saturated at an air fuel ratio of the current point in time (hereinafter, also referred to as a saturated amount of stored oxygen) and an amount of stored oxygen calculated in the last step S201, in the upper catalyst layer 71. Here, note that the saturated amount of stored oxygen changes according to the air fuel ratio.

Here, FIG. 11 is a view showing the relation between the air fuel ratio and the saturated amount of stored oxygen. This relation can be obtained through experiments, simulations, or the like. The saturated amount of stored oxygen is an amount of stored oxygen when an air fuel ratio at a time continues in a sufficient period of time. That is, it is a maximum value of the amount of oxygen stored in the upper catalyst layer 71 at the air fuel ratio at that time. As shown in FIG. 11, the higher the air fuel ratio, the larger the saturated amount of stored oxygen becomes. In particular, the saturated amount of stored oxygen changes to a large extent in the vicinity of the stoichiometric air fuel ratio. The saturated amount of stored oxygen decreases as the air fuel ratio becomes low, so that in cases where the actual amount of stored oxygen has reached the saturated amount of stored oxygen, oxygen is released from the oxygen storage agent when the air fuel ratio becomes low.

In order to calculate the amount of stored oxygen, an amount of change of the amount of stored oxygen is obtained. Then, the amount of stored oxygen is calculated by integrating the amount of change of the amount of stored oxygen. The amount of change of the amount of stored oxygen can be obtained by multiplying OSC1 by a period of time and a coefficient. That is, the following relation is established: the amount of change of the amount of stored oxygen=OSC1×the period of time×the coefficient. "The period of time" used at this time is a period of time from the time the flow chart shown in FIG. 10 was carried out the last time until it is carried out at this time. The OSC1 is the difference between the saturated amount of stored oxygen at the current point in time and the amount of stored oxygen calculated in the last step S201, as mentioned above. The saturated amount of stored oxygen at the current point in time can be obtained from the air fuel ratio at the current point in time by using the relation shown in FIG. 11. The OSC1 can also be a negative value. The amount of stored oxygen calculated in the last step S201 has been stored in the ECU 10. The coefficient referred to herein changes according to the OSC1. That is, the larger the OSC1, the larger the amount of change of the amount of stored oxygen tends to become, and hence, the coefficient is made to change based on the OSC1. The relation between the OSC1 and the coefficient can be obtained in advance through experiments, simulations, or the like.

In this manner, by multiplying the OSC1 by the period of time and the coefficient thus obtained, the amount of change of the amount of oxygen stored in the upper catalyst layer 71 can be obtained. Then, the amount of oxygen stored in the upper catalyst layer 71 at the current point in time can be calculated by adding this amount of change of the amount of oxygen stored in the upper catalyst layer 71 thus obtained to the amount of oxygen stored in the upper catalyst layer 71 calculated in the last step S201. That is, the following relation is established.

> The amount of oxygen stored in the upper catalyst layer 71=the amount of oxygen stored in the upper catalyst layer 71 calculated in the last step S201+OSC1×the period of time×the coefficient.

In step S202, the amount of oxygen stored in the lower catalyst layer 72 is calculated. The amount of oxygen stored in the lower catalyst layer 72 changes according to a difference (hereinafter, referred to as "OSC2") between a saturated amount of stored oxygen at the air fuel ratio at the current point in time, and an amount of stored oxygen calculated in the last step S202, in the lower catalyst layer 72. The amount of oxygen stored in the lower catalyst layer 72 can be obtained by adding an amount of change of the amount of oxygen stored in the lower catalyst layer 72 to the amount of oxygen stored in the lower catalyst layer 72 calculated in the last step S202. The amount of change of the amount of stored oxygen in the lower catalyst layer 72 can be obtained by multiplying OSC2 by a period of time, a coefficient and a lower layer correction value. That is, the following relation is established: the amount of change of the amount of stored oxygen=OSC2×the period of time×the coefficient×the lower layer correction value. The OSC2, the period of time and the coefficient can be obtained, similarly as in the case of the upper catalyst layer 71.

The lower layer correction value is used in order to correct an amount of change which is affected by the influence of the amount of oxygen stored in the upper catalyst layer 71. FIG. 12 is a view for obtaining the lower layer correction value from the OSC1 of the upper catalyst layer. In FIG. 12, the axis of abscissa represents an absolute value of the OSC1 of the upper catalyst layer 71. When the amount of oxygen stored in the upper catalyst layer 71 has changed to a large extent, the occlusion (storage) or release of oxygen is actively carried out in the upper catalyst layer 71. For this reason, the influence of the change of the air fuel ratio in the exhaust gas is absorbed in the upper catalyst layer 71. Accordingly, in the lower catalyst layer 72, the influence of the change of the air fuel ratio becomes small. That is, the larger the absolute value of the OSC1 of the upper catalyst layer 71, the smaller the amount of change of the amount of oxygen stored in the lower catalyst layer 72 becomes. For this reason, the larger the absolute value of the OSC1 of the upper catalyst layer 71, the smaller the lower layer correction value is made. The lower layer correction value is equal to or larger than 0, and at the same time, equal to or less than 1. The relation shown in FIG. 12 can be obtained in advance through experiments, simulations, or the like.

In this manner, by multiplying the OSC2 by the period of time, the coefficient and the lower layer correction value thus obtained, the amount of change of the amount of oxygen stored in the lower catalyst layer 72 can be obtained. Then, the amount of oxygen stored in the lower catalyst layer 72 at the current point in time can be calculated by adding this amount of change of the amount of oxygen stored in the lower catalyst layer 72 thus obtained to the amount of oxygen stored in the lower catalyst layer 72 calculated in the last step S202. That is, the following relation is established.

> The amount of oxygen stored in the lower catalyst layer 72=the amount of oxygen stored in the lower catalyst layer 72 calculated in the last step S202+OSC2×the period of time×the coefficient×the lower layer correction value.

In step S203, the individual poisoning incremental coefficients of the upper catalyst layer 71 and the lower catalyst layer 72 are calculated based on the individual rates of oxygen storage of the upper catalyst layer 71 and the lower catalyst layer 72, respectively. FIG. 13 is a view showing the relation between a rate of oxygen storage and a poisoning incremental coefficient in each of the upper catalyst layer 71 and the lower catalyst layer 72. The rate of oxygen storage is a value which is obtained by dividing the amount of stored oxygen at the current point in time by the saturated amount of stored oxygen. The poisoning incremental coefficient is used in order to correct a poisoning incremental counter value by being multiplied to the poisoning incremental counter value. That is, the following relation is established.

The poisoning incremental counter value after correction=the poisoning incremental counter value before correction×the poisoning incremental coefficient The poisoning incremental coefficient is equal to or larger than 0, and at the same time, equal to or less than 1. Here, the higher the rate of oxygen storage, the more difficult it becomes to increase the amount of HC poisoning, and hence, the smaller the poisoning incremental coefficient becomes. In cases where the rate of oxygen storage is 0, i.e., in cases where the amount of stored oxygen is 0, the poisoning incremental coefficient becomes 1, and the poisoning incremental counter value becomes an amount of increase of the amount of HC poisoning.

Returning to the flow or routine of FIG. 6, in step S102, the poisoning counter values are calculated. The poisoning counter values are calculated by multiplying the poisoning incremental counter values by the poisoning incremental coefficients, respectively, and by integrating the results (values) thus obtained, respectively. That is, new poisoning counter values are calculated by adding the values, which are obtained by multiplying the poisoning incremental counter values by the poisoning incremental coefficients, respectively, to the poisoning counter values calculated in the last step S102. That is, the following relation is established.

The poisoning counter values=the poisoning counter values calculated in the last step S102+the poisoning incremental counter values, respectively In step S103, it is determined whether there is any request for the operation of the internal combustion engine 1 at an air fuel ratio other than a rich air fuel ratio. In this step S103, it is determined whether there is any request for the operation of the internal combustion engine 1 at a lean air fuel ratio. That is, it is determined whether the operation at the rich air fuel ratio is ended. For example, in order to supply the reducing agent to the NSR catalyst 8 or the SCR catalyst 9, the internal combustion engine 1 may be operated at the rich air fuel ratio. In this case, when the supply of the reducing agent to the NSR catalyst 8 or the SCR catalyst 9 is completed, the operation of the internal combustion engine 1 is switched to an operation at a lean air fuel ratio. Accordingly, when the supply of the reducing agent to the NSR catalyst 8 or the SCR catalyst 9 has been completed, a determination can be made that there is a request for an operation at an air fuel ratio other than the rich air fuel ratio. In addition, at the time of high load operation of the internal combustion engine 1, the internal combustion engine 1 may be operated at a rich air fuel ratio. In this case, when the output of the internal combustion engine 1 has entered an operating region other than a requested predetermined operating region, a determination can be made that an operation other than at a rich air fuel ratio is requested. In cases where an affirmative determination is made in step S103, the routine advances to step S104, whereas in cases where a negative determination is made, this routine is ended.

In step S104, HC poisoning recovery control is carried out. FIG. 14 is a flow chart of HC poisoning recovery control, particularly showing the HC poisoning recovery control in the upper catalyst layer. This flow or routine is carried out in step S104 by means of the ECU 10.

In step S301, it is determined whether the request for the operation of the internal combustion engine 1 at an air fuel ratio other than the rich air fuel ratio continues. The operation at the rich air fuel ratio may also be requested during the HC poisoning recovery control, and in such a case, the HC poisoning recovery control is terminated, so that the internal combustion engine 1 is shifted to an operation at the rich air fuel ratio. In cases where an affirmative determination is made in step S301, the routine advances to step S302. On the other hand, in cases where a negative determination is made in step S301, a return is made to the flow or routine of FIG. 6. In this case, the processing of the step S104 in FIG. 6 is completed, so the routine shown in FIG. 6 ends. In addition, in cases where the first operation is carried out when a return is made to the routine of FIG. 6, the first operation is made to terminate. The first operation in this flow is a reduced cylinder operation which is carried out in step S304, or an operation at a lean air fuel ratio which is carried out in step S306.

In step S302, it is determined whether the poisoning counter value of the upper catalyst layer 71 (also referred to as the upper layer poisoning counter value) is equal to or more than a threshold value. In this step, it is determined whether the HC poisoning of the upper catalyst layer 71 is made to recover by adjusting the air fuel ratio of the exhaust gas flowing into the three-way catalyst 7 to a lean air fuel ratio. That is, it is determined whether the first operation is carried out. This threshold value is a value of the upper layer poisoning counter in which the recovery of the HC poisoning of the upper catalyst layer 71 is carried out. This threshold value has been obtained in advance by experiments, simulations or the like as a value of the upper layer poisoning counter at which the exhaust gas purification performance in the three-way catalyst 7 becomes lower than an allowable range, or a value of the upper layer poisoning counter at which the exhaust gas purification performance in the three-way catalyst 7 may become lower than the allowable range. In cases where an affirmative determination is made in step S302, the routine advances to step S303.

In step S303, it is determined whether the reduced cylinder operation of the internal combustion engine 1 is possible. In this step S303, it is determined whether the air fuel ratio of the exhaust gas flowing into the three-way catalyst 7 becomes the lean air fuel ratio in the first operation by carrying out the reduced cylinder operation. That is, it is determined whether the first operation can be carried out by carrying out the reduced cylinder operation. Here, by stopping the injection of fuel from the in-passage fuel injection valve 81 or the in-cylinder fuel injection valve 82 in a part of the cylinders 2, it is possible to discharge air from the part of the cylinders 2. In the other cylinders in which fuel injection is carried out, fuel is supplied thereto so that the air fuel ratio therein becomes the stoichiometric air fuel ratio or a lean air fuel ratio, for example. As a result, the air fuel ratio of the exhaust gas flowing into the three-way catalyst 7 becomes the lean air fuel ratio.

In addition, by carrying out combustion of air fuel mixture in the part of the cylinders 2 (hereinafter, also referred to as the combusting cylinders 2) at the stoichiometric air fuel ratio, it is possible to suppress HC from being discharged from the internal combustion engine 1. That is, the amount of discharge of HC can be made smaller than in the case where combustion is carried out at a lean air fuel ratio in all the cylinders 2. Moreover, in the combusting cylinders 2, combustion may be carried out at a lean air fuel ratio. In that case, by means of the air discharged from the other non-combusting cylinders 2, the air fuel ratio of the exhaust gas flowing into the three-way catalyst 7 becomes still higher. In the combusting cylinders 2 in which combustion is performed at the lean air fuel ratio, homogeneous charge combustion or stratified charge combustion may be carried out.

However, in those cylinders 2 in which fuel injection is stopped, there is no torque generated, so there will be a great influence on the operating state of the internal combustion engine 1. Moreover, when fuel injection is stopped in a part of the cylinders 2, there will be a fear that vibration and noise may occur. For this reason, only in cases where an amount of torque required of the internal combustion engine 1 can be generated and at the same time vibration and noise fall within an allowable range, a determination is made that the reduced cylinder operation can be carried out. For example, when the internal combustion engine 1 is in an operating region in which the load is equal to or more than a predetermined load under which vibration and noise can be suppressed, and in which an amount of intake air able to generate the required amount of torque can be obtained, a determination is made that the reduced cylinder operation can be carried out. Here, note that at the time of carrying out the reduced cylinder operation, the number of those cylinders 2 in which fuel injection is stopped may be decided in such a manner that vibration and noise will fall within the allowable range.

In cases where an affirmative determination is made in step S303, the routine goes to step S304, where the reduced cylinder operation is carried out. As a result of this, the concentration of oxygen in the exhaust gas flowing into the three-way catalyst 7 becomes high, thereby making it possible to promote the recovery of the HC poisoning of the upper catalyst layer 71.

On the other hand, in cases where a negative determination is made in step S303, the routine goes to step S305. In step S305, it is determined whether the internal combustion engine 1 can be operated at a lean air fuel ratio. By operating the internal combustion engine 1 at a lean air fuel ratio, the air fuel ratio of the exhaust gas flowing into the three-way catalyst 7 can be made to a lean air fuel ratio. Here, note that in this step, first of all, it is determined whether stratified charge combustion can be carried out in which the amount of discharge of HC from the internal combustion engine 1 can be made relatively small, and in which the amount of discharge of oxygen from the internal combustion engine 1 can be made relatively large.

Here, in the first operation according to this embodiment, the air fuel ratio may be made higher so as to quickly send oxygen to the upper catalyst layer 71. In order to operate the internal combustion engine 1 at a lean air fuel ratio, homogeneous charge combustion may be carried out, but the air fuel ratio can be made higher by carrying out stratified charge combustion. At a lean air fuel ratio close to the stoichiometric air fuel ratio, the amount of discharge of HC is smaller in the case of homogeneous charge combustion than in the case of stratified charge combustion. However, when the degree of leanness becomes high, combustion can be performed more stably in the case of stratified charge combustion than in the case of homogeneous charge combustion, and so, the amount of discharge of HC becomes small. Accordingly, the operation of the internal combustion engine 1 can be operated at higher air fuel ratios in the case of stratified charge combustion than in the case of homogeneous charge combustion. For this reason, the recovery of the HC poisoning can be promoted by carrying out stratified charge combustion.

In cases where stratified charge combustion is performed when the internal combustion engine 1 is operated at a lean air fuel ratio, a condition for stratified charge combustion is satisfied in the case where the degree of turbulence in a cylinder 2 is equal to or less than a threshold value. Accordingly, in the case of an operating region in which the degree of turbulence in the cylinder 2 exceeds the threshold value, a determination is made that the internal combustion engine 1 can not be operated at a lean air fuel ratio.

Here, note that in cases where stratified charge combustion can not be carried out, it may be determined whether homogeneous charge combustion can be carried out. When the internal combustion engine 1 is operated at a lean air fuel ratio under homogeneous charge combustion, the amount of HC to be discharged from the internal combustion engine 1 may increase. For this reason, in the case where the amount of discharge of HC exceeds a threshold value, a determination is made that the internal combustion engine 1 can not be operated at a lean air fuel ratio.

Here, note that when the internal combustion engine 1 is operated at a lean air fuel ratio, it is difficult to remove or reduce NOx in the three-way catalyst 7. On the other hand, when the internal combustion engine 1 is operated at a lean air fuel ratio, NOx can be adsorbed or stored by the NSR catalyst 8. When the second operation is carried out, the NOx stored in the NSR catalyst 8 is released from the NSR catalyst 8. This NOx released from the NSR catalyst 8 can be reduced in the SCR catalyst 9. However, when the amount of NOx to be discharged from the internal combustion engine 1 is too large, it may become impossible for the NSR catalyst 8 to fully store the NOx, or it may become impossible for the SCR catalyst 9 to fully reduce the NOx. Accordingly, in cases where the NOx flowing out of the NSR catalyst 8 can be reduced by the ammonia which has been adsorbed by the SCR catalyst 9, a determination may be made that the internal combustion engine 1 can be operated at a lean air fuel ratio. This can also be said that in cases where the NOx stored by the NSR catalyst 8 can be reduced by the ammonia adsorbed in the SCR catalyst 9, a determination is made that the internal combustion engine 1 can be operated at a lean air fuel ratio.

At the air fuel ratio at which the amount of discharge of HC becomes smaller in the case of stratified charge combustion than in the case of homogeneous charge combustion, the amount of discharge of NOx becomes larger in the case of stratified charge combustion than in the case of homogeneous charge combustion. This NOx can be made to be stored in the NSR catalyst 8, or reduced by the SCR catalyst 9. For this reason, even if the amount of NOx discharged from the internal combustion engine 1 has been increased by performing stratified charge combustion, it is possible to suppress the NOx from being discharged into the atmosphere.

In cases where an affirmative determination is made in step S305, the routine goes to step S306, where the internal combustion engine 1 is operated at a lean air fuel ratio. That is, the air fuel ratio of the exhaust gas from the internal combustion engine 1 is made to a lean air fuel ratio by carrying out stratified charge combustion or homogeneous charge combustion. On the other hand, in cases where a negative determination is made in step S305, the routine goes to step S310, where the first operation is not carried out, and then, a return is made to step S301.

In step S307, the individual poisoning decremental counter values of the upper catalyst layer 71 and the lower catalyst layer 72 are calculated, respectively. The poisoning decremental counters are to calculate the amount of HC removed from the three-way catalyst 7. The poisoning decremental counter values are each calculated based on the air fuel ratio, the temperature of the three-way catalyst 7, and the amount of intake air in the internal combustion engine 1. The poisoning decremental counter values are each obtained as a maximum value of the amount of HC poisoning which may decrease in a period of time from the time of the last execution of step S307, until the time of the current execution of step S307.

Here, FIG. 15 is a view showing the relation between the air fuel ratio and the amount of recovery of HC poisoning. This amount of recovery of HC poisoning is an amount of HC poisoning in the three-way catalyst 7 which decreases per unit time (i.e., an amount of HC which decreases per unit time). The air fuel ratio is an air fuel ratio of the exhaust gas flowing into the three-way catalyst 7 or an air fuel ratio in a cylinder 2 of the internal combustion engine 1. The higher (i.e., the leaner) the air fuel ratio, the larger the oxygen contained in the exhaust gas becomes, and hence, the larger the amount of recovery of HC poisoning becomes.

In addition, FIG. 16 is a view showing the relation between the temperature of the three-way catalyst 7 and the amount of recovery of HC poisoning. This amount of recovery of HC poisoning is an amount of HC poisoning in the three-way catalyst 7 which decreases per unit time. The higher the temperature of the three-way catalyst 7, the larger the amount of recovery of HC poisoning becomes. Here, in cases where the temperature of the three-way catalyst 7 is lower than an activation temperature thereof, even if the temperature of the three-way catalyst 7 becomes high, the amount of recovery of HC poisoning will not become so large. Accordingly, in cases where the temperature of the three-way catalyst 7 is lower than its activation temperature, the change of the amount of recovery of HC poisoning with respect to the change of the temperature of the three-way catalyst 7 is small. That is, in FIG. 16, the gradient of the amount of recovery of HC poisoning is small in a temperature less than the activation temperature. On the other hand, when the temperature of the three-way catalyst 7 becomes equal to or higher than the activation temperature thereof, the change of the amount of recovery of HC poisoning with respect to the change of the temperature of the three-way catalyst 7 becomes large. That is, when the temperature of the three-way catalyst 7 becomes equal to or higher than the activation temperature thereof, the gradient of the amount of recovery of HC poisoning becomes large, in FIG. 16. However, when the temperature of the three-way catalyst 7 becomes still higher, the change of the reaction speed (rate) of HC and oxygen is small even if the temperature of the three-way catalyst 7 changes, so the gradient in FIG. 16 becomes small.

FIG. 17 is a view showing the relation between the amount of intake air in the internal combustion engine 1 and the amount of recovery of HC poisoning. This amount of recovery of HC poisoning is an amount of HC poisoning which increases per unit time. The larger the amount of intake air, the larger becomes the amount of the exhaust gas passing through the three-way catalyst 7, and hence, the larger becomes the amount of oxygen flowing into the three-way catalyst 7. For this reason, the larger the amount of intake air, the larger becomes the amount of recovery of HC poisoning.

In this manner, the amount of recovery of HC poisoning changes according to the air fuel ratio, the temperature of the three-way catalyst 7, and the amount of intake air in the internal combustion engine 1, and hence, the poisoning decremental counter values are obtained based on these values. If a map for obtaining the poisoning decremental counter values from the air fuel ratio, the temperature of the three-way catalyst 7, and the amount of intake air in the internal combustion engine 1 has been created in advance by carrying out experiments, simulations, or the like, the poisoning decremental counter values can be obtained based on the air fuel ratio, the temperature of the three-way catalyst 7, and the amount of intake air in the internal combustion engine 1.

In step S308, the individual poisoning counter values of the upper catalyst layer 71 and the lower catalyst layer 72 are calculated, respectively. In this step, an amount of decrease by which the amount of HC poisoning has decreased is subtracted from each of the poisoning counter values. The current poisoning counter values are each obtained by subtracting the amount of decrease of the amount of HC poisoning from the last poisoning counter value calculated in the last step S308. A maximum value of this amount of decrease of the amount of HC poisoning is the value of the poisoning decremental counter calculated in step S307. That is, the following relation is established.

The poisoning counter values=the poisoning counter values calculated in the last step S308−the amounts of decrease of the amounts of HC poisoning, respectively Here, the amount of recovery of HC poisoning is affected by the influence of the amount of oxygen stored in the three-way catalyst 7. For example, the larger the amount of stored oxygen, the easier it becomes for HC to be oxidized, and hence, the larger the amount of recovery of HC poisoning becomes. However, the poisoning decremental counter values calculated in step S307 do not take into consideration the influence of the amount of stored oxygen. For this reason, the ECU 10 calculates the amounts of oxygen stored in the upper catalyst layer 71 and the lower catalyst layer 72, respectively, and corrects the poisoning decremental counter values.

FIG. 18 is a flow chart showing a flow or routine for calculating poisoning recovery coefficients for correcting the poisoning decremental counters, respectively. This flow or routine is carried out by means of the ECU 10 at each predetermined time interval. The poisoning recovery coefficients calculated according to this flow or routine are used in step S308 in FIG. 14.

In step S401, the amount of oxygen stored in the upper catalyst layer 71 is calculated. In this step, the amount of oxygen stored in the upper catalyst layer 71 is calculated, similarly as in step S201.

In step S402, the amount of oxygen stored in the lower catalyst layer 72 is calculated. In this step, the amount of oxygen stored in the lower catalyst layer 72 is calculated, similarly as in step S202.

In step S403, the individual poisoning recovery coefficients of the upper catalyst layer 71 and the lower catalyst layer 72 are calculated based on the individual rates of oxygen storage of the upper catalyst layer 71 and the lower catalyst layer 72, respectively. FIG. 19 is a view showing the relation between a rate of oxygen storage and a poisoning recovery coefficient in each of the upper catalyst layer 71 and the lower catalyst layer 72. The poisoning recovery coefficients are multiplied to the poisoning decremental counter values, respectively. The poisoning incremental coefficients are each equal to or larger than 0, and at the same time, equal to or less than 1. Here, the higher the rate of oxygen storage, the more easier it becomes to decrease the amount of HC poisoning, and hence, the larger the poisoning recovery coefficients become.

Returning to the flow or routine of FIG. 14, in step S308, the poisoning counter values are calculated. Specifically, the new or current poisoning counter values are calculated by adding the values, which are obtained by multiplying the poisoning decremental counter values by the poisoning recovery coefficients, respectively, to the poisoning counter values calculated in the last step S308. That is, the following relation is established.

> The poisoning counter values=the poisoning counter values calculated in the last step S308+the poisoning decremental counter values×the poisoning recovery coefficients, respectively Because the poisoning decremental counter values calculated in step S307 are negative values, the poisoning counter values become gradually small. After that, the routine returns to step S301. That is, the HC poisoning of the upper catalyst layer 71 is recovered until the upper layer poisoning counter value becomes less than the threshold value. This can be said that the first operation is carried out until the HC poisoning of the upper catalyst layer 71 is recovered.

On the other hand, in cases where a negative determination is made in step S302, the routine goes to step S309. Here, note that in this embodiment, in step S302, in cases where the upper layer poisoning counter value becomes less than the threshold value, the first operation is terminated as it is assumed that the HC poisoning of the upper catalyst layer 71 has been recovered.

In step S309, HC poisoning recovery control in the lower catalyst layer 72 is carried out. That is, the second operation is carried out. FIG. 20 is a flow chart for HC poisoning recovery control in the lower catalyst layer 72. This flow or routine is carried out in step S309 by means of the ECU 10. Here, note that for those steps in which the same processing as in the above-mentioned flow is made, the same symbols are attached and the explanation thereof is omitted. In this flow or routine, in cases where an affirmative determination is made in step S301, the routine goes to step S501. On the other hand, in cases where a negative determination is made in step S301, a return is made to step S309 in FIG. 14, where the processing of the step S309 is terminated and then, a further return is made to the flow of FIG. 6. In this case, the processing of the step S104 in FIG. 6 is completed, so the routine shown in FIG. 6 ends.

In step S501, it is determined whether the poisoning counter value of the lower catalyst layer 72 (also referred to as the lower layer poisoning counter value) is equal to or more than a threshold value. In this step, it is determined whether the second operation can be carried out. In the second operation, feedback control is carried out in which the air fuel ratio is controlled to be the stoichiometric air fuel ratio. That is, in this step, it is determined whether the HC poisoning of the lower catalyst layer 72 is made to recover by the feedback control aiming at the stoichiometric air fuel ratio. This threshold value is a value of the lower layer poisoning counter in which the recovery of the HC poisoning of the lower catalyst layer 72 is carried out. This threshold value has been obtained in advance by experiments, simulations or the like as a value of the lower layer poisoning counter at which the exhaust gas purification performance in the three-way catalyst 7 becomes lower than the allowable range, or a value of the lower layer poisoning counter at which the exhaust gas purification performance in the three-way catalyst 7 may become lower than the allowable range. Here, note that the threshold value of the upper catalyst layer 71 and the threshold value of the lower catalyst layer 72 may be the same, but they may be values different from each other. In cases where an affirmative determination is made in step S501, the routine goes to step S502. On the other hand, in cases where a negative determination is made in step S501, a return is made to step S309 in FIG. 14, where the processing of the step S309 is terminated and then, a further return is made to the flow of FIG. 6. In this case, the processing of the step S104 in FIG. 6 is completed, so the routine shown in FIG. 6 ends. In cases where a negative determination is made in step S501, the HC poisoning has been recovered, and hence, the ECU 10 shifts the operation of the internal combustion engine 1 to an operation in which the air fuel ratio is made to the target lean air fuel ratio which is a final target air fuel ratio.

Here, note that in this embodiment, the ECU 10, which carries out the processing of step S302 or step S501, corresponds to a determination unit in the present disclosure. In addition, in this embodiment, the ECU 10, which carries out the flows or routines shown in FIGS. 6, 13 and 19, corresponds to a control device in the present disclosure.

In step S502, the feedback control aiming at the stoichiometric air fuel ratio is carried out. In this step, the amount of fuel injection from the in-passage fuel injection valve 81 or the in-cylinder fuel injection valve 82 is controlled in a feedback manner so that the air fuel ratio of the exhaust gas flowing into the three-way catalyst 7 is made to the stoichiometric air fuel ratio. In this step, the second operation is carried out by means of the feedback control aiming at the stoichiometric air fuel ratio. Specifically, in the case where the air fuel ratio detected by the first air fuel ratio sensor 91 is a rich air fuel ratio, the amount of fuel injection is decreased, whereas in the case where the air fuel ratio is a lean air fuel ratio, the amount of fuel injection is increased. As a result, the air fuel ratio of the exhaust gas flowing into the three-way catalyst 7 changes alternately between the rich air fuel ratio (AF3 in FIG. 4) and the lean air fuel ratio (AF2 in FIG. 4) around the stoichiometric air fuel ratio. Here, note that in this step, the amount of fuel injection is controlled in a feedback manner, but instead of this, the amount of intake air or the amount of secondary air in the internal combustion engine 1 may also be controlled in a feedback manner. Moreover, in this step, the feedback control aiming at the stoichiometric air fuel ratio is carried out, but instead of this, switch-over control may be carried out in which a target air fuel ratio for the rich air fuel ratio and a target air fuel ratio for the lean air fuel ratio are switched therebetween in an alternate manner. In this connection, note that even in either of the feedback control and the switch-over control, the lean air fuel ratio may be continuously adopted within a period of time in which oxygen is not saturated in the oxygen storage agent 72A of the lower catalyst layer 72, and the rich air fuel ratio may be continuously adopted within a period of time in which HC does not newly attach or adhere to the precious metal 72B of the lower catalyst layer 72.

Here, note that when the air fuel ratio is made to a lean air fuel ratio in the second operation according to this embodiment, the reduced cylinder operation may be carried out. In this case, at the time of changing the air fuel ratio into a lean side, fuel may be supplied in such a manner that the supply of fuel is stopped in a part of the cylinders 2, and the fuel air ratio in the other combusting cylinders 2 becomes the stoichiometric air fuel ratio. In cases where the reduced cylinder operation cannot be carried out in the second operation, a part of the cylinders 2 may be operated at a lean air fuel ratio, and the other cylinders 2 may be operated at the stoichiometric air fuel ratio. At this time, in the cylinders 2 which are operated at the lean air fuel ratio, homogeneous charge combustion or stratified charge combustion may be carried out. In the second operation, dither control may be carried out in which the target air fuel ratio is alternately changed between the rich air fuel ratio and the lean air fuel ratio in a plurality of times.

In step S503, when the air fuel ratio of the exhaust gas flowing into the three-way catalyst 7 changes from the lean air fuel ratio to the rich air fuel ratio, the poisoning decremental counter value of the lower catalyst layer 72 is calculated. The poisoning decremental counter value in this step is calculated based on the amount of oxygen stored in the lower catalyst layer 72 and the poisoning counter value thereof.

FIG. 21 is a view showing the relation between the rate of oxygen storage in the lower catalyst layer 72, the poisoning counter value thereof, and the poisoning decremental counter value thereof. The higher the rate of oxygen storage in the lower catalyst layer 72, the more easier it becomes to recover the HC poisoning thereof, and hence, the larger the poisoning decremental counter value thereof becomes. Moreover, the larger the value of the poisoning counter in the lower catalyst layer 72, the more easier it becomes to recover the HC poisoning thereof, and hence, the larger the poisoning decremental counter value thereof becomes. The relation shown in FIG. 21 can be obtained in advance through experiments, simulations, or the like.

In step S504, the new or current poisoning counter values are calculated by subtracting, from the poisoning counter values, the poisoning decremental counter values calculated in step S503, respectively. In this manner, the amount of decrease by which the amount of HC poisoning has decreased is subtracted from each of the poisoning counter values. When the processing of step S504 is completed, the routine goes back to step S301. That is, the HC poisoning of the lower catalyst layer 72 is recovered until the lower layer poisoning counter value becomes less than the threshold value. This can be said that the second operation is carried out until the HC poisoning of the lower catalyst layer 72 is recovered.

Here, when the second operation is carried out, the air fuel ratio of the exhaust gas changes in the vicinity of the stoichiometric air fuel ratio, so that NOx is released from the NSR catalyst 8. At this time, it is difficult to removal or reduce NOx in the NSR catalyst 8 due to a shortage of the reducing agent. However, at the time of the rich air fuel ratio before the first operation, ammonia is generated in the NSR catalyst 8, so that the ammonia thus generated can be made to absorb to the SCR catalyst 9 in advance. With this, the NOx flowing out of the NSR catalyst 8 can be removed or reduced in the SCR catalyst 9. Accordingly, the removal or reduction rate of NOx can be enhanced to a more extent, by arranging the NSR catalyst 8 and the SCR catalyst 9 at locations downstream of the three-way catalyst 7.

FIG. 22 is a time chart showing the changes over time of a variety of kinds of values at the time of the HC poisoning recovery control. In this figure, there are illustrated, in order from the top, the target air fuel ratio, the amount of oxygen stored in the upper catalyst layer 71, the amount of oxygen stored in the lower catalyst layer 72, the poisoning counter value of the upper catalyst layer 71, and the poisoning counter value of the lower catalyst layer 72. Before a point in time indicated by T1, the target air fuel ratio becomes a lean air fuel ratio. In a period of time from T1 to T6, the target air fuel ratio becomes a rich air fuel ratio. In a period of time from T6 to T7, the first operation is carried out, and in a period of time from T7 to T9, the second operation is carried out. In a period of time after T9, the target air fuel ratio becomes the target lean air fuel ratio.

That is, at the point in time indicated by T1, the target air fuel ratio has switched from the target lean air fuel ratio to the rich air fuel ratio. With this, first, the amount of oxygen stored in the upper catalyst layer 71 begins to decrease, and subsequently, the amount of oxygen stored in the lower catalyst layer 72 begins to decrease. That is, after the amount of oxygen stored in the upper catalyst layer 71 has decreased to some extent, the amount of oxygen stored in the lower catalyst layer 72 begins to decrease. At this time, the larger the OSC2 of the lower catalyst layer 72, the larger the degree of decrease of the amount of oxygen stored in the lower catalyst layer 72 becomes. When the air fuel ratio becomes the rich air fuel ratio, first, HC attaches or adheres to the upper catalyst layer 71, so that the poisoning counter of the upper catalyst layer 71 begins to go up from the point in time indicated by T1. On the other hand, a certain period of time is taken by the time the HC arrives at the lower catalyst layer 72, and hence, the lower layer poisoning counter begins to go up or rise after T1.

At a point in time indicated by T2, the amount of oxygen stored in the upper catalyst layer 71 becomes zero. When the amount of oxygen stored in the upper catalyst layer 71 becomes zero, the rate of rise of the poisoning counter value of the upper catalyst layer 71 increases to a small extent. Further, at a point in time indicated by T3, the amount of oxygen stored in the lower catalyst layer 72 becomes zero. When the amount of oxygen stored in the lower catalyst layer 72 becomes zero, the rate of rise of the poisoning counter value of the lower catalyst layer 72 increases to a small extent.

Here, when the target air fuel ratio is the lean air fuel ratio, HC has not substantially attached or adhered to the upper catalyst layer 71 and the lower catalyst layer 72, and hence, at the point in time indicated by T1, the poisoning counter value of the upper catalyst layer 71 and the poisoning counter value of the lower catalyst layer 72 become zero, but after the point in time indicated by T1, the poisoning counter value of the upper catalyst layer 71 and lower layer the poisoning counter values go up. Then, at the point in time indicated by T4, the poisoning counter value of the upper catalyst layer 71 becomes a maximum value, and at the point in time indicated by T5, the poisoning counter value of the lower catalyst layer 72 becomes a maximum value. The HC, which does not attach or adhere to the three-way catalyst 7, flows out of the three-way catalyst 7 into the NSR catalyst 8 where it performs a reaction.

At a point in time indicated by T6, a request occurs for switching the operation of the internal combustion engine 1 to a lean burn operation. When the request for switching to the lean burn operation occurs, poisoning recovery control is carried out. That is, from the point in time indicated by T6, the operation of the internal combustion engine 1 is switched to the first operation which is operated at the lean air fuel ratio. When the internal combustion engine 1 is operated at the lean air fuel ratio in the first operation, mainly, the amount of stored oxygen in the upper catalyst layer 71 goes up or increases, and at the same time, the poisoning counter value of the upper catalyst layer 71 goes down or decreases. Then, at a point in time indicated by T7, the amount of oxygen stored in the upper catalyst layer 71 becomes large to a sufficient extent. The amount of oxygen arriving at the lower catalyst layer 72 is small until the amount of oxygen stored in the upper catalyst layer 71 increases to a sufficient extent, and hence, in the period of time from T6 to T7, the rate of rise or increase of the amount of oxygen stored in the lower catalyst layer 72 is low, and the rate of decrease of the poisoning counter value of the lower catalyst layer 72 is also low.

From the point in time indicated by T7, the second operation carries out in which the amount of fuel injection is controlled in a feedback manner by adjusting the target air fuel ratio to the stoichiometric air fuel ratio. Although the target air fuel ratio at this time is the stoichiometric air fuel ratio, the actual air fuel ratio changes between a rich air fuel ratio and a lean air fuel ratio in an alternate manner. By carrying out this second separation, the occlusion (storage) and release of oxygen in the oxygen storage agent 72A of the lower catalyst layer 72 are carried out in a repeated manner. The oxygen, when released from the oxygen storage agent 72A of the lower catalyst layer 72 during the time the air fuel ratio is the rich air fuel ratio, reacts with the HC attached to the precious metal 72B of the lower catalyst layer 72, so that the poisoning counter value of the lower catalyst layer 72 decreases. Here, note that the saturated amount of stored oxygen in the oxygen storage agent is smaller at the time of the stoichiometric air fuel ratio than at the time of the lean air fuel ratio, so when the operation of the internal combustion engine 1 is switched from the first operation to the second operation, the amount of stored oxygen in the upper catalyst layer 71 decreases. In addition, in a period of time from T8 to T9 in which the second operation is carried out, in the upper catalyst layer 71, the amount of stored oxygen decreases gradually as a whole, while repeating an increase and a decrease in the amount of stored oxygen therein.

In addition, at a point in time indicated by T8, the poisoning counter value of the upper catalyst layer 71 becomes 0, and at a point in time indicated by T9, the poisoning counter value of the lower catalyst layer 72 becomes 0. For this reason, at the point in time indicated by T9, the second operation ends. After the point in time indicated by T9, the target air fuel ratio becomes the target lean air fuel ratio. When the target air fuel ratio becomes the target lean air fuel ratio, the amount of oxygen stored in the upper catalyst layer 71 and the amount of oxygen stored in the lower catalyst layer 72 increase again. The increase of the amount of oxygen stored in the lower catalyst layer 72 begins after the amount of oxygen stored in the upper catalyst layer 71 has increased to some extent. Then, at a point in time indicated by T10, the amount of oxygen stored in the upper catalyst layer 71 becomes an upper limit value, and at a point in time indicated by T11, the amount of oxygen stored in the lower catalyst layer 72 becomes an upper limit value.

However, in this embodiment, when the internal combustion engine 1 is switched to an operation at the target lean air fuel ratio after being operated at the rich air fuel ratio, the first operation and the second operation are carried out, but instead of this, even if only the second operation is carried out, the HC poisoning can be recovered. Here, FIG. 23 is a time chart showing the changes over time of the air fuel ratio and the concentration of HC in the exhaust gas flowing out of the three-way catalyst 7, at the time when the air fuel ratio in a cylinder 2 of the internal combustion engine 1 is changed from the rich air fuel ratio to the lean air fuel ratio.

In FIG. 23, solid lines show a case where the first operation and the second operation are carried out, before adjusting the air fuel ratio to the target lean air fuel ratio which is the final target air fuel ratio, and broken lines show a case where only the second operation is carried out, before adjusting the air fuel ratio to the target lean air fuel ratio which is the final target air fuel ratio. As shown in FIG. 23, the concentration of HC in the exhaust gas flowing out of the three-way catalyst 7 drops or decreases earlier in the case of carrying out the first operation and the second operation than in the case of carrying out only the second operation. Accordingly, the amount of discharge of HC can be decreased more by an amount of difference between a broken line and a solid line in the case of carrying out the first operation and the second operation than in the case of carrying out only the second operation. Moreover, the recovery of the HC poisoning of the lower catalyst layer 72 becomes earlier in the case of carrying out the first operation and the second operations than in the case of carrying out only the second operation, and hence, a period of time until the air fuel ratio is switched to the target lean air fuel ratio can be shortened. Accordingly, fuel economy can be improved more in the case of carrying out the first operation and the second operation than in the case of carrying out only the second operation.

As explained above, according to this embodiment, when the internal combustion engine 1 is operated at a rich air fuel ratio, the air fuel ratio is shifted to a lean air fuel ratio through the first operation and the second operation, before being shifted to an operation at the target lean air fuel ratio, so that it is possible to remove the HC attached to the precious metal 72B of the lower catalyst layer 72, even before the oxygen storage agent 72A of the lower catalyst layer 72 is filled with oxygen. For this reason, the HC poisoning of the lower catalyst layer can be recovered quickly. As a result of this, the purification or reduction ability of the three-way catalyst 7 can be recovered in a quick manner. In addition, the air fuel ratio can be shifted to the lean air fuel ratio at an early stage, thus making it possible to improve fuel economy.

Here, note that in this embodiment, the second operation is carried out after the first operation, in order to perform the recovery of the HC poisoning of the upper catalyst layer 71 and the recovery of the HC poisoning of the lower catalyst layer 72 in a sequential manner. On the other hand, either one of the first operation or the second operation may be carried out, in order to perform either one of the recovery of the HC poisoning of the upper catalyst layer 71 and the recovery of the HC poisoning of the lower catalyst layer 72. In cases where HC poisoning has occurred only in the upper catalyst layer 71, only the first operation may be carried out. In addition, in cases where HC poisoning has occurred only in the lower catalyst layer 72, only the second operation may be carried out.

In addition, in this embodiment, in cases where the upper layer poisoning counter value becomes less than a threshold value, it is assumed that the HC poisoning of the upper catalyst layer 71 has been recovered, and the first operation is terminated, but instead of this, the first operation may be terminated after the first operation has been carried out for a predetermined period of time. Moreover, in this embodiment, in cases where the lower layer poisoning counter value becomes less than a threshold value, it is assumed that the HC poisoning of the lower catalyst layer 72 has been recovered, and the second operation is terminated, but instead of this, the second operation may be carried out for a predetermined period of time. Further, in this embodiment, in cases where the upper layer poisoning counter value and the lower layer poisoning counter value become the individual threshold values, respectively, the first operation and the second operation are carried out, but instead of this, at the time when the operation of the internal combustion engine 1 is shifted from the operation at the rich air fuel ratio to the operation at the target lean air fuel ratio, the first operation and the second operation may necessarily be carried out. Furthermore, in this embodiment, a determination as to whether HC poisoning has occurred is made by using the upper layer poisoning counter and the lower layer poisoning counter, but is not limited to this, and the determination as to whether HC poisoning has occurred may be made by means of other techniques.

Second Embodiment

In this second embodiment, the period of time in which HC poisoning recovery control is carried out is changed according to deterioration by sulfur poisoning of the three-way catalyst 7 as well as deterioration by heat. The other devices, parts and so on are the same as those in the first embodiment, so the explanation thereof is omitted.

Here, when deterioration by sulfur poisoning or deterioration by heat takes place in the three-way catalyst 7, the oxygen storage capacity of the three-way catalyst 7 (this also may be an amount of oxygen which can be stored in the three-way catalyst 7 as much as possible) will change. For this reason, an amount of oxygen supply required for the recovery of HC poisoning (this also may be a period of time in which the air fuel ratio is made to a lean air fuel ratio, or may be a degree of leanness) changes. By carrying out the HC poisoning recovery control according to the deterioration by sulfur poisoning or the deterioration by heat, it is possible to recover HC poisoning in a necessary minimum period of time, so that fuel economy can be improved, and the amount of discharge of HC can be reduced.

However, the precious metals supported by or disposed on the upper catalyst layer 71 and the lower catalyst layer 72 may be different from each other. In such a case, the ease in being subjected to sulfur poisoning is different between the upper catalyst layer 71 and the lower catalyst layer 72. For example, Rh may be supported on the upper catalyst layer 71, and Pd may be supported on the lower catalyst layer 72. Pd is more easily subjected to sulfur poisoning than Rh. In a location where sulfur poisoning has occurred, there will not occur HC poisoning, or even if HC poisoning occurs, there will be no change in purification performance in that location. For this reason, in cases where sulfur poisoning has occurred, and if the sulfur poisoning occurs similarly in the upper catalyst layer 71 and the lower catalyst layer 72, the amount of HC poisoning of Pd in the lower catalyst layer 72 will become smaller than the amount of HC poisoning of Rh in the upper catalyst layer 71. That is, the degrees of the deterioration by HC poisoning of the upper catalyst layer 71 and the lower catalyst layer 72 change according to the degrees of the deterioration by sulfur poisoning thereof, respectively. Also, similarly, in the case of thermal deterioration, the degrees of the deterioration by HC poisoning of the upper catalyst layer 71 and the lower catalyst layer 72 change according to the degrees of the deterioration by heat thereof, respectively.

Accordingly, the periods of time required to recover the HC poisoning of the upper catalyst layer 71 and the HC poisoning of the lower catalyst layer 72, respectively, change according to the degrees of sulfur poisoning thereof and the degrees of thermal deterioration thereof. For this reason, by carrying out the first operation and the second operation while taking account of the deterioration by sulfur poisoning and the deterioration by heat, the periods of time in which the first operation and the second operation are carried out can be set in a more accurate manner. Here, note that, in cases where HC poisoning recovery control is carried out only in a fixed period of time, or in cases where HC poisoning recovery control is carried out only in a period of time which is based on the amount of HC poisoning of the three-way catalyst 7 as a whole, too, no consideration is given to the deterioration by sulfur poisoning and the deterioration by heat, and hence, there will be a fear that the period of time in which HC poisoning recovery control is carried out may be excessive or deficient.

FIG. 24 is a view showing the change over time of the amount of oxygen stored in the three-way catalyst 7. The amount of stored oxygen in the three-way catalyst 7 becomes lower or decreases due to the deterioration by heat, the deterioration by sulfur poisoning, and the deterioration by HC poisoning thereof. The amount of stored oxygen shown in FIG. 24 is an amount of oxygen which can be occluded or stored in the three-way catalyst 7 as much as possible. The decrease in the amount of stored oxygen is divided into an amount of deterioration by heat (or an amount of thermal deterioration), an amount of deterioration by sulfur poisoning, and an amount of deterioration by HC poisoning. Here, the deterioration by heat is unrecoverable deterioration. On the other hand, the sulfur poisoning can be recovered by carrying out sulfur poisoning recovery control. In addition, the HC poisoning can also be recovered by carrying out HC poisoning recovery control. In FIG. 24, a solid line shows the change over time of the amount of stored oxygen; an alternate long and short dash line shows an amount of stored oxygen in an initial state (a brand new state); and a broken line shows an amount of stored oxygen when only a decrease in the amount of stored oxygen due to the deterioration by heat has occurred.

Here, the sulfur poisoning recovery control is carried out in cases where not only the sulfur poisoning of the three-way catalyst 7 but also the sulfur poisoning of the NSR catalyst 8 or the SCR catalyst 9 is recovered. In the sulfur poisoning recovery control, the temperature of the three-way catalyst 7 is made high, and the exhaust gas, of which the oxygen concentration has been made low, is circulated to the three-way catalyst 7. Here, note that to carry out HC poisoning recovery control (the first operation and the second operation) does not satisfy a condition for recovering sulfur poisoning, so sulfur poisoning is not recovered even if the HC poisoning recovery control (the first operation and the second operation) is carried out. Thus, in cases where both sulfur poisoning recovery control and HC poisoning recovery control are carried out, only the influence of thermal deterioration remains in the three-way catalyst 7. Accordingly, after sulfur poisoning recovery control and HC poisoning recovery control have been carried out, an amount of decrease in the amount of stored oxygen in the three-way catalyst 7 due to the amount of thermal deterioration can be obtained.

Further, in cases where HC poisoning recovery process is carried out, without performing sulfur poisoning recovery control, the amount of stored oxygen in the three-way catalyst 7 is decreased by the amount of thermal deterioration and the amount of deterioration by sulfur poisoning. An amount of decrease in the amount of stored oxygen due to the amount of thermal deterioration can be obtained, as described above. Here, note that the decrease in the amount of stored oxygen due to the thermal deterioration progresses more gradually than the decrease due to the sulfur poisoning. Accordingly, an amount of decrease in the amount of stored oxygen due to the amount of thermal deterioration calculated immediately after sulfur poisoning recovery control has been carried out may be used as it is for the amount of decrease in the amount of stored oxygen due to the amount of thermal deterioration after the sulfur poisoning recovery control has been carried out until the following sulfur poisoning recovery control is carried out. Moreover, the amount of decrease in the amount of stored oxygen due to the amount of thermal deterioration may be obtained each time sulfur poisoning recovery control is carried out a plurality of times, without obtaining the amount of decrease in the amount of stored oxygen due to the amount of thermal deterioration each time sulfur poisoning recovery control is carried out. In addition, the amount of decrease in the amount of stored oxygen due to the amount of thermal deterioration may be estimated, by assuming that the decrease in the amount of stored oxygen due to the amount of thermal deterioration obtained before continues similarly hereafter, as shown by the broken line in FIG. 24. That is, by obtaining an amount of decrease in the amount of stored oxygen due to the thermal deterioration immediately after carrying out sulfur poisoning recovery control and HC poisoning recovery control, and storing this value a plurality of times, a subsequent amount of decrease in the amount of stored oxygen due to the amount of thermal deterioration can be estimated based thereon. For example, the amount of decrease in the amount of stored oxygen due to the amount of thermal deterioration may also be calculated, by considering that the gradient of the broken line shown in FIG. 24 continues hereafter. Here, note that the broken line shown in FIG. 24 is a straight line, but this may be a curved line.

In this manner, the decrease in the amount of stored oxygen immediately after HC poisoning recovery process has been carried out is based on the amount of thermal deterioration and the amount of sulfur poisoning, and in addition, the amount of thermal deterioration can be obtained, as described above. As a result, it can be considered that the remainder is the amount of deterioration by sulfur poisoning. That is, an amount of decrease in the amount of stored oxygen due to the amount of sulfur poisoning can be calculated by subtracting, from an initial amount of stored oxygen, an amount of decrease due to the amount of thermal deterioration, and an amount of oxygen which can be stored in the three-way catalyst 7 as much as possible immediately after HC poisoning has been recovered (this may also be an amount of decrease in the amount of stored oxygen due to the amount of HC poisoning).

Here, note that an amount of oxygen, which can be stored in the three-way catalyst 7 as much as possible at the current point in time, can be obtained based on a period of time from the time the air fuel ratio of the exhaust gas at the upstream side of the three-way catalyst 7 has changed from a rich air fuel ratio to a lean air fuel ratio until the time the air fuel ratio of the exhaust gas at the downstream side of the three-way catalyst 7 changes from a rich air fuel ratio to a lean air fuel ratio. In addition, the amount of oxygen, which can be stored in the three-way catalyst 7 as much as possible at the current point in time, can also be obtained based on a period of time from the time the air fuel ratio of the exhaust gas at the upstream side of the three-way catalyst 7 has changed from a lean air fuel ratio to a rich air fuel ratio until the time the air fuel ratio of the exhaust gas at the downstream side of the three-way catalyst 7 changes from a lean air fuel ratio to a rich air fuel ratio. The rich air fuel ratio and the lean air fuel ratio at the time of obtaining the amount of oxygen, which can be stored in the three-way catalyst 7 as much as possible at the current point in time, are unrelated to the air fuel ratios in the first operation and the second operation.

Here, FIG. 25 is a time chart showing the changes over time of the air fuel ratio of exhaust gas at the downstream side of the three-way catalyst 7, at the time when the air fuel ratio of exhaust gas at the upstream side of the three-way catalyst 7 has been changed from a rich air fuel ratio to a lean air fuel ratio. An arrow indicated by an alternate long and short dash line shows the direction to move with the progress of the deterioration of the three-way catalyst 7.

A period of time from the time the air fuel ratio of the exhaust gas flowing into the three-way catalyst 7 has changed from a rich air fuel ratio to a lean air fuel ratio until the air fuel ratio of the exhaust gas flowing out of the three-way catalyst 7 changes from a rich air fuel ratio to a lean air fuel ratio becomes longer as the amount of oxygen stored in the three-way catalyst 7 becomes larger. Here, even if the air fuel ratio of the exhaust gas flowing into the three-way catalyst 7 has changed from a rich air fuel ratio to a lean air fuel ratio, during the time oxygen is stored in the three-way catalyst 7, the oxygen is not released from the three-way catalyst 7, so that the air fuel ratio of the exhaust gas flowing out of the three-way catalyst 7 becomes the stoichiometric air fuel ratio. Accordingly, when the amount of oxygen which can be stored in the three-way catalyst 7 becomes smaller as the deterioration of the three-way catalyst 7 progresses, the period of time until the air fuel ratio of exhaust gas at the downstream side of the three-way catalyst 7 changes from a rich air fuel ratio to a lean air fuel ratio becomes shorter. If the relation between this period of time and the amount of stored oxygen (this may also be the degree of deterioration) has been obtained in advance by experiments, simulations, or the like, the amount of stored oxygen in the three-way catalyst 7 can be obtained by changing the air fuel ratio of the exhaust gas from a rich air fuel ratio to a lean air fuel ratio.

FIG. 26 is a flow chart for obtaining the amount of decrease in the amount of oxygen stored in the three-way catalyst 7 due to the amount of thermal deterioration. This flow or routine is carried out by means of the ECU 10 at each predetermined time interval.

In step S601, it is determined whether sulfur poisoning recovery control has been carried out. The sulfur poisoning recovery control may be to recover the sulfur poisoning of the three-way catalyst 7, or may be to recover the sulfur poisoning of the NSR catalyst 8 or the SCR catalyst 9. Even in the case where the sulfur poisoning of the NSR catalyst 8 or the SCR catalyst 9 is recovered, the condition for recovering the sulfur poisoning of the three-way catalyst 7 is satisfied, so the sulfur poisoning of the three-way catalyst 7 is also recovered. Here, note that in this step, the sulfur poisoning recovery control may be carried out in order to obtain the amount of decrease in the amount of oxygen stored in the three-way catalyst 7 due to the amount of thermal deterioration. In cases where an affirmative determination is made in step S601, the routine goes to step S602, whereas in cases where a negative determination is made, this routine is ended.

In step S602, the oxygen storage capacity in the three-way catalyst 7 is detected. In this step, the amount of oxygen which can be stored in the three-way catalyst 7 as much as possible is obtained as the oxygen storage capacity. The amount of stored oxygen in the three-way catalyst 7 is calculated based on a period of time from the time the detected value of the first air fuel ratio sensor 91 has changed to a lean air fuel ratio until the detected value of the second air fuel ratio sensor 93 changes to a lean air fuel ratio, after the air fuel ratio in a cylinder 2 of the internal combustion engine 1 has been changed from a rich air fuel ratio to a lean air fuel ratio.

In step S603, the amount of decrease in the amount of oxygen stored in the three-way catalyst 7 due to the amount of thermal deterioration is calculated. Here, after the sulfur poisoning recovery control has been carried out, HC poisoning has also been recovered, and hence, the amount of deterioration remaining in the three-way catalyst 7 is only the amount of thermal deterioration. Here, note that the oxygen storage capacity of the three-way catalyst 7 (i.e., the amount of oxygen which can be stored in the three-way catalyst 7 as much as possible) in a state where there is no thermal deterioration in the three-way catalyst 7 (i.e., in an initial state) has been obtained in advance, and stored in the ECU 10. Then, a difference between the oxygen storage capacity in the initial state in the three-way catalyst 7 and the oxygen storage capacity thereof detected in step S602 is calculated as the amount of decrease in the amount of stored oxygen due to the amount of thermal deterioration.

Subsequently, the amount of decrease in the amount of stored oxygen in the three-way catalyst 7 due to the amount of sulfur poisoning is obtained. FIG. 27 is a flow chart for obtaining the amount of decrease in the amount of stored oxygen in the three-way catalyst 7 due to the amount of sulfur poisoning. This flow or routine is carried out by means of the ECU 10 at each predetermined time interval.

In step S701, it is determined whether HC poisoning recovery control has been carried out. This HC poisoning recovery control may be the HC poisoning recovery control explained in the first embodiment. Here, note that in this step, the HC poisoning recovery control may be carried out in order to obtain the amount of decrease in the amount of oxygen stored in the three-way catalyst 7 due to the amount of sulfur poisoning (hereinafter, also referred to as the amount of decrease in the amount of stored oxygen due to the amount of sulfur poisoning). In cases where an affirmative determination is made in step S701, the routine goes to step S702, whereas in cases where a negative determination is made, this routine is ended.

In step S702, the oxygen storage capacity in the three-way catalyst 7 is detected. In this step, the amount of oxygen which can be stored in the three-way catalyst 7 as much as possible is obtained, similarly as in step S602. In this step, the oxygen storage capacity at the current point in time in a state where HC poisoning has not occurred is detected.

In step S703, the amount of decrease in the amount of oxygen stored in the three-way catalyst 7 due to the amount of deterioration by sulfur poisoning is calculated. Here, the amount of deterioration remaining in the three-way catalyst 7 immediately after the HC poisoning recovery control has been carried out is the amount of deterioration by sulfur poisoning and the amount of deterioration by heat (the amount of and thermal deterioration). The amount of thermal deterioration can be calculated according to the flow or routine shown in FIG. 26, so the remainder becomes the amount of deterioration by sulfur poisoning. For this reason, the amount of decrease of the amount of deterioration by sulfur poisoning of the amount of stored oxygen can be calculated by subtracting, from the amount of stored oxygen in the initial state (this may also be the brand new state), the amount of decrease in the amount of stored oxygen due to the amount of thermal deterioration obtained in step S603 and the amount of stored oxygen obtained in step S702.

By making the time to obtain the amount of decrease in the amount of stored oxygen due to the amount of sulfur poisoning immediately after the execution of HC poisoning recovery control, it is possible to calculate the amount of decrease in the amount of sulfur poisoning without being affected by the influence of HC poisoning. With this, the amount of decrease in the amount of stored oxygen due to the amount of sulfur poisoning can be calculated in an accurate manner.

Then, the amounts of decrease in the individual amounts of oxygen stored in the upper catalyst layer 71 and the lower catalyst layer 72 due to the amounts of sulfur poisoning are calculated. The amount of decrease in the amount of stored oxygen due to the amount of sulfur poisoning, which is obtained according to the flow chart shown in FIG. 27, is the total sum of the amounts of decrease in the upper catalyst layer 71 and the lower catalyst layer 72. From this value, the amounts of decrease in the individual amounts of oxygen stored in the upper catalyst layer 71 and the lower catalyst layer 72 due to the amounts of sulfur poisoning are calculated, respectively.

Here, FIG. 28 is a view showing the relation between the rates of the amount of sulfur poisoning in the upper catalyst layer 71 and the amount of sulfur poisoning in the lower catalyst layer 72 (sulfur poisoning rates) with respect to the total amount of sulfur poisoning. "The total amount of sulfur poisoning" is the amount of sulfur poisoning of the three-way catalyst 7 as a whole. In addition, "the amount of upper layer sulfur poisoning" represents the rate of the amount of sulfur poisoning in the upper catalyst layer 71 with respect to the total amount of sulfur poisoning, and "the amount of lower layer sulfur poisoning" represents the rate of the amount of sulfur poisoning in the lower catalyst layer 72 with respect to the total amount of sulfur poisoning.

Here, Rh is included in the upper catalyst layer 71 of the three-way catalyst 7 according to this embodiment, and Pd is included in the lower catalyst layer 72 thereof. Pd is more easily subjected to sulfur poisoning than Rh. That is, sulfur poisoning occurs more easily in the lower catalyst layer 72 than in the upper catalyst layer 71. However, the sulfur components in the exhaust gas arrive the upper catalyst layer 71 first, the way of the upper catalyst layer 71 has fast progress of sulfur poisoning. Then, when sulfur components are saturated in the upper catalyst layer 71, the sulfur components arriving at the lower catalyst layer 72 increase. That is, in the upper catalyst layer 71, the amount of sulfur poisoning reaches an upper limit at an early stage. Thereafter, the rate of rise or increase of the sulfur poisoning rate in the lower catalyst layer 72 becomes high. The relation shown in FIG. 28 can be obtained in advance through experiments, simulations, or the like.

In this manner, the amount of decrease in the amount of stored oxygen due to the amount of sulfur poisoning obtained based on the flow chart in FIG. 27 has the relation shown in FIG. 28, and hence, the amounts of decrease in the individual amounts of oxygen stored in the upper catalyst layer 71 and the lower catalyst layer 72 due to the amounts of sulfur poisoning can be calculated, respectively, based on the relation of FIG. 28.

Note that it is assumed that thermal deterioration progresses equally in the upper catalyst layer 71 and the lower catalyst layer 72. Here, comparing with the heat capacity of the substrate of the three-way catalyst 7, the heat capacities of the upper catalyst layer 71 and the lower catalyst layer 72 are small, respectively. Moreover, because the upper catalyst layer 71 and the lower catalyst layer 72 are both thin, it is considered that the upper catalyst layer 71 and the lower catalyst layer 72 are at substantially the same temperature. For this reason, the degree of thermal deterioration becomes substantially the same in the upper catalyst layer 71 and the lower catalyst layer 72. Accordingly, the total amount of decrease in the amount of stored oxygen due to the amount of thermal deterioration can be divided equally between the upper catalyst layer 71 and the lower catalyst layer 72.

FIG. 29 is a view showing the rates of the amounts of decrease in the amounts of stored oxygen due to the individual amounts of poisoning in the upper catalyst layer 71 and the lower catalyst layer 72, respectively, when the total amount of sulfur poisoning is a value represented by S1 in FIG. 28. In FIG. 29, the total amount of thermal deterioration is divided between the upper catalyst layer 71 and the lower catalyst layer 72, by dividing by 2 the amount of thermal deterioration obtained according to the flow in FIG. 26. In FIG. 29, with respect to the amount of sulfur poisoning, the amount of sulfur poisoning obtained according to the flow chart of FIG. 27 is divided between the upper catalyst layer 71 and the lower catalyst layer 72, by a ratio shown in FIG. 28. Then, those which remain in the upper catalyst layer 71 and the lower catalyst layer 72, respectively, become the amounts of HC poisoning. As compared with the lower catalyst layer 72, the upper catalyst layer 71 has a higher rate for the amount of HC poisoning, and a lower rate for the amount of sulfur poisoning. Here, note that even if sulfur poisoning occurs in Rh in the upper catalyst layer 71, the oxygen storage capacity thereof still remains in the oxygen storage agent (e.g., ceria) having oxygen storage capacity, and hence, HC poisoning can occur in a portion of the upper catalyst layer 71 in which this oxygen storage capacity remains.

As described above, the amounts of decrease in the individual amounts of oxygen stored in the upper catalyst layer 71 and the lower catalyst layer 72 due to the amounts of HC poisoning can be obtained, respectively. With this, a period of time required for the recovery of HC poisoning in the upper catalyst layer 71, and a period of time required for the recovery of HC poisoning in the lower catalyst layer 72 can be obtained with a high degree of accuracy, respectively.

FIG. 30 is a flow chart showing a flow or routine for HC poisoning recovery control according to the second embodiment of the present disclosure. This flow or routine is performed by means of the ECU 10 immediately after sulfur poisoning recovery control and HC poisoning recovery control have been carried out.

In step S801, the amount of HC poisoning in each of the upper catalyst layer 71 and the lower catalyst layer 72 is calculated. This amount of HC poisoning is a maximum value of the amount of HC which can be attached or adhered to the three-way catalyst 7 at the current point in time. This amount of HC poisoning can be obtained by multiplying a conversion factor to the amount of decrease in the amount of stored oxygen due to the amount of HC poisoning. The conversion factor is a factor for converting the amount of decrease in the amount of stored oxygen due to the amount of HC poisoning into an amount of HC poisoning, and can be obtained in advance by experiments, simulations or the like, in each of the upper catalyst layer 71 and the lower catalyst layer 72. The amounts of decrease in the individual amounts of oxygen stored in the upper catalyst layer 71 and the lower catalyst layer 72 due to the amounts of HC poisoning are each calculated by subtracting, from the amount of stored oxygen in the initial state, the amount of decrease in the amount of stored oxygen due to the thermal deterioration, and the amount of decrease in the amount of stored oxygen due to the sulfur poisoning, in each of the upper catalyst layer 71 and the lower catalyst layer 72.

In step S802, a period of time required for recovering the HC poisoning in each of the upper catalyst layer 71 and the lower catalyst layer 72 is calculated. That is, a period of time in which the first operation is carried out and a period of time in which the second operation is carried out are calculated. In this step, the amount of HC poisoning calculated in step S801 is converted into a period of time which is required for the recovery of the HC poisoning. To this end, coefficients for the upper catalyst layer 71 and the lower catalyst layer 72 are used, respectively. By multiplying these coefficients to the amounts of HC poisoning in the upper catalyst layer 71 and the lower catalyst layer 72, respectively, the periods of time in which the first operation and the second operation are obtained, respectively. These coefficients can be obtained in advance by experiments, simulations or the like in the upper catalyst layer 71 and the lower catalyst layer 72, respectively. The period of time required to recover the HC poisoning of the upper catalyst layer 71 is the period of time in which the first operation is carried out, and the period of time required to recover the HC poisoning of the lower catalyst layer 72 is the period of time in which the second operation is carried out. Here, note that it is considered that any of the reduced cylinder operation, the operation with homogeneous charge combustion, and the operation with stratified charge combustion is carried out for the first operation and/or the second operation, but the air fuel ratio may be different from one to another for these operations. In such a case, the periods of time required for the recovery of HC poisoning may change, so the coefficients to be used may be changed according to what kind of operation is carried out.

In step S803, the first operation and the second operation are carried out only in the periods of time obtained in step S802, respectively.

In this manner, the periods of time in which the first operation and the second operation are carried out can be calculated, before the first operation and the second operation are carried out. As a result, it is possible to set the periods of time in which the first operation and the second operation are carried out in an appropriate manner. Accordingly, fuel economy can be improved. Further, it is possible to decrease the amount of HC flowing out of the three-way catalyst 7.

Third Embodiment

In this third embodiment, the time to switch from the first operation to the second operation is decided based on the concentration of NOx in the exhaust gas at the downstream side of the three-way catalyst 7. The other devices, parts and so on are the same as those in the first embodiment, so the explanation thereof is omitted.

Here, in cases where the time to switch from the first operation to the second operation is later than the optimal time, there is a fear that the first operation may be carried out for a period of time longer than needed. When the period of time in which the first operation is carried out is longer than needed, the amount of NOx stored in the NSR catalyst 8 increases. For this reason, the amount of NOx released from the NSR catalyst 8 during the second operation increases, so that the amount of ammonia consumed in the SCR catalyst 9 at the time of carrying out the second operation will increase. On the other hand, in cases where the time to switch from the first operation to the second operation is earlier than the optimal time, there is a fear that the second operation may be carried out for a period of time longer than needed. When the period of time in which the second operation is carried out is longer than needed, the period of time in which the internal combustion engine 1 is operated at a lean air fuel ratio becomes shorter, so there is a fear that fuel economy may deteriorate.

In this embodiment, based on the rate of rise or increase (gradient) in the concentration of NOx measured by using the second NOx sensor 94 arranged at the downstream side of the three-way catalyst 7 and at the upstream side of the NSR catalyst 8, it is determined whether the HC poisoning of the upper catalyst layer 71 has been recovered. That is, the time to switch from the first operation to the second operation is decided based on the rate of rise in the concentration of NOx (gradient) measured by using the second NOx sensor 94.

FIG. 31 is a time chart showing the changes over time of the air fuel ratio and the concentration of NOx measured by the second NOx sensor 94 (NOx measured value). Here, note that in FIG. 31, adjacent measured values of the concentration of NOx are connected with each other by straight lines for the sake of convenience of explanation, but in actuality, they can also be connected with each other by curved lines. Here, the HC attached or adhered to the three-way catalyst 7 is oxidized by oxygen, but is also oxidized by NOx.

In a period of time indicated by TA, HC has adhered to the upper catalyst layer 71, and the HC poisoning of the upper catalyst layer 71 is mainly recovered. The state of the three-way catalyst 7 at this time is shown in FIG. 3B, for example. In this period of time TA, HC is mainly oxidized by oxygen in the upper catalyst layer 71. However, a part of the HC is also oxidized by NOx. In this period of time indicated by TA, oxygen hardly arrives at the lower catalyst layer 72, but NOx arrives there, so the HC attached or adhered to the lower catalyst layer 72 is oxidized by the NOx. Then, as the HC attached or adhered to the upper catalyst layer 71 and the lower catalyst layer 72 decreases, NOx reacting in the three-way catalyst 7 decreases, so NOx flowing out of the three-way catalyst 7 increases.

In the period of time indicated by TB, the HC poisoning of the upper catalyst layer 71 has already been recovered, and HC does not substantially exist in the upper catalyst layer 71. The state of the three-way catalyst 7 at this time is shown in FIG. 3C, for example. For this reason, in the upper catalyst layer 71, NOx is hardly consumed for oxidation of HC. Also, in the period of time indicated by TB, oxygen is being stored in the oxygen storage agent 71A of the upper catalyst layer 71. Here, it is considered that even before oxygen is fully filled in the oxygen storage agent 71A of the upper catalyst layer 71, there also exists oxygen which passes through the upper catalyst layer 71. In the lower catalyst layer 72, the reactivity in the oxygen storage agent 72A is high, so oxygen is mainly stored to the oxygen storage agent 72A. In this period of time indicated by TB, the HC in the lower catalyst layer 72 mainly reacts with NOx. Then, as the HC attached or adhered to the lower catalyst layer 72 decreases, NOx reacting in the three-way catalyst 7 decreases, so NOx flowing out of the three-way catalyst 7 increases.

A period of time indicated by TC is a period of time in which it is assumed that the operation at a lean air fuel ratio is continued. At this time, HC does not exist in the upper catalyst layer 71, so in the upper catalyst layer 71, NOx is hardly consumed for oxidation of HC. Also, in the period of time indicated by TC, a certain amount of oxygen has been stored in the oxygen storage agent 72A of the lower catalyst layer 72. Then, when the certain amount of oxygen is stored in the oxygen storage agent 72A of the lower catalyst layer 72, the HC attached or adhered to the precious metal 72B of the lower catalyst layer 72 may react with the oxygen which has passed through the upper catalyst layer 71. That is, in the lower catalyst layer 72, the oxygen having passed through the upper catalyst layer 71 and the HC having been attached or adhered to the lower catalyst layer 72 may react with each other. In this manner, when the HC and the oxygen begin to react with each other in the lower catalyst layer 72, the amount of NOx consumed in the lower catalyst layer 72 decreases rapidly. According to this, the concentration of NOx measured by the second NOx sensor 94 goes up rapidly.

Accordingly, it can be considered that in cases where the amount of increase per unit time of the measured value of the second NOx sensor 94, i.e., the rate of rise or increase, becomes equal to or more than a value in the period of time indicated by TC, the HC poisoning of the upper catalyst layer 71 has been recovered, and the certain amount of oxygen has been stored in the oxygen storage agent 72A of the lower catalyst layer 72. For this reason, in this embodiment, in cases where the rate of rise or increase of the measured value of the second NOx sensor 94 becomes equal to or more than a threshold value, the first operation is switched to the second operation.

FIG. 32 is a flow chart for HC poisoning recovery control according to this third embodiment of the present disclosure. When the air fuel ratio of the exhaust gas is a rich air fuel ratio, the routine in this flow chart is carried out by means of the ECU 10 at each predetermined time interval. Here, note that for those steps in which the same processing as in the aforementioned flow chart is carried out, the same symbols are attached and the explanation thereof is omitted.

In cases where an affirmative determination is made in step S103, the routine goes to step S901. On the other hand, in cases where a negative determination is made in step S103, this routine is ended. At this time, when the first operation is carried out, it is terminated. In step S901, the first operation is started. That is, the recovery of the HC poisoning of the upper catalyst layer 71 is started. Here, note that, in step S901, in cases where the first operation is already carried out, the first operation is made to continue.

In step S902, it is determined whether the rate of rise in the concentration of NOx at the downstream side of the three-way catalyst 7 is equal to or larger than the threshold value. That is, it is determined whether the rate of rise in the measured value of the second NOx sensor 94 is equal to or larger than the threshold value. The threshold value has been obtained in advance by experiments, simulations or the like, as the rate of rise in the concentration of NOx at the time when oxygen and HC begin to react with each other in the lower catalyst layer 72. Here, note that in this embodiment, the threshold value in step S902 corresponds to a threshold value in the present disclosure. In cases where an affirmative determination is made in step S902, the routine goes to step S903, whereas in cases where a negative determination is made, the routine returns to step S103.

In step S903, the first operation is terminated. That is, it is considered that the HC poisoning of the upper catalyst layer 71 has been recovered, so the first operation is caused to terminate.

In step S904, the second operation is started. Here, note that the second operation may be carried out only for a predetermined period of time. In addition, the time to terminate the second operation may be decided as in the case of the above-mentioned embodiments.

In this manner, the first operation can be switched to the second operation, after the HC poisoning of the upper catalyst layer 71 has been recovered. In this embodiment, the switching from the first operation to the second operation is made based on the actual value of the concentration of NOx measured by the second NOx sensor 94, so accuracy in the time of switching is high. Accordingly, it is possible to reduce the amount of consumption of ammonia, or it is possible to suppress the deterioration of fuel economy.

Fourth Embodiment

In this fourth embodiment, the first operation and the second operation are each carried out for a predetermined period of time, respectively. The other devices, parts and so on are the same as those in the first embodiment, so the explanation thereof is omitted.

In the above-mentioned embodiments, the periods of time in which the first operation and the second operation are carried out are decided based on the poisoning counter values or the measured value of the second NOx sensor 94. In contrast to this, in this fourth embodiment, the times to carry out the first operation and the second operation have been decided in advance, respectively. In addition, in this embodiment, at the time of shifting from the operation at a rich air fuel ratio to the operation at a lean air fuel ratio, the first operation and the second operation are carried out, irrespective of whether HC poisoning has occurred in the three-way catalyst 7. For this reason, it is not necessary to calculate the poisoning counter values. The periods of time in which the first operation and the second operation are carried out have been obtained in advance through experiments, simulations or the like.

FIG. 33 is a flow chart for HC poisoning recovery control according to this fourth embodiment of the present disclosure. When the air fuel ratio of the exhaust gas is a rich air fuel ratio, the routine in this flow chart is carried out by means of the ECU 10 at each predetermined time interval. Here, note that for those steps in which the same processing as in the aforementioned flow chart is carried out, the same symbols are attached and the explanation thereof is omitted.

In this fourth embodiment, after the processing of step S901, the routine goes to step S1010. In step S1010, it is determined whether an execution period of time of the first operation in which the first operation is carried out is equal to or more than a first predetermined period of time. The first predetermined period of time has been obtained in advance through experiments, simulations or the like, as a period of time in which the HC poisoning of the upper catalyst layer 71 is recovered. In cases where an affirmative determination is made in step S1010, the routine goes to step S903, whereas in cases where a negative determination is made, the processing of the step S1010 is carried out again.

In addition, in this fourth embodiment, after the processing of step S903, the routine goes to step S904, and after the processing of step S904, the routine goes to step S1020. In step S1020, it is determined whether an execution period of time of the second operation in which the second operation is carried out is equal to or more than a second predetermined period of time. The second predetermined period of time has been obtained in advance through experiments, simulations or the like, as a period of time in which the HC poisoning of the lower catalyst layer 72 is recovered. In cases where an affirmative determination is made in step S1020, the routine goes to step S1030, where the second operation is terminated. On the other hand, in cases where a negative determination is made in step S1020, the processing of step S1020 is carried out again.

As described above, in this embodiment, in cases where the internal combustion engine 1 is operated at a rich air fuel ratio, at the time of switching to an operation at a lean air fuel ratio, it is possible to eliminate HC poisoning in a quick manner. In addition, the first operation and the second operation are carried out only for the predetermined periods of time, respectively, thus making it possible to simplify the processing. Here, note that in cases where an operation at a rich air fuel ratio is requested when the first operation or the second operation is carried out, a shift may be made to the operation at a rich air fuel ratio, after terminating the first operation or the second operation.

The invention claimed is:

1. A control system of an internal combustion engine comprising:

an exhaust gas purification catalyst that is arranged in an exhaust passage of the internal combustion engine, and has a lower catalyst layer including an oxygen storage agent and a precious metal, and an upper catalyst layer disposed at an upper side of said lower catalyst layer and including an oxygen storage agent and a precious metal; and a controller, comprising at least one processer, configured to, when changing an air fuel ratio of the internal combustion engine from an air fuel ratio which is lower than a stoichiometric air fuel ratio to a target lean air fuel ratio which is higher than the stoichiometric air fuel ratio, perform a first operation in which the air fuel ratio of an exhaust gas flowing into said exhaust gas purification catalyst is temporarily made higher than the stoichiometric air fuel ratio, after performing the first operation, perform a second operation in which the air fuel ratio of the exhaust gas flowing into said exhaust gas purification catalyst is made to alternately change a plurality of times between a state where it is lower than the stoichiometric air fuel ratio and a state where it is higher than the stoichiometric air fuel ratio, and thereafter change the air fuel ratio of the internal combustion engine to the target lean air fuel ratio, wherein said controller is configured to perform said first operation until HC poisoning of said upper catalyst layer is recovered, and perform said second operation until HC poisoning of said lower catalyst layer is recovered.

2. The control system for an internal combustion engine as set forth in claim 1, wherein said controller is configured to alternately change a plurality of times the air fuel ratio of the exhaust gas flowing into said exhaust gas purification catalyst between a state where it is lower than the stoichiometric air fuel ratio and a state where it is higher than the stoichiometric air fuel ratio, by making low the air fuel ratio of the exhaust gas when the air fuel ratio of the exhaust gas flowing into said exhaust gas purification catalyst is higher than the stoichiometric air fuel ratio, and by making high the air fuel ratio of the exhaust gas when the air fuel ratio of the exhaust gas flowing into said exhaust gas purification catalyst is lower than the stoichiometric air fuel ratio, in said second operation.

3. The control system for an internal combustion engine as set forth in claim 1, wherein said controller is configured to be able to determine whether HC poisoning has occurred in each of said upper catalyst layer and said lower catalyst layer, and is configured to perform said first operation when determining that HC poisoning has occurred in said upper catalyst layer, and perform said second operation when determining that HC poisoning has occurred in said lower catalyst layer.

4. The control system for an internal combustion engine as set forth in claim 1, further comprising:

an NOx storage reduction catalyst and an NOx selective catalytic reduction catalyst that are arranged sequentially in the direction of flow of the exhaust gas, at a downstream side of said exhaust gas purification catalyst.

5. The control system for an internal combustion engine as set forth in claim 4, further comprising:
an NOx sensor that detects NOx concentration in exhaust gas at a downstream side of said exhaust gas purification catalyst and at an upstream side of said NOx storage reduction catalyst,
wherein said controller is configured to start said second operation when an increase rate of the NOx concentration detected by said NOx sensor becomes equal to or more than a threshold value while performing said first operation.

6. The control system for an internal combustion engine as set forth in claim 1, wherein
said controller is configured to temporarily make the air fuel ratio of the exhaust gas flowing into said exhaust gas purification catalyst higher than the stoichiometric air fuel ratio, by carrying out stratified charge combustion in said internal combustion engine in said first operation.

7. The control system for an internal combustion engine as set forth in claim 1, wherein
said internal combustion engine is provided with a plurality of cylinders; and
said controller is configured to temporarily make the air fuel ratio of the exhaust gas flowing into said exhaust gas purification catalyst higher than the stoichiometric air fuel ratio, by carrying out a reduced cylinder operation to stop a supply of fuel in a part of the cylinders of said internal combustion engine in said first operation.

8. The control system for an internal combustion engine as set forth in claim 1, further comprising:
an NOx sensor that detects NOx concentration in exhaust gas at a downstream side of said exhaust gas purification catalyst,
wherein said controller is configured to start said second operation when an increase rate of the NOx concentration detected by said NOx sensor becomes equal to or more than a threshold value while performing the first operation.

9. The control system for an internal combustion engine as set forth in claim 1, wherein
said controller is configured to:
for each of said upper catalyst layer and said lower catalyst layer, calculate a decrease in the amount of stored oxygen due to thermal deterioration, based on an amount of stored oxygen in a state where HC poisoning and sulfur poisoning do not exist,
for each of said upper catalyst layer and said lower catalyst layer, calculate a decrease in the amount of stored oxygen due to the sulfur poisoning, based on the decrease in the amount of stored oxygen due to thermal deterioration, and an amount of stored oxygen in a state where the HC poisoning does not exist,
for each of said upper catalyst layer and said lower catalyst layer, calculate a decrease in the amount of stored oxygen due to the HC poisoning, based on a value which is obtained by subtracting the decrease due to thermal deterioration and the decrease due to the sulfur poisoning from an amount of stored oxygen in its initial state, decode a period of time in which said first operation is performed, based on the decrease in the amount of stored oxygen of said upper catalyst layer due to the HC poisoning, and
decide a period of time in which said second operation is performed, based on the decrease in the amount of stored oxygen of said lower catalyst layer due to the HC poisoning.

10. A control system of an internal combustion engine comprising:
an exhaust gas purification catalyst that is arranged in an exhaust passage of the internal combustion engine, and has a lower catalyst layer including an oxygen storage agent and a precious metal, and an upper catalyst layer disposed at an upper side of said lower catalyst layer and including an oxygen storage agent and a precious metal; and
a controller, comprising at least one processer, configured to, when changing an air fuel ratio of the internal combustion engine from an air fuel ratio which is lower than a stoichiometric air fuel ratio to a target lean air fuel ratio which is higher than the stoichiometric air fuel ratio, perform a first operation in which the air fuel ratio of an exhaust gas flowing into said exhaust gas purification catalyst is temporarily made higher than the stoichiometric air fuel ratio, after performing the first operation, perform a second operation in which the air fuel ratio of the exhaust gas flowing into said exhaust gas purification catalyst is made to alternately change a plurality of times between a state where it is lower than the stoichiometric air fuel ratio and a state where it is higher than the stoichiometric air fuel ratio, and thereafter change the air fuel ratio of the internal combustion engine to the target lean air fuel ratio, wherein said controller is configured to:
be able to determine whether HC poisoning has occurred in each of said upper catalyst layer and said lower catalyst layer, and
perform said first operation when determining that HC poisoning has occurred in said upper catalyst layer, and perform said second operation when determining that HC poisoning has occurred in said lower catalyst layer.

11. A control system of an internal combustion engine comprising:
an exhaust gas purification catalyst that is arranged in an exhaust passage of the internal combustion engine, and has a lower catalyst layer including an oxygen storage agent and a precious metal, and an upper catalyst layer disposed at an upper side of said lower catalyst layer and including an oxygen storage agent and a precious metal; and
a controller, comprising at least one processer, configured to, when changing an air fuel ratio of the internal combustion engine from an air fuel ratio which is lower than a stoichiometric air fuel ratio to a target lean air fuel ratio which is higher than the stoichiometric air fuel ratio, perform a first operation in which the air fuel ratio of an exhaust gas flowing into said exhaust gas purification catalyst is temporarily made higher than the stoichiometric air fuel ratio, after performing the first operation, perform a second operation in which the air fuel ratio of the exhaust gas flowing into said exhaust gas purification catalyst is made to alternately change a plurality of times between a state where it is lower than the stoichiometric air fuel ratio and a state where it is higher than the stoichiometric air fuel ratio, and thereafter change the air fuel ratio of the internal combustion engine to the target lean air fuel ratio, wherein said controller is configured to:

for each of said upper catalyst layer and said lower catalyst layer, calculate a decrease in the amount of stored oxygen due to thermal deterioration, based on an amount of stored oxygen in a state where HC poisoning and sulfur poisoning do not exist, for each of said upper catalyst layer and said lower catalyst layer, calculate a decrease in the amount of stored oxygen due to the sulfur poisoning, based on the decrease in the amount of stored oxygen due to thermal deterioration, and an amount of stored oxygen in a state where the HC poisoning does not exist, for each of said upper catalyst layer and said lower catalyst layer, calculate a decrease in the amount of stored oxygen due to the HC poisoning, based on a value which is obtained by subtracting the decrease due to thermal deterioration and the decrease due to the sulfur poisoning from an amount of stored oxygen in its initial state, decode a period of time in which said first operation is performed, based on the decrease in the amount of stored oxygen of said upper catalyst layer due to the HC poisoning, and decide a period of time in which said second operation is performed, based on the decrease in the amount of stored oxygen of said lower catalyst layer due to the HC poisoning.

* * * * *